United States Patent
Kuroda et al.

(10) Patent No.: US 7,202,326 B2
(45) Date of Patent: Apr. 10, 2007

(54) GLYCOLIC ACID COPOLYMER AND METHOD FOR PRODUCTION THEREOF

(75) Inventors: Yoshito Kuroda, Kurashiki (JP); Harumi Watanabe, Kurashiki (JP); Masako Yokoyama, Kurashiki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 20 days.

(21) Appl. No.: 10/528,984

(22) PCT Filed: Sep. 24, 2003

(86) PCT No.: PCT/JP03/12165

§ 371 (c)(1),
(2), (4) Date: Mar. 24, 2005

(87) PCT Pub. No.: WO2004/029129

PCT Pub. Date: Apr. 8, 2004

(65) Prior Publication Data

US 2005/0288479 A1    Dec. 29, 2005

(30) Foreign Application Priority Data

Sep. 24, 2002  (JP)  .............. 2002-277648
Sep. 26, 2002  (JP)  .............. 2002-280829
Feb. 14, 2003  (JP)  .............. 2003-037164

(51) Int. Cl.
  C08G 63/06  (2006.01)
  C08F 20/00  (2006.01)

(52) U.S. Cl. ............... 528/361; 528/365; 528/503; 525/437; 525/444; 525/450

(58) Field of Classification Search ........ 528/361, 528/365, 503; 525/437, 444, 450
See application file for complete search history.

(56) References Cited

U.S. PATENT DOCUMENTS

| | | | | |
|---|---|---|---|---|
| 4,273,920 A | * | 6/1981 | Nevin | 528/361 |
| 4,677,191 A | * | 6/1987 | Tanaka et al. | 528/361 |
| 4,683,288 A | * | 7/1987 | Tanaka et al. | 528/361 |
| 4,859,763 A | * | 8/1989 | Takayanagi et al. | 528/357 |
| 5,759,583 A | * | 6/1998 | Iwamoto et al. | 424/502 |
| 6,201,072 B1 | * | 3/2001 | Rathi et al. | 525/415 |
| 6,482,864 B1 | * | 11/2002 | Yamagata et al. | 514/772.4 |
| 6,689,608 B1 | * | 2/2004 | Mikos et al. | 435/395 |
| 2004/0057996 A1 | * | 3/2004 | Takada et al. | 424/468 |
| 2004/0241229 A1 | * | 12/2004 | Yamamoto et al. | 424/468 |
| 2005/0025826 A1 | * | 2/2005 | Saikawa et al. | 424/468 |

FOREIGN PATENT DOCUMENTS

| | | |
|---|---|---|
| JP | 61-111326 | 5/1986 |
| JP | 2-209918 | 8/1990 |
| JP | 7-18063 | 1/1995 |

* cited by examiner

*Primary Examiner*—Samuel A. Acquah
(74) *Attorney, Agent, or Firm*—Staas & Halsey LLP

(57) ABSTRACT

A glycolic acid copolymer comprising (a) 80 to less than 95% by mole of glycolic acid monomer units, (b) 5.0 to 20.0% by mole of non-glycolic, hydroxycarboxylic acid monomer units, and (c) 0 to 0.10% by mole of diglycolic acid monomer units, the non-glycolic, hydroxycarboxylic acid monomer units (b) constituting a plurality of segments each independently consisting of at least one monomer unit (b), wherein the segments have an average chain length of from 1.00 to 1.50 in terms of the average number of monomer unit or units (b), the total of the components (a), (b) and (c) being 100% by mole, the glycolic acid copolymer having a weight average molecular weight of 50,000 or more.

23 Claims, No Drawings

GLYCOLIC ACID COPOLYMER AND METHOD FOR PRODUCTION THEREOF

BACKGROUND OF THE INVENTION

1. Field of the Invention

The present invention relates to a glycolic acid copolymer. More particularly, the present invention is concerned with a glycolic acid copolymer comprising (a) glycolic acid monomer units as a main component, (b) non-glycolic, hydroxycarboxylic acid monomer units, and optionally (c) diglycolic acid monomer units in not more than a specific amount, the non-glycolic, hydroxycarboxylic acid monomer units (b) constituting a plurality of segments each independently consisting of at least one non-glycolic, hydroxycarboxylic acid monomer unit (b), wherein the segments have an average chain length of from 1.00 to 1.50 in terms of the average number of non-glycolic, hydroxycarboxylic acid monomer unit or units (b), wherein the glycolic acid copolymer has a weight average molecular weight of 50,000 or more. The glycolic acid copolymer of the present invention is a high quality, high molecular weight product which is advantageous not only in that the copolymer enables production of a shaped article exhibiting excellent gas barrier property, satisfactory mechanical strength and satisfactory biodegradability, but also in that the copolymer exhibits high heat stability, thereby greatly suppressing the occurrence of discoloration even when melt-shaped at high temperatures. The present invention is also concerned with a method for producing the above-mentioned glycolic acid copolymer efficiently and stably.

2. Prior Art

In recent years, the problem of plastic materials wastes have been attracting attention from the viewpoint of environmental protection. For facilitating environmental protection, there is an increasing demand for polymers which can be spontaneously degraded in natural environment and for shaped articles produced from such polymers. A polyglycolic acid and a glycolic acid copolymer have not only a good balance of heat resistance, mechanical strength and biodegradability, but also extremely excellent, gas barrier property. By virtue of such excellent properties, polyglycolic acids and glycolic acid copolymers are attracting attention as biodegradable polymeric materials which are suitable for producing packaging materials, such as containers and films. Therefore, in the art, studies have been being conducted for developing a high molecular weight polyglycolic acid and a high molecular weight glycolic acid copolymer which have a satisfactory mechanical strength required of shaped articles.

However, a polyglycolic acid and a glycolic acid copolymer having a high glycolic acid monomer unit content have high melting temperatures and, hence, these polymers have defects not only in that a high temperature is necessary for melt shaping these polymers, but also in that the difference between the melting temperature and the decomposition temperature is small. Therefore, problems due to poor heat stability have been encountered in that these polymers exhibit marked discoloration at the time of melt shaping, that these polymers have poor resistance to heat aging, and that these polymers generate heat decomposition products when heated.

In an attempt to solve such problems, methods using a phosphorus compound as a discoloration inhibitor have been proposed. However, these methods have not enabled production of a polyglycolic acid and a glycolic acid copolymer which have satisfactory heat stability.

For improving the heat stability of a polyglycolic acid and a glycolic acid copolymer (hereinafter, these polymers are frequently, collectively referred to as "glycolic acid polymer"), a method has been proposed in which the terminal functional groups of a glycolic acid polymer are reacted with a specific compound (see, for example, Unexamined Japanese Patent Application Laid-Open Specification No. 56-157422). This method is effective for suppressing the depolymerization of a glycolic acid polymer at the time of shaping. However, this method does not exhibit a satisfactory effect of suppressing the discoloration at the time of shaping.

For solving the problem of the poor heat stability of a polymer, there is a generally employed measure in which copolymerization is performed for producing a copolymer having a lowered melting temperature. This measure has also been employed with respect to a glycolic acid polymer, and studies have been performed for producing various glycolic acid copolymers having a lowered melting temperature.

For example, there has been proposed a method for producing a glycolic acid copolymer having a high molecular weight, in which many steps are performed, as follows: glycolic acid and/or a derivative thereof is subjected to dehydration condensation to obtain a dehydration condensation product; the obtained dehydration condensation product is subjected to thermal decomposition to produce a cyclic dimeric glycolate (so-called "glycolide"); the obtained glycolide is purified to a high degree; and the resultant highly purified glycolide is subjected to ring-opening polymerization with, e.g., cyclic dimeric lactate (so-called "lactide") in the presence of a catalyst, thereby obtaining a glycolic acid copolymer (see, for example, Unexamined Japanese Patent Application Laid-Open Specification No. 48-62899 (corresponding to U.S. Pat. No. 3,839,297 and GB1416196 A)).

However, a glycolic acid copolymer (such as a glycolide-lactide copolymer) obtained by the above-mentioned method using a ring-opening polymerization is likely to have a structure in which comonomer units (e.g., lactic acid monomer units in the above-mentioned glycolide-lactide copolymer) are introduced as polymer blocks into the primary structure of the polymer. Therefore, when the amount of the comonomer units is small, a satisfactory effect of lowering the melting temperature of a polymer cannot be obtained and, hence, the effect of suppressing the discoloration at the time of shaping becomes unsatisfactory.

On the other hand, when the amount of comonomer units (such as lactic acid monomer units) is increased for lowering the melting temperature of a glycolic acid copolymer, the gas barrier property, which is characteristic of a glycolic acid copolymer, tends to become poor.

As another method for producing a glycolic acid copolymer by using a ring-opening polymerization, a method has been proposed in which glycolide is copolymerized with, e.g., ε-caprolactone, trimethylene carbonate, p-dioxanone or a copolymer compound, such as a cyclic dimeric ester of glycolic acid with a malate (see Unexamined Japanese Patent Application Laid-Open Specification No. 3-269013 (corresponding to DE3335588 A, GB2127839 A and U.S. Pat. No. 4,605,730), Examined Japanese Patent Application Publication No. 63-47731 (corresponding to GB2033411 A, DE2850824 A and U.S. Pat. No. 4,243,775), Unexamined Japanese Patent Application Laid-Open Specification No. 9-12689 (corresponding to EP751165 A2 and U.S. Pat. No. 5,633,343) and Unexamined Japanese Patent Application Laid-Open Specification No. 2-209918).

On the other hand, as another method for producing a glycolic acid copolymer, there is known a method in which, for example, mainly glycolic acid and/or a derivative thereof is polycondensed with a comonomer. The method using a polycondensation is commercially more advantageous than the method using a ring-opening polymerization, in that the former involves fewer steps than the latter. Further, the method using a polycondensation is advantageous in that comonomer units can be randomly introduced into the primary structure of the resin. Therefore, the method using a polycondensation is highly effective for improving the properties of a glycolic acid copolymer. For example, by the method using a polycondensation, the melting temperature can be greatly lowered by introducing a small amount of comonomer units. For the reason of these advantages, the method using a polycondensation has been considered as a promising polymerization method capable of producing a glycolic acid copolymer having satisfactory properties with respect to shapability and gas barrier property, and various studies have heretofore been made on the method using a polycondensation. Various glycolic acid copolymers produced by this method have been proposed, as follows.

For example, Japanese Patent Application prior-to-examination Publication (Tokuhyo) No. 7-501102 (corresponding to WO93/10169) discloses a copolymer obtained from glycolic acid and a polycarboxylic acid containing 2 or more carboxyl groups per molecule. However, this patent document has no description about a high molecular weight copolymer (for example, a copolymer having a weight average molecular weight of 50,000 or more). In Unexamined Japanese Patent Application Laid-Open Specification No. 11-255873, a copolymer is proposed which is comprised of hydroxycarboxylic acid monomer units, aliphatic dicarboxylic acid monomer units and ethylene oxide/propylene oxide block copolymer units and which has a weight average molecular weight of from 50,000 to 1,000,000. Further, Unexamined Japanese Patent Application Laid-Open Specification No. 8-3296 proposes an aliphatic polyester copolymer which is comprised of aliphatic hydroxycarboxylic acid monomer units, aliphatic diol monomer units and aliphatic dicarboxylic acid monomer units and which has a number average molecular weight of from 10,000 to 100,000. In these patent documents, copolymers containing lactic acid monomer units as hydroxycarboxylic acid monomer units are exemplified, and working examples are described in which such a copolymer is shaped into a fiber, sheet or the like. However, the copolymers exemplified in these patent documents have a problem in that, when a copolymer contains a large amount of glycolic acid monomer units, the heat stability of the copolymer is not satisfactory and, hence, a marked discoloration is likely to occur at the time of melt shaping.

There has also been proposed an aliphatic polyester which is comprised of glycol monomer units and at least one member selected from the group consisting of glycolic acid monomer units and lactic acid monomer units and which has a solution viscosity of 0.35 or more (see, for example, Unexamined Japanese Patent Application Laid-Open Specification No. 1-156319). However, such copolymer has low heat stability and exhibits marked discoloration at the time of melt shaping.

Further, there has been proposed a copolymer which is obtained by a transesterification reaction between (A) a polyglycolic acid or a copolymer of glycolide and lactide and (B) a polyester comprised of diglycolic acid monomer units and diol compound monomer units, wherein polyester (B) is used in an amount of from 2 to 50% by weight, based on the total weight of raw material (A) and polyester (B) (see, for example, Unexamined Japanese Patent Application Laid-Open Specification No. 52-147691 (corresponding to GB1572362, U.S. Pat. No. 4,048,256, U.S. Pat. No. 4,095,600, U.S. Pat. No. 4,118,470 and U.S. Pat. No. 4,122,129)). However, the heat stability of the copolymer is not satisfactory, and a marked discoloration is likely to occur especially at the time of melt shaping.

Unexamined Japanese Patent Application Laid-Open Specification No. 9-808220 (corresponding to WO97/08220) discloses a method for producing a polyhydroxycarboxylic acid which has a weight average molecular weight of 50,000 or more, in which a hydroxycarboxylic acid or an oligomer thereof is subjected to polycondensation in the presence of an inorganic solid acid catalyst and an alkaline earth metallic compound catalyst. However, the polyhydroxycarboxylic acid obtained by this method is discolored to assume a pale brown color and, hence, has a poor quality. In addition, the heat stability of the polyhydroxycarboxylic acid is low, and the discoloration at the time of melt shaping is marked.

Unexamined Japanese Patent Application Laid-Open Specification No. 11-130847 (corresponding to WO99/19378) discloses a method for producing a high molecular weight polyglycolic acid, in which a hydrolyzate of methyl glycolate is subjected to polycondensation to obtain a prepolymer and, then, the obtained prepolymer is subjected to solid phase polymerization. However, the obtained polyglycolic acid exhibits poor heat stability and marked discoloration at the time of melt shaping.

As described hereinabove, there has been totally unknown a glycolic acid copolymer containing a large amount of glycolic acid monomer units, which is advantageous not only in that it exhibits high heat stability at the time of melt shaping, but also in that it enables production of a shaped article exhibiting high mechanical strength and excellent gas barrier property.

SUMMARY OF THE INVENTION

In this situation, the present inventors have made extensive and intensive studies with a view toward developing a high quality, high molecular weight glycolic acid copolymer which is advantageous not only in that the copolymer enables production of a shaped article exhibiting excellent gas barrier property and satisfactory mechanical strength as well as biodegradability, but also in that the copolymer exhibits high heat stability, thereby greatly suppressing the occurrence of discoloration even when melt-shaped at high temperatures. As a result, it has unexpectedly been found that, when a glycolic acid copolymer is produced by polycondensation under melt conditions using glycolic acid and/or a derivative thereof as a raw material, diglycolic acid monomer units are formed due to a diglycolic acid-forming, side reaction represented by the below-mentioned formula at the early stage of the polycondensation, and that the content of the above-mentioned diglycolic acid monomer units in the copolymer is greatly varied depending on the production conditions.

The present inventors have also made extensive and intensive studies on the relationship between the primary structure of a glycolic acid copolymer and the heat stability and gas barrier property of the copolymer. As a result, it has surprisingly been found that the above-mentioned problems of the prior art can be solved by a glycolic acid copolymer comprising glycolic acid monomer units as a main component, non-glycolic, hydroxycarboxylic acid monomer units in a specific amount, and optionally diglycolic acid monomer units, wherein the content of the optional diglycolic acid monomer units is reduced to not more than a specific value, wherein the glycolic acid copolymer has a weight average molecular weight of 50,000 or more. It has also been found that such high molecular weight glycolic acid copolymer having excellent properties can be efficiently and stably obtained by a method in which a raw material mixture which comprises a starting material comprised of glycolic acid and/or a derivative thereof and a reactant comprised of a non-glycolic, hydroxycarboxylic acid and/or a derivative thereof, the reactant being copolymerizable with the starting material, is provided and subjected to a preliminary polycondensation reaction at a specific reaction temperature, thereby obtaining a reaction mixture containing a glycolic acid copolymer prepolymer, and then the temperature of the obtained reaction mixture is elevated to a specific value under specific temperature elevation conditions, followed by a final polycondensation reaction. Based on these findings, the present invention has been completed.

Accordingly, it is a primary object of the present invention to provide a high quality, high molecular weight glycolic acid copolymer which is advantageous not only in that the copolymer enables production of a shaped article exhibiting excellent gas barrier property and satisfactory mechanical strength as well as biodegradability, but also in that the copolymer exhibits high heat stability, thereby greatly suppressing the occurrence of discoloration even when melt-shaped at high temperatures.

It is another primary object of the present invention is to provide a method for producing the above-mentioned excellent glycolic acid copolymer, efficiently and stably.

The foregoing and other objects, features and advantages of the present invention will be apparent from the following detailed description and appended claims.

DETAILED DESCRIPTION OF THE INVENTION

In one aspect of the present invention, there is provided a glycolic acid copolymer comprising:

(a) 80 to less than 95% by mole of glycolic acid monomer units, (b) 5.0 to 20.0% by mole of non-glycolic, hydroxycarboxylic acid monomer units, and (c) 0 to 0.10% by mole of diglycolic acid monomer units, the non-glycolic, hydroxycarboxylic acid monomer units (b) constituting a plurality of segments each independently consisting of at least one non-glycolic, hydroxycarboxylic acid monomer unit (b), wherein the segments have an average chain length of from 1.00 to 1.50 in terms of the average number of non-glycolic, hydroxycarboxylic acid monomer unit or units (b), the total of the components (a), (b) and (c) being 100% by mole, the glycolic acid copolymer having a weight average molecular weight of 50,000 or more.

For easy understanding of the present invention, the essential features and various preferred embodiments of the present invention are enumerated below.

1. A glycolic acid copolymer comprising:
(a) 80 to less than 95% by mole of glycolic acid monomer units, (b) 5.0 to 20.0% by mole of non-glycolic, hydroxycarboxylic acid monomer units, and (c) 0 to 0.10% by mole of diglycolic acid monomer units, the non-glycolic, hydroxycarboxylic acid monomer units (b) constituting a plurality of segments each independently consisting of at least one non-glycolic, hydroxycarboxylic acid monomer unit (b), wherein the segments have an average chain length of from 1.00 to 1.50 in terms of the average number of non-glycolic, hydroxycarboxylic acid monomer unit or units (b), the total of the components (a), (b) and (c) being 100% by mole, the glycolic acid copolymer having a weight average molecular weight of 50,000 or more.

2. The glycolic acid copolymer according to item 1 above, wherein the weight average molecular weight of the glycolic acid copolymer is 80,000 or more.

3. The glycolic acid copolymer according to item 1 or 2 above, wherein the amount of diglycolic acid monomer units (c) is from more than 0 to 0.09% by mole, based on the total molar amount of components (a), (b) and (c).

4. The glycolic acid copolymer according to any one of items 1 to 3 above, wherein the weight average molecular weight of the glycolic acid copolymer is 100,000 or more.

5. The glycolic acid copolymer according to any one of items 1 to 4 above, wherein the average chain length of the segments each independently consisting of at least one non-glycolic, hydroxycarboxylic acid monomer unit (b) is from 1.00 to 1.20.

6. The glycolic acid copolymer according to any one of items 1 to 5 above, wherein the non-glycolic, hydroxycarboxylic acid monomer units (b) are non-glycolic, monohydroxymonocarboxylic acid monomer units.

7. The glycolic acid copolymer according to any one of items 1 to 6 above, which further comprises a polyol monomer unit (d).

8. The glycolic acid copolymer according to item 7 above, wherein the polyol monomer unit (d) comprises at least one member selected from the group consisting of monomer units derived from a diol having 3 or more carbon atoms and monomer units derived from a compound having 4 or more carbon atoms and 3 or more hydroxyl groups in the molecule.

9. The glycolic acid copolymer according to item 8 above, wherein the polyol monomer unit (d) comprises a monomer unit derived from a polyol having 5 or more carbon atoms and 2 or 3 hydroxyl groups in the molecule.

10. The glycolic acid copolymer according to item 9 above, wherein the polyol monomer units (d) are neopentyl glycol monomer units.

11. The glycolic acid copolymer according to any one of items 7 to 10 above, which further comprises a polycarboxylic acid monomer unit (e) other than diglycolic acid monomer units, wherein the total amount of the polyol monomer units (d), the polycarboxylic acid monomer units (e), and the diglycolic acid monomer units (c) is less than 2.0% by mole, based on the total molar amount of components (a), (b), (c), (d) and (e).

12. The glycolic acid copolymer according to item 11 above, wherein the total amount of the polyol monomer units (d), the polycarboxylic acid monomer units (e), and the diglycolic acid monomer units (c) is from more than 0.02 to less than 2.0% by mole, based on the total molar amount of components (a), (b), (c), (d) and (e), and the amount of the polyol monomer units (d) is from 0.02 to less than 2.0% by mole, based on the total molar amount of components (a), (b), (c), (d) and (e).

13. The glycolic acid copolymer according to any one of items 1 to 12 above, wherein the non-glycolic, hydroxycarboxylic acid monomer units (b) comprise at least one member selected from the group consisting of lactic acid monomer units and 6-hydroxyhexanoic acid monomer units.

14. The glycolic acid copolymer according to any one of items 1 to 13 above, which is obtained by polycondensing at least one starting material selected from the group consisting of glycolic acid and a derivative thereof with a reactant copolymerizable with the at least one starting material, wherein the reactant comprises at least one member selected from the group consisting of a non-glycolic, hydroxycarboxylic acid and a derivative thereof.

15. A method for producing a glycolic acid copolymer, which comprises the steps of:

(A) providing a raw material mixture comprising at least one starting material selected from the group consisting of glycolic acid and a derivative thereof, and a reactant copolymerizable with the at least one starting material, wherein the reactant comprises at least one member selected from the group consisting of a non-glycolic, hydroxycarboxylic acid, a derivative thereof and optionally at least one compound selected from the group consisting of a polyol, a polycarboxylic acid and a derivative of the polycarboxylic acid, and subjecting the raw material mixture to a preliminary polycondensation reaction at a temperature in the range of from 20 to 160° C., thereby obtaining a reaction mixture containing a glycolic acid copolymer prepolymer having a weight average molecular weight of from 700 to 5,000, (B) elevating the temperature of the reaction mixture to 190° C. within a period of 100 minutes as measured from the start of the temperature elevation in step (B), and (C) performing a heat treatment of the reaction mixture at a temperature in the range of from 190 to 300° C. to effect a final polycondensation reaction, wherein the final polycondensation reaction is performed so as to obtain a glycolic acid copolymer having a weight average molecular weight of 10,000 or more, wherein the final polycondensation reaction is performed under conditions wherein the increasing rate of weight average molecular weight of the glycolic acid copolymer being produced is maintained at 1,000 per hour or more until the weight average molecular weight reaches at least 10,000.

16. The method according to item 15 above, wherein the heat treatment for effecting the final polycondensation reaction is performed so as to obtain the glycolic acid copolymer of any one of items 1 to 14 above, which has a weight average molecular weight of 50,000 or more.

17. The method according to item 15 above, wherein the raw material mixture satisfies the following formulae (1) to (3):

$$0.8 \leq X^1 \leq 0.95 \quad (1),$$

$$0.05 \leq X^2 \quad (2), \text{ and}$$

$$X^1 + X^2 + X_3 + X^4 = 1 \quad (3)$$

wherein:
$X^1$ represents the calculated molar ratio of the at least one starting material selected from the group consisting of glycolic acid and a derivative thereof, $X^2$ represents the calculated molar ratio of the at least one member selected from the group consisting of a non-glycolic, hydroxycarboxylic acid and a derivative thereof, $X^3$ represents the calculated molar ratio of an optional polyol, $X^4$ represents the calculated molar ratio of at least one optional raw material selected from the group consisting of a polycarboxylic acid and a derivative thereof, the calculated molar ratio of each raw material being defined as the ratio of the molar amount of the unit structure obtained by hydrolysis of each raw material to the total molar amount of the unit structures of all raw materials, and each of $X^3$ and $X^4$ is independently 0 or more.

18. The method according to item 17 above, wherein the raw material mixture satisfies the following formulae (4) and (5):

$$\frac{X^4}{X^1 + X^2} \leq 0.001, \text{ and} \quad (4)$$

$$0 < \frac{X^3}{X^1 + X^2} \leq 0.01, \quad (5)$$

wherein $X^1$ to $X^4$ are as defined for formulae (1) to (3) above, provided that $X^3$ is more than 0, and $X^4$ is 0 or more.

19. The method according to item 17 above, wherein the raw material mixture satisfies the following formulae (6) and (7):

$$0.001 < \frac{X^4}{X^1 + X^2} \leq 0.088, \text{ and} \quad (6)$$

$$1 \leq \frac{X^3}{X^4} \leq 2, \quad (7)$$

wherein $X^1$ to $X^4$ are as defined for formulae (1) to (3) above, provided that each of $X^3$ and $X^4$ is more than 0.

20. The method according to item 17 above, wherein the raw material mixture satisfies the following formula (8):

$$0.0002 \leq \frac{X^3 + X^4}{X^1 + X^2 + X^3 + X^4} < 0.02, \quad (8)$$

wherein $X^1$ to $X^4$ are as defined for formulae (1) to (3) above, provided that $X^3$ is more than 0, and $X^4$ is 0 or more.

21. A method for producing a glycolic acid copolymer of any one of items 1 to 14 above, which comprises the steps of:

crystallizing the glycolic acid copolymer obtained by the method of item 15 above, thereby obtaining a crystallized glycolic acid copolymer, and subjecting the obtained crystallized glycolic acid copolymer to a solid phase polymerization, thereby increasing the degree of polymerization of the crystallized glycolic acid copolymer.

22. The method according to item 21 above, wherein the crystallized glycolic acid copolymer before the solid phase polymerization has a weight average molecular weight of 25,000 or more, as measured by gel permeation chromatography using, as an eluent, an 80 mM sodium trifluoroacetate solution in hexafluoroisopropanol and using a calibration curve obtained with respect to standard monodisperse polymethyl methacrylate samples.

23. A shaped article obtained from the glycolic acid copolymer of any one of items 1 to 14 above.

The glycolic acid copolymer of the present invention exhibits high heat stability at the time of melt shaping, thereby greatly suppressing the occurrence of discoloration even when melt-shaped at high temperatures, so that the quality of the glycolic acid copolymer can be maintained at a high level. Further, a shaped article obtained by melt shaping the glycolic acid copolymer of the present invention has excellent gas barrier property and satisfactory mechanical strength as well as biodegradability. Therefore, the glycolic acid copolymer of the present invention is suitable for use as a raw material for producing packaging materials, such as containers and films.

The weight average molecular weight of the glycolic acid copolymer of the present invention is 50,000 or more, preferably 80,000 or more, more preferably 100,000 or more. When the weight average molecular weight is less than 50,000, the glycolic acid copolymer does not have satisfactory mechanical strength required of shaped articles, such as containers and films. With respect to the weight average molecular weight, there is no particular upper limit. However, from the viewpoint of achieving a suitable fluidity at the time of shaping, the weight average molecular weight of the glycolic acid copolymer is preferably 1,000,000 or less, more preferably 700,000 or less, still more preferably 500,000 or less.

In the present invention, the weight average molecular weight (Mw) of the glycolic acid copolymer is a value as measured by gel permeation chromatography (GPC) using, as an eluent, an 80 mM sodium trifluoroacetate solution in hexafluoroisopropanol. More specifically, first, a calibration curve is obtained by a method in which monodisperse polymethyl methacrylate samples having known molecular weights and methyl methacrylate monomer are used as reference standards, and the elution time is detected by RI. The weight average molecular weight (Mw) is calculated using the calibration curve and the elution time of the glycolic acid copolymer.

Generally, the molecular weight of a polymer is measured by GPC as a weight average molecular weight or a number average molecular weight. In this connection, it should be noted that, when the molecular weight of a polyglycolic acid or a glycolic acid copolymer containing about 80% by mole or more of glycolic acid monomer units is measured by a method in which hexafluoroisopropanol (which can dissolve the polyglycolic acid or glycolic acid copolymer) is used as an eluent, and monodisperse polymethyl methacrylate and optionally methyl methacrylate monomer are used as reference standards, the weight average value obtained considerably varies depending on the absence or presence of sodium trifluoroacetate in the eluent and on the content of optional sodium trifluoroacetate in the eluent. Specifically, in the case where GPC is performed using an eluent which does not contain sodium trifluoroacetate or which contains only a small amount of sodium trifluoroacetate, the molecular weight value measured would be considerably large or would be irreproducible. Therefore, in the present invention, as mentioned above, a weight average molecular weight is defined as a value determined by GPC using, as an eluent, an 80 mM sodium trifluoroacetate in hexafluoroisopropanol.

The glycolic acid copolymer of the present invention comprises:

(a) 80 to less than 95% by mole of glycolic acid monomer units,
(b) 5.0 to 20.0% by mole of non-glycolic, hydroxycarboxylic acid monomer units, and
(c) 0 to 0.10% by mole of diglycolic acid monomer units,
the total of the components (a), (b) and (c) being 100% by mole.

As mentioned above, the amount of glycolic acid monomer units (a) contained in the glycolic acid copolymer of the present invention is 80 to less than 95% by mole. The amount of glycolic acid monomer units (a) is preferably 82 to less than 95% by mole, more preferably 83 to 94% by mole, most preferably 85 to 93% by mole. When the amount of glycolic acid monomer units (a) is less than 80% by mole, the gas barrier property of the copolymer is unsatisfactory, and a shaped article produced by melt shaping the glycolic acid copolymer has unsatisfactory properties with respect to mechanical properties, such as strength and elasticity. On the other hand, when the amount of glycolic acid monomer units (a) is 95% by mole or more, the heat stability of the glycolic acid copolymer is markedly lowered and, hence, discoloration at the time of melt shaping becomes marked.

As mentioned above, the glycolic acid copolymer of the present invention contains 5.0 to 20.0% by mole of non-glycolic, hydroxycarboxylic acid monomer units (b). Further, non-glycolic, hydroxycarboxylic acid monomer units (b) constitute a plurality of segments each independently consisting of at least one non-glycolic, hydroxycarboxylic acid monomer unit (b), wherein the segments have an average chain length of from 1.00 to 1.50, preferably 1.00 to 1.20, more preferably 1.00 to 1.10, still more preferably 1.00 to 1.07, most preferably 1.00 to 1.05 in terms of the average number of non-glycolic, hydroxycarboxylic acid monomer unit or units (b).

When the amount of non-glycolic, hydroxycarboxylic acid monomer units (b) is less than 5.0% by mole, the heat stability of the copolymer is lowered and, hence, discoloration at the time of melt shaping becomes marked.

When the average chain length of non-glycolic, hydroxycarboxylic acid monomer units (b) is more than 1.50, non-glycolic, hydroxycarboxylic acid monomer units (b) are introduced as polymer blocks into the copolymer. Therefore, in such case, the effect of lowering the melting temperature of the glycolic acid copolymer by copolymerization cannot be satisfactory exhibited, so that the shapability and gas barrier property of the glycolic acid copolymer are lowered. The minimum of the average chain length is usually 1.00.

In the present invention, the average chain length of non-glycolic, hydroxycarboxylic acid monomer units (b) is a value of the average chain length ($\gamma$) of non-glycolic, hydroxycarboxylic acid monomer units (b), which is calculated from an integrated value determined from the $^{13}$C-NMR spectral pattern of a carbonyl group, the $^{13}$C-NMR being performed using hexafluoroisopropanol as a solvent under conditions wherein protons are completely decoupled by eliminating the nuclear Overhauser effect. Specifically, the average chain length ($\gamma$) of a plurality of segments, each constituted by the non-glycolic, hydroxycarboxylic acid monomer unit(s), is calculated using the following values: an integrated intensity ($\alpha$) of a peak ascribed to a carbonyl group formed between two adjacent non-glycolic, hydroxycarboxylic acid monomer units (b); and sum ($\beta$) of an integrated intensity of a peak ascribed to a carbonyl group formed between a non-glycolic, hydroxycarboxylic acid monomer unit (b) and a glycolic acid monomer unit (a) which are adjacent to each other and an integrated intensity of a peak ascribed to a carbonyl group formed between a non-glycolic, hydroxycarboxylic acid monomer unit (b) and a monomer unit other than a non-glycolic, hydroxycarboxylic-acid monomer unit (b) which are adjacent to each other. Specifically, the average chain length (γ) is calculated by the following formula:

$$\gamma = \alpha/\beta + 1$$

When two or more types of non-glycolic, hydroxycarboxylic acid monomer units (b) are contained in the copolymer, a segment consisting of two non-glycolic, hydroxycarboxylic acid monomer units (b) may be constituted by two different types of non-glycolic, hydroxycarboxylic acid monomer units (b).

As non-glycolic, hydroxycarboxylic acid monomer units (b) copolymerized in the glycolic acid copolymer, there can be used at least one member selected from the group consisting of aliphatic monohydroxymonocarboxylic acid monomer units having 3 or more carbon atoms, aliphatic polyhydroxymonocarboxylic acid monomer units, aliphatic monohydroxypolycarboxylic acid monomer units, aliphatic polyhydroxypolycarboxylic acid monomer units, aromatic monohydroxymonocarboxylic acid monomer units, aromatic polyhydroxymonocarboxylic acid monomer units, aromatic monohydroxypolycarboxylic acid monomer units, aromatic polyhydroxypolycarboxylic acid monomer units and hydroxycarboxylic acid monomer units containing a hetero atom. Specific examples of aliphatic monohydroxymonocarboxylic acid monomer units having 3 or more carbon atoms include lactic acid monomer unit, 2-hydroxybutanoic acid monomer unit, 2-hydroxypentanoic acid monomer unit, 2-hydroxyhexanoic acid monomer unit, 2-hydroxyheptanoic acid monomer unit, 2-hydroxyoctanoic acid monomer unit, 2-hydroxy-2-methylpropanoic acid monomer unit, 2-hydroxy-2-methylbutanoic acid monomer unit, 2-hydroxy-2-ethylbutanoic acid monomer unit, 2-hydroxy-2-methylpentanoic acid monomer unit, 2-hydroxy-2-ethylpentanoic acid monomer unit, 2-hydroxy-2-propylpentanoic acid monomer unit, 2-hydroxy-2-butylpentanoic acid monomer unit, 2-hydroxy-2-methylhexanoic acid monomer unit, 2-hydroxy-2-ethylhexanoic acid monomer unit, 2-hydroxy-2-propylhexanoic acid monomer unit, 2-hydroxy-2-butylhexanoic acid monomer unit, 2-hydroxy-2-pentylhexanoic acid monomer unit, 2-hydroxy-2-methylheptanoic acid monomer unit, 2-hydroxy-2-ethylheptanoic acid monomer unit, 2-hydroxy-2-propylheptanoic acid monomer unit, 2-hydroxy-2-butylheptanoic acid monomer unit, 2-hydroxy-2-pentylheptanoic acid monomer unit, 2-hydroxy-2-hexylheptanoic acid monomer unit, 2-hydroxy-2-methyloctanoic acid monomer unit, 2-hydroxy-2-ethyloctanoic acid monomer unit, 2-hydroxy-2-propyloctanoic acid monomer unit, 2-hydroxy-2-butyloctanoic acid monomer unit, 2-hydroxy-2-pentyloctanoic acid monomer unit, 2-hydroxy-2-hexyloctanoic acid monomer unit, 2-hydroxy-2-heptyloctanoic acid monomer unit, 3-hydroxypropanoic acid monomer unit, 3-hydroxybutanoic acid monomer unit, 3-hydroxypentanoic acid monomer unit, 3-hydroxyhexanoic acid monomer unit, 3-hydroxyheptanoic acid monomer unit, 3-hydroxyoctanoic acid monomer unit, 3-hydroxy-3-methylbutanoic acid monomer unit, 3-hydroxy-3-methylpentanoic acid monomer unit, 3-hydroxy-3-ethylpentanoic acid monomer unit, 3-hydroxy-3-methylhexanoic acid monomer unit, 3-hydroxy-3-ethylhexanoic acid monomer unit, 3-hydroxy-3-propylhexanoic acid monomer unit, 3-hydroxy-3-methylheptanoic acid monomer unit, 3-hydroxy-3-ethylheptanoic acid monomer unit, 3-hydroxy-3-propylheptanoic acid monomer unit, 3-hydroxy-3-butylheptanoic acid monomer unit, 3-hydroxy-3-methyloctanoic acid monomer unit, 3-hydroxy-3-ethyloctanoic acid monomer unit, 3-hydroxy-3-propyloctanoic acid monomer unit, 3-hydroxy-3-butyloctanoic acid monomer unit, 3-hydroxy-3-pentyloctanoic acid monomer unit, 4-hydroxybutanoic acid monomer unit, 4-hydroxypentanoic acid monomer unit, 4-hydroxyhexanoic acid monomer unit, 4-hydroxyheptanoic acid monomer unit, 4-hydroxyoctanoic acid monomer unit, 4-hydroxy-4-methylpentanoic acid monomer unit, 4-hydroxy-4-methylhexanoic acid monomer unit, 4-hydroxy-4-ethylhexanoic acid monomer unit, 4-hydroxy-4-methylheptanoic acid monomer unit, 4-hydroxy-4-ethylheptanoic acid monomer unit, 4-hydroxy-4-propylheptanoic acid monomer unit, 4-hydroxy-4-methyloctanoic acid monomer unit, 4-hydroxy-4-ethyloctanoic acid monomer unit, 4-hydroxy-4-propyloctanoic acid monomer unit, 4-hydroxy-4-butyloctanoic acid monomer unit, 5-hydroxypentanoic acid monomer unit, 5-hydroxyhexanoic acid monomer unit, 5-hydroxyheptanoic acid monomer unit, 5-hydroxyoctanoic acid monomer unit, 5-hydroxy-5-methylhexanoic acid monomer unit, 5-hydroxy-5-methylheptanoic acid monomer unit, 5-hydroxy-5-ethylheptanoic acid monomer unit, 5-hydroxy-5-methyloctanoic acid monomer unit, 5-hydroxy-5-ethyloctanoic acid monomer unit, 5-hydroxy-5-propyloctanoic acid monomer unit, 6-hydroxyhexanoic acid monomer unit, 6-hydroxyheptanoic acid monomer unit, 6-hydroxyoctanoic acid monomer unit, 6-hydroxy-6-methylheptanoic acid monomer unit, 6-hydroxy-6-methyloctanoic acid monomer unit, 6-hydroxy-6-ethyloctanoic acid monomer unit, 7-hydroxyheptanoic acid monomer unit, 7-hydroxyoctanoic acid monomer unit, 7-hydroxy-7-methyloctanoic acid monomer unit, 8-hydroxyoctanoic acid monomer unit, 12-hydroxystearic acid monomer unit and 16-hydroxyhexadecanoic acid monomer unit. Specific examples of aliphatic polyhydroxymonocarboxylic acid monomer units include glycelic acid monomer unit, arabinonic acid monomer unit, mannonic acid monomer unit and galactonic acid monomer unit. Specific examples of aliphatic monohydroxypolycarboxylic acid monomer units include malic acid monomer unit and citric acid monomer unit. Specific examples of aliphatic polyhydroxypolycarboxylic acid monomer units include diglycelic acid monomer unit and mannonic acid monomer unit. Specific examples of aromatic monohydroxymonocarboxylic acid monomer units include hydroxybenzoic acid monomer unit and the like. Specific examples of aromatic polyhydroxymonocarboxylic acid monomer units include 2,3-dihydroxybenzoic acid monomer unit, 2,4-dihydroxybenzoic acid monomer unit, 2,5-dihydroxybenzoic acid monomer unit, 2,6-dihydroxybenzoic acid monomer unit, 3,4-dihydroxybenzoic acid monomer unit and 3,5-dihydroxybenzoic acid monomer unit. Specific examples of aromatic monohydroxypolycarboxylic acid monomer units include 4-hydroxyisophtalic acid monomer unit and 5-hydroxyisophtalic acid monomer unit. Specific examples of aromatic polyhydroxypolycarboxylic acid monomer units include 2,5-dihydroxyterephtalic acid monomer unit and the like. Specific examples of hydroxycarboxylic acid monomer units containing a hetero atom include 2-hydroxyethoxyacetic acid monomer unit and 2-hydroxypropoxyacetic acid monomer unit. Among these, with respect to monomer units containing an asymmetric carbon atom therein, monomer units may be of any of D-form and L-form, or may be a mixture of D-form and L-form. Further, these monomer units can be used individually or in combination.

Among the above-mentioned monomer units, from the viewpoint of suppressing the increase in the water absorbability of the copolymer to thereby lower the hydrolysis rate of the copolymer or from the viewpoint of excellent processability (such as extensibility) of the copolymer and high flexibility of the shaped articles, monohydroxymonocarboxylic acid monomer units having 3 or more carbon atoms are preferred. More preferred are aliphatic monohydroxymonocarboxylic acid monomer units having 3 or more carbon atoms, and still more preferred are lactic acid monomer unit, 3-hydroxybutyric acid monomer unit, 4-hydroxybutyric acid monomer unit, 3-hydroxyvaleric acid monomer unit, 6-hydroxyhexanoic acid monomer unit, 12-hydroxystearic acid monomer unit and 16-hydroxyhexadecanoic acid monomer units, and a mixture thereof. Among these, from the viewpoint of ease of obtainment, lactic acid monomer unit, 6-hydroxyhexanoic acid monomer unit and a mixture thereof are especially preferred, most preferably lactic acid monomer unit.

The amount of diglycolic acid monomer units (c) contained in the glycolic acid copolymer of the present invention is 0.10% by mole or less, based on the total molar amount of the components (a), (b) and (c). The present inventors have found that the heat stability and heat aging resistance of a glycolic acid copolymer at the time of shaping can be improved by reducing the amount of diglycolic acid monomer units formed at the early stage of the polycondensation reaction for producing the glycolic acid copolymer. However, it is difficult to completely prevent the formation of the diglycolic acid monomer units and, hence, the amount of the diglycolic acid monomer units (c) in the glycolic acid copolymer of the present invention is generally more than 0% by mole, based on the total molar amount of the components (a), (b) and (c). When the amount of the diglycolic acid monomer units (c) is not more than 0.10% by mole, based on the total molar amount of the components (a), (b) and (c), the glycolic acid copolymer exhibits excellent heat stability and excellent resistance to heat aging. The amount of diglycolic acid monomer units (c) is preferably in the range of from more than 0 to 0.09% by mole, more preferably from 0.01 to 0.08% by mole, based on the total molar amount of the components (a), (b) and (c).

In the present invention, the amount of diglycolic acid monomer units (c) is determined by means of a high-performance liquid chromatography (HPLC) analysis apparatus under the following conditions.

Specifically, a mass of a glycolic acid copolymer is pulverized, followed by drying at 80° C. in a vacuum for 6 hours, thereby obtaining a dried resin. 5 g of the obtained dried resin is weighed and, then, hydrolyzed in 20 ml of an 8 N aqueous NaOH solution at room temperature for 48 hours. To the resultant hydrolysis product is added 12.5 ml of a concentrated hydrochloric acid to thereby obtain an acidified aqueous solution. The obtained acidified aqueous solution is used as a sample solution. With respect to the sample solution, HPLC is performed using a 0.75% by weight aqueous phosphoric acid solution as an eluent under conditions wherein the column temperature is 40° C. and the flow rate of the eluent is 1 ml/minute. In the HPLC, the sample solution is flowed through 2 columns (RSpak (tradename) KC-811, manufactured and sold by Showa Denko K.K., Japan) which are connected in series, and the absorbance of a peak ascribed to diglycolic acid, which is detected by a UV detector (wavelength: 210 nm), is measured. The amount of diglycolic acid monomer units (c) present in a glycolic acid copolymer is expressed in terms of the molar amount (% by mole) of diglycolic acid monomer units (c) contained in the weighed dried resin mentioned above, wherein the molar amount is calculated from the amount of diglycolic acid monomer units present in the weighed dried resin, using a calibration curve of diglycolic acid which has been separately prepared.

The glycolic acid copolymer of the present invention may further comprise, as a component other than glycolic acid monomer units (a), non-glycolic, hydroxycarboxylic acid monomer units (b) and diglycolic acid monomer units (c), at least one member selected from the group consisting of a polyol monomer unit (d) and a polycarboxylic acid monomer unit (e) other than diglycolic acid monomer units, wherein these optional components are used in amounts which do not adversely affect the properties of the present invention.

It is preferred that the polyol monomer unit (d) used in the glycolic acid copolymer of the present invention has 2 or more hydroxyl groups and 2 to 20 carbon atoms in the molecule. The amount of the polyol monomer units (d) is preferably from more than 0% by mole to 0.3% by mole, more preferably from 0.02 to 0.20% by mole, based on the total molar amount of components (a), (b), (c) and (d). Examples of polyol monomer units (d) include aliphatic diol monomer units, such as ethylene glycol monomer unit, 1,3-propanediol monomer unit, 1,2-propanediol monomer unit, 1,4-butanediol monomer unit, 2,3-butanediol monomer unit, 1,5-pentanediol monomer unit, 1,6-hexanediol monomer unit, 1,7-heptanediol monomer unit, 1,8-octanediol monomer unit, 1,9-nonanediol monomer unit, 1,10-decanediol monomer unit, 1,12-dodecanediol monomer unit, 1,4-cyclohexanediol monomer unit, 1,2-cyclohexanediol monomer unit, 1,3-cyclohexanediol monomer unit and neopentyl glycol monomer unit; aromatic diol monomer units, such as bisphenol A monomer unit, catechol monomer unit, resorcinol monomer unit, 1,2-benzenedimethanol monomer unit, 1,3-benzenedimethanol monomer unit and 1,4-benzenedimethanol monomer unit; diol monomer units containing hetero atoms, such as diethylene glycol monomer unit, triethylene glycol monomer unit and tetraethylene glycol monomer unit; aliphatic triol monomer units, such as glycerol monomer unit, 1,2,4-butanetriol monomer unit, trimethylol ethane monomer unit, trimethylol propane monomer unit and butane-1,2,3-triol monomer unit; aromatic triol monomer units, such as 1,2,4-benzenetriol monomer unit and 1,3,5-benzenetriol monomer unit; and saccharide monomer units, such as starch monomer unit, glucose monomer unit, cellulose monomer unit, hemicellulose monomer unit, xylose monomer unit, arabinose monomer unit, mannose monomer unit, galactose monomer unit, xylitol monomer unit, arabinitol monomer unit, mannitol monomer unit, galactitol monomer unit, pentaerythritol monomer unit, chitin monomer unit, chitosan monomer unit, a dextrin monomer unit, a dextran monomer unit, carboxymethyl cellulose monomer unit, amylopectin monomer unit and glycogen monomer unit. These polyol monomer units can be used individually or in combination. Among the above-mentioned compounds, when a compound has an asymmetric carbon atom and, hence, exists as optical isomers, any of the isomers may be used.

Of these polyol monomer units, from the viewpoint of improving the heat stability and heat aging resistance of the glycolic acid copolymer at the time of melt shaping, preferred are monomer units formed from a diol having 3 or more carbon atoms, for example, aliphatic diol monomer units, such as 1,3-propanediol monomer unit, 1,2-propanediol monomer unit, 1,4-butanediol monomer unit, 2,3-butanediol monomer unit, 1,5-pentanediol monomer unit, 1,6-hexanediol monomer unit, 1,7-heptanediol monomer unit, 1,8-octanediol monomer unit, 1,9-nonanediol monomer unit, 1,10-decanediol monomer unit, 1,12-dodecanediol monomer unit, 1,4-cyclohexanediol monomer unit, 1,2-cyclohexanediol monomer unit, 1,3-cyclohexanediol monomer unit and neopentyl glycol monomer unit; and aromatic diol monomer units, such as bisphenol A monomer unit, catechol monomer unit, resorcinol monomer unit, 1,2-benzenedimethanol monomer unit, 1,3-benzenedimethanol monomer unit and 1,4-benzenedimethanol monomer unit.

Among the above-mentioned preferred polyol monomer units, from the viewpoint of obtaining advantages not only in that there can be obtained an improvement in the heat stability and heat aging resistance of the glycolic acid copolymer at the time of melt shaping, but also in that a shaped article having high flexibility can be obtained from the glycolic acid copolymer, it is more preferred to use, as a polyol monomer unit (d), aliphatic diol monomer units, such as 1,3-propanediol monomer unit, 1,2-propanediol monomer unit, 1,4-butanediol monomer unit, 2,3-butanediol monomer unit, 1,5-pentanediol monomer unit, 1,6-hexanediol monomer unit, 1,7-heptanediol monomer unit, 1,8-octanediol monomer unit, 1,9-nonanediol monomer unit, 1,10-decanediol monomer unit, 1,12-dodecanediol monomer unit, 1,4-cyclohexanediol monomer unit, 1,2-cyclohexanediol monomer unit, 1,3-cyclohexanediol monomer unit and neopentyl glycol monomer unit.

On the other hand, for imparting an improved melt tension to the glycolic acid copolymer of the present invention, monomer units derived from a compound having 3 or more hydroxyl groups in the molecule are used as the polyol monomer unit (d). When using such monomer units as the polyol monomer units (d) in the glycolic acid copolymer, for stabilizing the effect of improving the melt tension of the copolymer, it is more preferred to use monomer units derived from a compound having 4 or more carbon atoms and 3 or more hydroxyl groups in the molecule, for example, aliphatic triol monomer units, such as 1,2,4-butanetriol monomer unit, trimethylol ethane monomer unit, trimethylol propane monomer unit and butane-1,2,3-triol monomer unit; aromatic triol monomer units, such as 1,2,4-benzenetriol monomer unit and 1,3,5-benzenetriol monomer unit; and saccharide monomer units, such as xylitol monomer unit, arabinitol monomer unit, mannitol monomer unit, galactitol monomer unit and pentaerythritol monomer unit.

Of these polyol monomer units (d), still more preferred are monomer units derived from a polyol having 5 or more carbon atoms and 2 or 3 hydroxyl groups in the molecule, for example, aliphatic diol monomer units, such as 1,5-pentanediol monomer unit, 1,6-hexanediol monomer unit, 1,7-heptanediol monomer unit, 1,8-octanediol monomer unit, 1,9-nonanediol monomer unit, 1,10-decanediol monomer unit, 1,12-dodecanediol monomer unit, 1,4-cyclohexanediol monomer unit, 1,2-cyclohexanediol monomer unit, 1,3-cyclohexanediol monomer unit and neopentyl glycol monomer unit; and aliphatic triol monomer units, such as trimethylol ethane monomer unit and trimethylol propane monomer unit.

Of these polyol monomer units, especially preferred is neopentyl glycol monomer unit.

As mentioned above, in addition to glycolic acid monomer units (a), non-glycolic, hydroxycarboxylic acid monomer units (b) and diglycolic acid monomer units (c), the glycolic acid copolymer of the present invention may further comprise a polycarboxylic acid monomer unit (e) other than diglycolic acid monomer units, wherein the amount of component (e) is chosen so as not to adversely affect the properties of the present invention.

It is preferred that the polycarboxylic acid monomer unit (e) used in the glycolic acid copolymer of the present invention has 2 or more carboxyl groups and 2 to 20 carbon atoms in the molecule. The amount of polycarboxylic acid monomer units (e) is preferably from more than 0% by mole to 0.10% by mole, more preferably from 0.01 to 0.05% by mole, based on the total molar amount of components (a), (b), (c) and (e). Examples of polycarboxylic acid monomer units (e) include aliphatic dicarboxylic acid monomer units, such as oxalic acid monomer unit, malonic acid monomer unit, glutaric acid monomer unit, succinic acid monomer unit, adipic acid monomer unit, pimelic acid monomer unit, suberic acid monomer unit, azelaic acid monomer unit, sebacic acid monomer unit, undecanedioic acid monomer unit, dodecanedioic acid monomer unit, fumaric acid monomer unit, maleic acid monomer unit and 1,4-cyclohexanedicarboxylic acid monomer unit; aromatic dicarboxylic acid monomer units, such as phthalic acid monomer unit, isophthalic acid monomer unit and terephthalic acid monomer unit; aliphatic tricarboxylic acid monomer units, such as propanetricarboxylic acid monomer unit, trimellitic acid monomer unit, pyromellitic acid monomer unit and 1,3,6-hexanetricarboxylic acid monomer unit; aromatic tricarboxylic acid monomer units, such as 1,2,3-benzenetricarboxylic acid monomer unit, 1,2,4-benzenetricarboxylic acid monomer unit and 1,3,5-benzenetricarboxylic acid monomer unit; and carboxylic acid monomer units having 4 or more carboxyl groups in the molecule, such as ethylenediaminetetraaccetic acid monomer unit. These polycarboxylic acid monomer units can be used individually or in combination.

Of these polycarboxylic acid monomer units (e), preferred are aliphatic dicarboxylic acid monomer units, such as oxalic acid monomer unit, malonic acid monomer unit, glutaric acid monomer unit, succinic acid monomer unit, adipic acid monomer unit, pimelic acid monomer unit, suberic acid monomer unit, azelaic acid monomer unit, sebacic acid monomer unit, undecanedioic acid monomer unit, dodecanedioic acid monomer unit and 1,4-cyclohexanedicarboxylic acid monomer unit; aromatic dicarboxylic acid monomer units, such as phthalic acid monomer unit, isophthalic acid monomer unit and terephthalic acid monomer unit; aliphatic tricarboxylic acid monomer units, such as propanetricarboxylic acid monomer unit, trimellitic acid monomer unit, pyromellitic acid monomer unit and 1,3,6-hexanetricarboxylic acid monomer unit; aromatic tricarboxylic acid monomer units, such as 1,2,3-benzenetricarboxylic acid monomer unit, 1,2,4-benzenetricarboxylic acid monomer unit and 1,3,5-benzenetricarboxylic acid monomer unit.

Further, from the viewpoint of improving the flexibility of the shaped article obtained from the glycolic acid copolymer of the present invention, it is still more preferred to use aliphatic dicarboxylic acid monomer units, such as oxalic acid monomer unit, malonic acid monomer unit, glutaric acid monomer unit, succinic acid monomer unit, adipic acid monomer unit, pimelic acid monomer unit, suberic acid monomer unit, azelaic acid monomer unit, sebacic acid monomer unit, undecanedioic acid monomer unit, dodecanedioic acid monomer unit and 1,4-cyclohexanedicarboxylic acid monomer unit; and aliphatic tricarboxylic acid monomer units, such as propanetricarboxylic acid monomer unit, trimellitic acid monomer unit, pyromellitic acid monomer unit and 1,3,6-hexanetricarboxylic acid monomer unit.

In the present invention, the glycolic acid copolymer may further comprise a monomer unit other than the monomer units mentioned above, as long as the presence of such a further optional monomer unit does not adversely affect the effects of the present invention. Specific examples of such further optional monomer units include amino acid monomer units, such as glycine monomer unit, (+)-alanine monomer unit, β-alanine monomer unit, (−)-asparagine monomer unit, (+)-aspartic acid monomer unit, (−)-cysteine monomer unit, (+)-glutamic acid monomer unit, (+)-glutamine monomer unit, (−)-hydroxylysine monomer unit, (−)-leucine monomer unit, (+)-isoleucine monomer unit, (+)-lysine monomer unit, (−)-methionine monomer unit, (−)-serine monomer unit, (−)-threonine monomer unit, (+)-valine monomer unit, aminobutyric acid monomer unit, azaserine monomer unit, arginine monomer unit and ethionine monomer unit; polyamine monomer units, such as methylhydrazine monomer unit, monomethylenediamine monomer unit, dimethylenediamine monomer unit, trimethylenediamine monomer unit, tetramethylenediamine monomer unit, pentamethylenediamine monomer unit, hexamethylenediamine monomer unit, heptamethylenediamine monomer unit, octamethylenediamine monomer unit, nonamethylenediamine monomer unit, decamethylenediamine monomer unit, undecamethylenediamine monomer unit and dodecamethylenediamine monomer unit; lactam monomer units, such as β-propiolactam monomer unit, α-pyrrolidone monomer unit, α-piperidone monomer unit, ε-caprolactam monomer unit, α-methyl-caprolactam monomer unit, β-methyl-caprolactam monomer unit, γ-metyl-caprolactam monomer unit, δ-methyl-caprolactam monomer unit, α-methyl-caprolactam monomer unit, N-methyl-caprolactam monomer unit, β,γ-dimethyl-caprolactam monomer unit, γ-ethyl-caprolactam monomer unit, γ-isopropyl-caprolactam monomer unit, ε-isopropyl-caprolactam monomer unit, γ-butyl-caprolactam monomer unit, γ-hexacyclobenzyl-caprolactam monomer unit, ω-enantholactam monomer unit, ω-capryllactam monomer unit, caprylolactam monomer unit and laurolactam monomer unit. These optional monomer units can be used individually or in combination. Among the compounds from which these monomer units are derived, when a compound has an asymmetric carbon atom and, hence, exists as optical isomers, any of the isomers may be used.

Further, the glycolic acid copolymer may further comprise a conventional monomer unit containing 2 or more of at least one functional group selected from the group consisting of an isocyanate group and an epoxy group, as long as the presence of such a monomer unit does not adversely affect the effects of the present invention.

It is preferred that the glycolic acid copolymer of the present invention has either a configuration (I) comprising glycolic acid monomer units (a), non-glycolic, hydroxycarboxylic acid monomer units (b) and polyol monomer units (d) or a configuration (II) comprising glycolic acid monomer units (a), non-glycolic, hydroxycarboxylic acid monomer units (b), polyol monomer units (d) and polycarboxylic acid monomer units (e) other than the diglycolic acid monomer units (c). In any of configuration (I) or (II), it is preferred that the amount of diglycolic acid monomer units (c) is zero or a value which is as small as possible.

When the glycolic acid copolymer of the present invention has configuration (I) or (II) mentioned above, there is an advantage that the hydrolysis resistance of the glycolic acid copolymer is improved, or that flexibility is imparted to a shaped article produced from the glycolic acid copolymer.

When the glycolic acid copolymer of the present invention contains the polyol monomer unit (d), it is preferred that the amounts of diglycolic acid monomer units (c), polyol monomer units (d) and polycarboxylic acid monomer units (e) are adjusted so that the difference between the molar amount of hydroxyl groups contained in component (d) and the total molar amount of carboxyl groups contained in components (e) and (c) is 0.10% by mole or less, more advantageously 0.04% by mole or less, based on the total molar amount of hydroxyl groups contained in component (d) and carboxyl groups contained in components (e) and (c). It is especially preferred that the molar amount of hydroxyl groups contained in component (d) and the total molar amount of carboxyl groups contained in components (e) and (c) are substantially the same.

When the glycolic acid copolymer of the present invention has configuration (I) or (II) mentioned above, it is preferred that the total amount of the polyol monomer units (d), the polycarboxylic acid monomer units (e), and the diglycolic acid monomer units (c) is less than 2.0% by mole, based on the total molar amount of components (a), (b), (c), (d) and (e). When the total amount of components (d), (e) and (c) is 2.0% by mole or more, a disadvantage is likely to occur in that the gas barrier property of the glycolic acid copolymer is lowered. From the viewpoint of improving the hydrolysis resistance of the glycolic acid copolymer of the present invention, it is more preferred that the total amount of the polyol monomer units (d), the polycarboxylic acid monomer units (e), and the diglycolic acid monomer units (c) is from more than 0.02 to less than 2.0% by mole, based on the total molar amount of components (a), (b), (c), (d) and (e), and the amount of the polyol monomer units (d) is from 0.02 to less than 2.0% by mole, based on the total molar amount of components (a), (b), (c), (d) and (e).

When the glycolic acid copolymer of the present invention has configuration (I) or (II) mentioned above, the glycolic acid copolymer may contain a compound unit having, in the unit structure thereof, 3 or more of at least one member selected from the group consisting of a hydroxyl group and a carboxyl group. Examples of such compound units include a polyhydroxymonocarboxylic acid monomer unit, a monohydroxypolycarboxylic acid monomer unit, a polyhydroxypolycarboxylic acid monomer unit, polyol monomer unit (d) and polycarboxylic acid monomer unit (e). From the viewpoint of improving the processability (such as extensibility) of the glycolic acid copolymer, the amount of a compound unit having, in the unit structure thereof, 3 or more of at least one member selected from the group consisting of a hydroxyl group and a carboxyl group, is preferably 0.07% by mole or less, more preferably 0.05% by mole or less, still more preferably 0.03% by mole or less, most preferably 0.02% by mole or less, based on the total molar amount of components of the glycolic acid copolymer.

With respect to the molecular structure of the terminal groups of the glycolic acid copolymer of the present invention, there is no particular limitation. Examples of terminal groups include a hydroxyl group, a carboxyl group, an acyl group, an alkyl group, an aryl group and an alkoxyl group.

Hereinbelow, an explanation is made with respect to an example of the method for producing the glycolic acid copolymer of the present invention; however, the method for producing the glycolic acid copolymer of the present invention is not limited to this example.

That is, in one aspect of the present invention, there is provided a method for producing a glycolic acid copolymer, which comprises the steps of:

(A) providing a raw material mixture comprising at least one starting material selected from the group consisting of glycolic acid and a derivative thereof, and a reactant copolymerizable with the at least one starting material, wherein the reactant comprises at least one member selected from the group consisting of a non-glycolic, hydroxycarboxylic acid, a derivative thereof and optionally at least one compound selected from the group consisting of a polyol, a polycarboxylic acid and a derivative of the polycarboxylic acid, and subjecting the raw material mixture to a preliminary polycondensation reaction at a temperature in the range of from 20 to 160° C., thereby obtaining a reaction mixture containing a glycolic acid copolymer prepolymer having a weight average molecular weight of from 700 to 5,000, (B) elevating the temperature of the reaction mixture to 190° C. within a period of 100 minutes as measured from the start of the temperature elevation in step (B), and (C) performing a heat treatment of the reaction mixture at a temperature in the range of from 190 to 300° C. to effect a final polycondensation reaction, wherein the final polycondensation reaction is performed so as to obtain a glycolic acid copolymer having a weight average molecular weight of 10,000 or more, wherein the final polycondensation reaction is performed under conditions wherein the increasing rate of weight average molecular weight of the glycolic acid copolymer being produced is maintained at 1,000 per hour or more until the weight average molecular weight reaches at least 10,000.

Hereinbelow, explanations are made with respect to the raw materials used in the method of the present invention for producing a glycolic acid copolymer.

In the present invention, glycolic acid used as a starting material is a glycolic acid monomer or oligomer. With respect to the glycolic acid oligomer, the weight average molecular weight thereof as measured in the same manner as in the case of the glycolic acid copolymer of the present invention is less than 700. Therefore, in the method of the present invention, as a starting material, there can be used at least one member selected from the group consisting of a glycolic acid monomer, a derivative thereof, a glycolic acid oligomer and a derivative thereof.

Specific examples of derivatives of glycolic acid used as a starting material in the method of the present invention include esters derived from glycolic acid and a $C_1$–$C_{10}$ alcohol, such as methanol, ethanol, propanol, isopropanol, butanol, pentanol, hexanol, cyclohexanol or octanol; and glycolide, which is a cyclic dimeric ester of glycolic acid.

As a starting material, glycolic acid and/or a derivative thereof can be used individually or in combination.

In the method of the present invention, the non-glycolic, hydroxycarboxylic acid used as a reactant copolymerizable with the starting material is a non-glycolic, hydroxycarboxylic acid monomer or oligomer. With respect to the non-glycolic, hydroxycarboxylic acid oligomer, the weight average molecular weight thereof as measured in the same manner as in the case of the glycolic acid copolymer of the present invention is less than 700. Therefore, in the method of the present invention, as a reactant copolymerizable with the starting material, there can be used at least one member selected from the group consisting of a non-glycolic, hydroxycarboxylic acid monomer, a derivative thereof, a non-glycolic, hydroxycarboxylic acid oligomer and a derivative thereof.

Examples of non-glycolic, hydroxycarboxylic acids used as a reactant copolymerizable with glycolic acid and/or a derivative thereof include an aliphatic monohydroxymonocarboxylic acid having 3 or more carbon atoms, an aromatic monohydroxymonocarboxylic acid, an aromatic polyhydroxymonocarboxylic acid, an aromatic monohydroxypolycarboxylic acid, an aromatic polyhydroxypolycarboxylic acid, an aliphatic polyhydroxymonocarboxylic acid, an aliphatic monohydroxypolycarboxylic acid, a polyhydroxypolycarboxylic acid, a hydroxycarboxylic acid having a hetero atom, and lactones. Specific examples of aliphatic monohydroxymonocarboxylic acids having 3 or more carbon atoms include lactic acid, 2-hydroxybutanoic acid, 2-hydroxypentanoic acid, 2-hydroxyhexanoic acid, 2-hydroxyheptanoic acid, 2-hydroxyoctanoic acid, 2-hydroxy-2-methylpropanoic acid, 2-hydroxy-2-methylbutanoic acid, 2-hydroxy-2-ethylbutanoic acid, 2-hydroxy-2-methylpentanoic acid, 2-hydroxy-2-ethylpentanoic acid, 2-hydroxy-2-propylpentanoic acid, 2-hydroxy-2-butylpentanoic acid, 2-hydroxy-2-methylhexanoic acid, 2-hydroxy-2-ethylhexanoic acid, 2-hydroxy-2-propylhexanoic acid, 2-hydroxy-2-butylhexanoic acid, 2-hydroxy-2-pentylhexanoic acid, 2-hydroxy-2-methylheptanoic acid, 2-hydroxy-2-ethylheptanoic acid, 2-hydroxy-2-propylheptanoic acid, 2-hydroxy-2-butylheptanoic acid, 2-hydroxy-2-pentylheptanoic acid, 2-hydroxy-2-hexylheptanoic acid, 2-hydroxy-2-methyloctanoic acid, 2-hydroxy-2-ethyloctanoic acid, 2-hydroxy-2-propyloctanoic acid, 2-hydroxy-2-butyloctanoic acid, 2-hydroxy-2-pentyloctanoic acid, 2-hydroxy-2-hexyloctanoic acid, 2-hydroxy-2-heptyloctanoic acid, 3-hydroxypropanoic acid, 3-hydroxybutanoic acid, 3-hydroxypentanoic acid, 3-hydroxyhexanoic acid, 3-hydroxyheptanoic acid, 3-hydroxyoctanoic acid, 3-hydroxy-3-methylbutanoic acid, 3-hydroxy-3-methylpentanoic acid, 3-hydroxy-3-ethylpentanoic acid, 3-hydroxy-3-methylhexanoic acid, 3-hydroxy-3-ethylhexanoic acid, 3-hydroxy-3-propylhexanoic acid, 3-hydroxy-3-methylheptanoic acid, 3-hydroxy-3-ethylheptanoic acid, 3-hydroxy-3-propylheptanoic acid, 3-hydroxy-3-butylheptanoic acid, 3-hydroxy-3-methyloctanoic acid, 3-hydroxy-3-ethyloctanoic acid, 3-hydroxy-3-propyloctanoic acid, 3-hydroxy-3-butyloctanoic acid, 3-hydroxy-3-pentyloctanoic acid, 4-hydroxybutanoic acid, 4-hydroxypentanoic acid, 4-hydroxyhexanoic acid, 4-hydroxyheptanoic acid, 4-hydroxyoctanoic acid, 4-hydroxy-4-methylpentanoic acid, 4-hydroxy-4-methylhexanoic acid, 4-hydroxy-4-ethylhexanoic acid, 4-hydroxy-4-methylheptanoic acid, 4-hydroxy-4-ethylheptanoic acid, 4-hydroxy-4-propylheptanoic acid, 4-hydroxy-4-methyloctanoic acid, 4-hydroxy-4-ethyloctanoic acid, 4-hydroxy-4-propyloctanoic acid, 4-hydroxy-4-butyloctanoic acid, 5-hydroxypentanoic acid, 5-hydroxyhexanoic acid, 5-hydroxyheptanoic acid, 5-hydroxyoctanoic acid, 5-hydroxy-5-methylhexanoic acid, 5-hydroxy-5-methylheptanoic acid, 5-hydroxy-5-ethylheptanoic acid, 5-hydroxy-5-methyloctanoic acid, 5-hydroxy-5-ethyloctanoic acid, 5-hydroxy-5-propyloctanoic acid, 6-hydroxyhexanoic acid, 6-hydroxyheptanoic acid, 6-hydroxyoctanoic acid, 6-hydroxy-6-methylheptanoic acid, 6-hydroxy-6-methyloctanoic acid, 6-hydroxy-6-ethyloctanoic acid, 7-hydroxyheptanoic acid, 7-hydroxyoctanoic acid, 7-hydroxy-7-methyloctanoic acid, 8-hydroxyoctanoic acid, 12-hydroxystearic acid and 16-hydroxyhexadecanoic acid. A specific example of an aromatic monohydroxymonocarboxylic acid is hydroxybenzoic acid. Specific examples of aromatic polyhydroxymonocarboxylic acids include 2,3-dihydroxybenzoic acid, 2,4-dihydroxybenzoic acid, 2,5-dihydroxybenzoic acid, 2,6-dihydroxybenzoic acid, 3,4-dihydroxybenzoic acid and 3,5-dihydroxybenzoic acid. Specific examples of aromatic monohydroxypolycarboxylic acids include 4-hydroxyisophthalic acid and 5-hydroxyisophthalic acid. A specific example of an aromatic polyhydroxypolycarboxylic acid is 2,5-dihydroxyterephthalic acid. Specific examples of aliphatic polyhydroxymonocarboxylic acids include glyceric acid, arabinonic acid, mannonic acid and galactonic acid. Specific examples of aliphatic monohydroxypolycarboxylic acids include malic acid and citric acid. Specific examples of polyhydroxypolycarboxylic acids include diglyceric acid and mannosaccharic acid. Specific examples of hydroxycarboxylic acids having a hetero atom include (2-hydroxyethoxy)acetic acid and (2-hydroxypropoxy)acetic acid. Specific examples of lactones include β-propiolactone, γ-butyrolactone, δ-valerolactone and ε-caprolactone.

These non-glycolic, hydroxycarboxylic acids can be used individually or in combination. Further, among the above-mentioned compounds, when a compound has an asymmetric carbon atom and, hence, exists as optical isomers, any of the isomers may be used.

Examples of derivatives of non-glycolic, hydroxycarboxylic acids include an ester of the above-mentioned hydroxycarboxylic acid with a $C_1$–$C_{10}$ monofunctional alcohol (e.g., methanol, ethanol, propanol, isopropanol, butanol, pentanol, hexanol or octanol); a cyclic dimeric ester of a non-glycolic, hydroxycarboxylic acid, such as a lactide; and a cyclic dimeric ester of glycolic acid with a non-glycolic, hydroxycarboxylic acid. These compounds may be used individually or in combination.

Among the above-mentioned compounds, from the viewpoint of suppressing the increase in the water absorbability of the copolymer to thereby lower the hydrolysis rate of the copolymer or from the viewpoint of improving the processability (such as extensibility) of the copolymer and improving the flexibility of the shaped articles, a monohydroxycarboxylic acid having 3 or more carbon atoms, a derivative of such a monohydroxycarboxylic acid, or a mixture thereof are preferred in the present invention. It is more preferred that the non-glycolic, hydroxycarboxylic acid is at least one member selected from the group consisting of lactic acid, a lactide, a cyclic dimeric ester of glycolic acid with lactic acid, 3-hydroxybutylic acid and/or β-propiolactone, 4-hydroxybutylic acid and/or γ-butylolactone, 3-hydroxyvaleric acid, 6-hydroxyhexanoic acid and/or ε-caprolactone, 12-hydroxystearic acid, 16-hydroxyhexadecanoic acid, derivatives of the above-mentioned aliphatic hydroxycarboxylic acids, and a mixture thereof. From the viewpoint of ease of obtainment, the non-glycolic, hydroxycarboxylic acid is more preferably lactic acid, a lactide, a cyclic dimeric ester of glycolic acid with lactic acid, 6-hydroxyhexanoic acid and/or ε-caprolactone, derivatives of the above-mentioned aliphatic hydroxycarboxylic acids, or a mixture thereof, most preferably lactic acid, a lactide, a cyclic dimeric ester of glycolic acid with lactic acid, a derivative of lactic acid, or a mixture thereof.

In the present invention, at least one compound selected from the group consisting of a polyol, a polycarboxylic acid and a derivative of the polycarboxylic acid can be used as a raw material which is copolymerizable with glycolic acid and/or a derivative thereof and a non-glycolic, hydroxycarboxylic acid and/or a derivative thereof. Such a polyol, polycarboxylic acid and a derivative of the polycarboxylic acid are used in amounts within the ranges recited in the present invention.

As a polyol used in the present invention, there can be mentioned a compound having 2 or more hydroxyl groups, and a $C_2$–$C_{20}$ polyol is preferred. Specific examples of polyols include aliphatic diols, such as ethylene glycol, 1,3-propanediol, 1,2-propanediol, 1,4-butanediol, 2,3-butanediol, 1,5-pentanediol, 1,6-hexanediol, 1,7-heptanediol, 1,8-octanediol, 1,9-nonanediol, 1,10-decanediol, 1,12-dodecanediol, 1,4-cyclohexanediol, 1,2-cyclohexanediol, 1,3-cyclohexanediol and neopentyl glycol; aromatic diols, such as bisphenol A, catechol, resorcinol, 1,2-benzenedimethanol, 1,3-benzenedimethanol and 1,4-benzenedimethanol; diols containing a heteroatom, such as diethylene glycol, triethylene glycol and tetraethylene glycol; aliphatic triols, such as glycerol, 1,2,4-butanetriol, trimethylolethane, trimethylolpropane and butane-1,2,3-triol; aromatic triols, such as 1,2,4-benzenetriol and 1,3,5-benzenetriol; and sugars, such as starch, glucose, cellulose, hemicellulose, xylose, arabinose, mannose, galactose, xylitol, arabinitol, mannitol, galactitol, pentaerythritol, chitin, chitosan, dextrin, dextran, carboxymethylcellulose, amylopectin and glycogen.

These polyols can be used individually or in combination. Among the above-mentioned compounds, when a compound has an asymmetric carbon atom and, hence, exists as optical isomers, any of the isomers may be used.

From the viewpoint of suppressing the occurrence of side reactions during the polycondensation reaction or from the viewpoint of improving the heat decomposition resistance and heat aging resistance of the copolymer during melt shaping, it is more preferred that the polyol is a diol having 3 or more carbon atoms. Specific examples of diols having 3 or more carbon atoms include aliphatic diols, such as 1,3-propanediol, 1,2-propanediol, 1,4-butanediol, 2,3-butanediol, 1,5-pentanediol, 1,6-hexanediol, 1,7-heptanediol, 1,8-octanediol, 1,9-nonanediol, 1,10-decanediol, 1,12-dodecanediol, 1,4-cyclohexanediol, 1,2-cyclohexanediol, 1,3-cyclohexanediol and neopentyl glycol; and aromatic diols, such as bisphenol A, catechol, resorcinol, 1,2-benzenedimethanol, 1,3-benzenedimethanol and 1,4-benzenedimethanol.

It is more preferred that the polyol is an aliphatic diol, such as 1,3-propanediol, 1,2-propanediol, 1,4-butanediol, 2,3-butanediol, 1,5-pentanediol, 1,6-hexanediol, 1,7-heptanediol, 1,8-octanediol, 1,9-nonanediol, 1,10-decanediol, 1,12-dodecanediol, 1,4-cyclohexanediol, 1,2-cyclohexanediol, 1,3-cyclohexanediol or neopentyl glycol. The use of such an aliphatic diol is advantageous not only in that an improvement is made in the heat stability and heat aging resistance of the copolymer during melt shaping, but also in that there is enabled production of a shaped article having excellent flexibility.

A polyol having 3 or more hydroxyl groups in the molecule is used to improve the melt tension of the copolymer. However, for the copolymer to stably exhibit an improved melt tension, it is more preferred that the polyol is a compound having 4 or more carbon atoms. Examples of such compounds include aliphatic triols, such as 1,2,4-butanetriol, trimethylolethane, trimethylolpropane and butane-1,2,3-triol; aromatic triols, such as 1,2,4-benzenetriol and 1,3,5-benzenetriol; and sugars, such as glucose, xylose, arabinose, mannose, galactose, xylitol, arabinitol, mannitol, galactitol and pentaerythritol.

Among the above-mentioned polyols, more preferred are polyols having 5 or more carbon atoms and 3 or less hydroxyl groups in the molecule. Specific examples of such polyols include aliphatic diols, such as 1,5-pentanediol, 1,6-hexanediol, 1,7-heptanediol, 1,8-octanediol, 1,9-nonanediol, 1,10-decanediol, 1,12-dodecanediol, 1,4-cyclohexanediol, 1,2-cyclohexanediol, 1,3-cyclohexanediol and neopentyl glycol; and aliphatic triols, such as trimethylolethane and trimethylolpropane.

Among these, most preferred is neopentyl glycol.

As a copolymerizable polycarboxylic acid, there can be mentioned a compound having 2 or more carboxyl groups, and a $C_2$–$C_{20}$ polycarboxylic acid is preferred. Specific examples of such polycarboxylic acids include aliphatic dicarboxylic acids, such as oxalic acid, malonic acid, gulutaric acid, succinic acid, adipic acid, pimelic acid, suberic acid, azelaic acid, sebacic acid, undecanedicarboxylic acid, dodecanedicarboxylic acid, fumaric acid, maleic acid and 1,4-cyclohexanedicarboxylic acid; aromatic dicarboxylic acids, such as phthalic acid, isophthalic acid and terephthalic acid; aliphatic tricarboxylic acids, such as propanetricarboxylic acid, trimellitic acid, pyromellitic acid, 1,3,6-hexanetricarboxylic acid; aromatic tricarboxylic acids, such as 1,2,3-benzenetricarboxylic acid, 1,2,4-benzenetricarboxylic acid and 1,3,5-benzenetricarboxylic acid; and tetracarboxylic acids, such as ethylenediaminetetraacetic acid. These compounds can be used individually or in combination.

Examples of derivatives of the polycarboxylic acids include an ester of the polycarboxylic acid with a $C_1$–$C_{10}$ monofunctional alcohol (e.g., methanol, ethanol, propanol, isopropanol, butanol, pentanol, hexanol or octanol); an ester of the polycarboxylic acid with glycolic acid; and an anhydride of the polycarboxylic acid.

Among the above-mentioned polycarboxylic acids, more preferred are aliphatic dicarboxylic acids, such as oxalic acid, malonic acid, gulutaric acid, succinic acid, adipic acid, pimelic acid, suberic acid, azelaic acid, sebacic acid, undecanedicarboxylic acid, dodecanedicarboxylic acid and 1,4-cyclohexanedicarboxylic acid; aromatic dicarboxylic acids, such as phthalic acid, isophthalic acid and terephthalic acid; aliphatic tricarboxylic acids, such as propanetricarboxylic acid, trimellitic acid, pyromellitic acid and 1,3,6-hexanetricarboxylic acid; aromatic tricarboxylic acids, such as 1,2,3-benzenetricarboxylic acid, 1,2,4-benzenetricarboxylic acid and 1,3,5-benzenetricarboxylic acid. Derivatives of these polycarboxylic acids are also more preferred.

From the viewpoint of obtaining a shaped article having excellent flexibility, it is most preferred that a polycarboxylic acid or a derivative thereof is selected from the group consisting of aliphatic dicarboxylic acids, such as oxalic acid, malonic acid, gulutaric acid, succinic acid, adipic acid, pimelic acid, suberic acid, azelaic acid, sebacic acid, undecanedicarboxylic acid, dodecanedicarboxylic acid and 1,4-cyclohexanedicarboxylic acid, and a derivative thereof; and aliphatic tricarboxylic acids, such as propanetricarboxylic acid, trimellitic acid, pyromellitic acid and 1,3,6-hexanetricarboxylic acid, and a derivative thereof.

In addition, other compounds, such an amino acid, a polyamine and a lactam, may be used as a comonomer in an amount which does not adversely affect the properties of the present invention.

As an amino acid used in the present invention, a $C_2$–$C_{20}$ amino acid is preferred. Specific examples of such amino acids include glycine, (+)-alanine, β-alanine, (−)-asparagine, (+)-aspartic acid, (−)-cysteine, (+)-glutamic acid, (+)-glutamine, (−)-hydroxylysine, (−)-leucine, (+)-isoleucine, (+)-lysine, (−)-methionine, (−)-serine, (−)-threonine, (+)-valine, aminolactic acid, azaserine, alginine and ethionine.

As a polyamine used in the present invention, a $C_1$–$C_{20}$ polyamine is preferred. Specific examples of such polyamines include methylhydrazine, monomethylenediamine, dimethylenediamine, trimethylenediamine, tetramethylenediamine, pentamethylenediamine, hexamethylenediamine, heptamethylenediamine, octamethylenediamine, nonanemethylenediamine, decamethylenediamine, undecamethylenediamine and dodecamethylenediamine.

As a lactam used in the present invention, a $C_2$–$C_{20}$ lactam is preferred. Specific examples of such lactams include glycine anhydride, β-propiolactam, α-pyrrolidone, α-piperidone, ε-caprolactam, α-methyl-caprolactam, α-methyl-caprolactam, γ-methyl-caprolactam, δ-methyl-caprolactam, ε-methyl-caprolactam, N-methyl-caprolactam, β,γ-dimethyl-caprolactam, γ-ethyl-caprolactam, γ-isopropyl-caprolactam, ε-isopropyl-caprolactam, γ-butylcaprolactam, γ-hexacyclobenzyl-caprolactam, ω-enantholactam, ω-capryllactam, caprylolactam, laurolactam and a dimer of caprolactone.

Among the above-mentioned compounds, when a compound has an asymmetric carbon atom and the compound exists in a D-form, an L-form or a mixture of D- and L-forms, any one of these forms may be used.

With respect to the forms of the raw materials used (i.e., glycolic acid, a derivative of glycolic acid, and a compound copolymerizable with glycolic acid and/or derivative of glycolic acid), there is no particular limitation. The raw materials may be in the form of a solution (such as an aqueous solution), crystals or a liquid. When the raw material is used in the form of a solution, there is no particular limitation with respect to the concentration thereof in the solution, but it is preferred that the raw material concentration of the solution is at least 40% by weight, more advantageously at least 50% by weight, most advantageously at least 60% by weight.

In the method of present invention, the formulation of the raw material mixture is appropriately selected so as to obtain the glycolic acid copolymer of the present invention after the polycondensation reaction. However, it is preferred that the raw material mixture satisfies the following formulae (1) to (3):

$$0.8 \leq X^1 \leq 0.95 \quad (1),$$

$$0.05 \leq X^2 \quad (2), \text{ and}$$

$$X^1 + X^2 + X_3 + X^4 = 1 \quad (3)$$

wherein:

$X^1$ represents the calculated molar ratio of the at least one starting material selected from the group consisting of glycolic acid and a derivative thereof, $X^2$ represents the calculated molar ratio of the at least one member selected from the group consisting of a non-glycolic, hydroxycarboxylic acid and a derivative thereof, $X^3$ represents the calculated molar ratio of an optional polyol, $X^4$ represents the calculated molar ratio of at least one optional raw material selected from the group consisting of a polycarboxylic acid and a derivative thereof, the calculated molar ratio of each raw material being defined as the ratio of the molar amount of the unit structure obtained by hydrolysis of each raw material to the total molar amount of the unit structures of all raw materials, and each of $X^3$ and $X^4$ is independently 0 or more.

Hereinbelow, explanations are given with respect to "monomer units" used in the present invention and "calculated molar ratio" of each raw material used in step (A) of the method of the present invention.

In the present invention, the term "monomer unit" (of a compound) is used to indicate a minimum unit structure which is obtained by hydrolysis of a copolymer or a compound used as a raw material for the copolymer. More specifically, for example, with respect to glycolic acid and a derivative thereof, the term "glycolic acid monomer unit" (contained in the copolymer of the present invention and in glycolic acid and a derivative thereof) means a unit structure represented by the following formula (I):

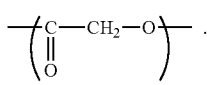

On the other hand, with respect to a non-glycolic, hydroxycarboxylic acid and a derivative thereof, for example lactic acid and a derivative thereof, the term "lactic acid monomer unit" means a unit structure represented by the following formula (II):

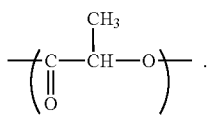

Further, with respect to a polycarboxylic acid and a derivative thereof, for example adipic acid and a derivative thereof, the term "adipic acid monomer unit" means a unit structure represented by the following formula (III):

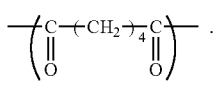

In the present invention, the term "calculated molar ratio" is used to mean the ratio of the molar amount of the unit structure (e.g., a unit structure represented by the formula (I), (II) or (III) above) of each raw material compound (i.e., the starting material or reactant mentioned above) to the total molar amount of the unit structures of all raw material compounds. In the determination of the calculated molar ratio, with respect to a raw material compound used in an amount such that the molar ratio of the unit structure thereof to the total of the unit structures of all raw material compounds is less than 0.00005, the molar ratio of the unit structure of the raw material compound is considered to be 0.

Further, in the determination of the calculated molar ratio, the molar amounts of monofunctional compounds (e.g., monofunctional alcohols and monofunctional carboxylic acids) derived from raw material compounds used are not taken into consideration in the calculation of the total molar amount of the unit structures of all raw material compounds. The reason is as follows. For example, when an ester of a monofunctional $C_1$–$C_{10}$ alcohol with a monofunctional carboxylic acid is used as a raw material compound, some monofunctional alcohols or monofunctional carboxylic acids may be liberated by hydrolysis or the like. As a result, the liberated monofunctional alcohols or monofunctional carboxylic acids may be present in the raw material mixture. Therefore, such monofunctional alcohols and monofunctional carboxylic acids are not taken into consideration in the determination of the calculated molar ratio.

In the present invention, with respect to diglycolic acid and/or diglycolic acid monomer units (i.e., diglycolic acid monomer units present in the ester formed by the condensation of diglycolic acid and glycolic acid) contained in a raw material mixture comprising at least one starting material selected from the group consisting of glycolic acid and a derivative thereof, and a reactant copolymerizable with the at least one starting material, wherein the reactant comprises at least one member selected from the group consisting of a non-glycolic, hydroxycarboxylic acid, a derivative thereof and optionally at least one compound selected from the group consisting of a polyol, a polycarboxylic acid and a derivative of the polycarboxylic acid, it is important that the calculated molar ratio of diglycolic acid and/or diglycolic acid monomer units is less than 0.001, preferably less than 0.0005, more preferably less than 0.0003. When the calculated molar ratio of diglycolic acid and/or diglycolic acid monomer units is 0.001 or more, it is difficult to obtain the glycolic acid copolymer of the present invention.

Further, when the calculated molar ratio of glycolic acid and/or a derivative thereof and the calculated molar ratio of a non-glycolic, hydroxycarboxylic acid and/or a derivative thereof satisfy the formulae (1) and (2) above, respectively, and also the calculated molar ratio of a polycarboxylic acid and/or a derivative thereof satisfies the below-mentioned formula (4), for obtaining an advantage in that a copolymer having high molecular weight and high hydrolysis resistance or a copolymer having high flexibility can be produced at a high polymerization rate, it is preferred that the calculated molar ratio of a polyol is in a range such that the below-mentioned formula (5) is satisfied, more advantageously in a range such that the below-mentioned formula (11) is satisfied, still more advantageously in a range such that the below-mentioned formula (12) is satisfied:

$$\frac{X^4}{X^1 + X^2} \leq 0.001, \qquad (4)$$

$$0 < \frac{X^3}{X^1 + X^2} \leq 0.01, \qquad (5)$$

$$0.0002 \leq \frac{X^3}{X^1 + X^2} \leq 0.005, \text{ and} \qquad (11)$$

$$0.0002 \leq \frac{X^3}{X^1 + X^2} \leq 0.003, \qquad (12)$$

wherein $X^1$ to $X^4$ are as defined for formulae (1) to (3) above, provided that $X^3$ is more than 0, and $X^4$ is 0 or more.

On the other hand, when the calculated molar ratio of glycolic acid and/or a derivative thereof and the calculated molar ratio of a non-glycolic, hydroxycarboxylic acid and/or a derivative thereof satisfy the formulae (1) and (2) above, respectively, and also the calculated molar ratio of a polycarboxylic acid and/or a derivative thereof satisfies the below-mentioned formula (6), it is preferred that the calculated molar ratio of a polyol is in a range such that the below-mentioned formula (7) is satisfied, more advantageously in a range such that the below-mentioned formula (13) is satisfied, still more advantageously in a range such that the below-mentioned formula (14) is satisfied:

$$0.001 < \frac{X^4}{X^1 + X^2} \leq 0.088, \qquad (6)$$

$$1 \leq \frac{X^3}{X^4} \leq 2, \qquad (7)$$

$$1 \leq \frac{X^3}{X^4} \leq 1.7, \text{ and} \qquad (13)$$

$$1 \leq \frac{X^3}{X^4} \leq 1.5, \qquad (14)$$

wherein $X^1$ to $X^4$ are as defined for formulae (1) to (3) above, provided that each of $X^3$ and $X^4$ is more than 0.

Further, for producing a glycolic acid copolymer having excellent gas barrier property, it is especially preferred that the calculated molar ratios of glycolic acid and/or a derivative thereof, a non-glycolic, hydroxycarboxylic acid and/or a derivative thereof, a polycarboxylic acid and a polyol are within ranges such that the following formula (8) is satisfied:

$$0.0002 \leq \frac{X^3 + X^4}{X^1 + X^2 + X^3 + X^4} < 0.02, \tag{8}$$

wherein $X^1$ to $X^4$ are as defined for formulae (1) to (3) above, provided that $X^3$ is more than 0, and $X^4$ is 0 or more.

In the present invention, when the reactant comprises a compound unit having, in the unit structure thereof, 3 or more of at least one member selected from the group consisting of a hydroxyl group and a carboxyl group, such as a polyhydroxymonocarboxylic acid, a monohydroxypolycarboxylic acid, a polyhydroxypolycarboxylic acid, a polyol or a polycarboxylic acid, it is preferred that the calculated molar ratio of the reactant is 0.0007 or less, more advantageously 0.0005 or less, still more advantageously 0.0003 or less. When the calculated molar ratio of the reactant exceeds the above-mentioned range, it is possible that the processability (such as extensibility) of the obtained copolymer is lowered.

Polycondensation reaction can be performed without using a catalyst; however, a catalyst may be optionally used for increasing the reaction rate.

As examples of catalysts, there can be mentioned metals belonging to Groups 1 to 5, 8 to 10, 14 and 15 of the Periodic Table, and compounds containing these metals, such as metal salts, metal oxides, metal hydroxides, metal alkoxides and metal sulfonates. (The "Periodic Table" mentioned herein is that prescribed in the IUPAC (International Union of Pure and Applied Chemistry) nomenclature system (1989).) Specific examples of catalysts include metals, such as titanium, zirconium, niobium, tungsten, zinc, germanium, tin and antimony; metal oxides, such as magnesium oxide, titanium oxide, zinc oxide, germanium oxide, silica, alumina, tin oxide and antimony oxide; metal salts, such as tin fluoride, antimony fluoride, magnesium chloride, aluminum chloride, zinc chloride, stannous chloride, stannic chloride, stannous bromide, stannic bromide, aluminum sulfate, zinc sulfate, tin sulfate, magnesium carbonate, calcium carbonate and zinc carbonate; metal hydroxides, such as lithium hydroxide, sodium hydroxide, potassium hydroxide, magnesium hydroxide, calcium hydroxide, strontium hydroxide, barium hydroxide, aluminum hydroxide, zirconium hydroxide, iron hydroxide, cobalt hydroxide, nickel hydroxide, copper hydroxide and zinc hydroxide; metal carboxylates, such as magnesium acetate, aluminum acetate, zinc acetate, tin acetate, tin octanoate, tin stearate, iron lactate and tin lactate; alkoxides of metals, such as magnesium, lanthanoid, titanium, hafnium, iron, germanium, tin and antimony; organometallic compounds, such as dibutyltin oxide; organosulfonates, such as tin methanesulfonate, tin trifluoromethanesulfonate and tin p-toluenesulfonate; and ion exchange resins, such as Amberlite and Dowex.

Further examples of catalysts include inorganic acids, such as hydrochloric acid, perchloric acid, nitric acid, nitrous acid, sulfuric acid, sulfurous acid, phosphoric acid, phosphorous acid and polyphosphoric acid; and organic acids, such as p-toluenesulfonic acid, naphthalenesulfonic acid and methanesulfonic acid.

The catalyst usable in the present invention is not limited to those mentioned above. The above-mentioned catalysts can be used individually or in combination.

In the present invention, a catalyst can be used, for example, by directly adding the catalyst to the raw material monomers or to the monomer solutions including aqueous monomer solutions, or by adding the catalyst to a polycondensation product just after the production thereof. Further, if desired, a catalyst can be used by a method in which the catalyst is subjected to hydrolysis in the presence of water and/or a hydroxycarboxylic acid, and the resultant hydrolysis product is added to the raw material monomers or a polycondensation product. With respect to the molecular weight and the like of the above-mentioned polycondensation product, there is no particular limitation, so long as the polycondensation product can be subjected to further melt polycondensation.

With respect to the amount of catalyst to be used, it is preferred that the catalyst is used in an amount within the range of from $1 \times 10^{-10}$ mole to $1 \times 10^{-2}$ mole per g of the monomers used as raw materials, in terms of the metal atoms contained in the catalyst. When the amount of the catalyst used is less than $1 \times 10^{-10}$ mole per g of the monomers used as raw materials, in terms of the metal atoms contained in the catalyst, the effect of increasing the polycondensation reaction rate cannot be fully exhibited. On the other hand, when the amount of the catalyst used is more than $1 \times 10^{-2}$ mole per g of the monomers used as raw materials, in terms of the metal atoms contained in the catalyst, marked occurrence of side reactions, such as discoloration, is likely to be caused.

For suppressing the occurrence of discoloration caused by the heat deterioration during a polycondensation reaction, the reaction can be performed using a discoloration inhibitor. A discoloration inhibitor may be used as such, or by dissolving or dispersing it in an appropriate liquid prior to use. With respect to the timing of introducing a discoloration inhibitor to the reaction system, there is no particular limitation, and a discoloration inhibitor can be introduced to the reaction system at any time between the time of concentration of monomer solutions or condensation of raw material monomers and the time of substantial completion of the polycondensation reaction. The introduction of a discoloration inhibitor may be performed at a time or portionwise.

Preferred examples of discoloration inhibitors used in the polycondensation reaction include phosphoric acid compounds, such as phosphoric acid, trimethyl phosphate, triethyl phosphate, triphenyl phosphate, polyphosphoric acid monoethyl ester, polyphosphoric acid diethyl ester, pyrophosphoric acid, triethyl pyrophosphate, hexamethylpyrophosphoric amide, phosphorous acid, triethyl phosphite, triphenyl phosphite, tris(2-tert-butylphenyl)phosphite, tris(2,4-di-tert-butylphenyl)phosphite, tris(2,5-di-tert-butylphenyl)phosphite, tris(2-tert-butyl-4-methylphenyl)phosphite, tris(2-tert-butyl-5-methylphenyl)phosphite, tris(2-tert-butyl-4,6-dimethylphenyl)phosphite, trisnonylphenyl phosphite, tris(mononylphenyl)phosphite and tris(dinonylphenyl)phosphite.

These discoloration inhibitors can be used individually or in combination. The amount of discoloration inhibitor to be used is preferably from 0.0005 to 10% by weight, more preferably from 0.005 to 6% by weight, based on the total weight of the raw material monomers. Even when a discoloration inhibitor is used in an amount of more than 10% by weight, based on the total weight of the raw material monomers, the effect of suppressing the occurrence of discoloration cannot be increased. On the other hand, when a discoloration inhibitor is used in an amount of less than 0.0005% by weight, based on the total weight of the raw material monomers, the effect of suppressing the occurrence of discoloration is not satisfactory. With respect to the timing of introducing these discoloration inhibitors, there is no particular limitation. Discoloration inhibitors may be added directly to the raw material mixture or may be introduced into the polycondensation reaction system during the polycondensation reaction or after completion of the polycondensation reaction.

Next, explanations are made with respect to steps (A), (B) and (C) of the method for producing the glycolic acid copolymer of the present invention.

<Step (A)>

In step (A), a raw material mixture comprising at least one starting material selected from the group consisting of glycolic acid and a derivative thereof, and a reactant copolymerizable with the at least one starting material is provided, wherein the reactant comprises at least one member selected from the group consisting of a non-glycolic, hydroxycarboxylic acid, a derivative thereof and optionally at least one compound selected from the group consisting of a polyol, a polycarboxylic acid and a derivative of the polycarboxylic acid, and the raw material mixture is subjected to a preliminary polycondensation reaction at a temperature in the range of from 20 to 160° C., preferably from 50 to 160° C., more preferably from 80 to 160° C., thereby obtaining a reaction mixture containing a glycolic acid copolymer prepolymer having a weight average molecular weight of from 700 to 5,000, preferably from 1,000 to 4,000, more preferably from 1,200 to 3,000.

When the polycondensation reaction temperature is less than 20° C., the reaction rate becomes extremely low. On the other hand, when the polycondensation reaction temperature is more than 160° C., the polycondensation reaction rate becomes high; however, the formation of diglycolic acid monomer units in the glycolic acid copolymer prepolymer by the occurrence of a side reaction is promoted, thus causing problems not only in that the polymerization of the glycolic acid copolymer prepolymer in the subsequent polycondensation step is rendered difficult, but also in that the heat stability of the obtained glycolic acid copolymer is lowered.

When the weight average molecular weight of the glycolic acid copolymer prepolymer obtained in step (A) is less than 700, such a low weight average molecular weight is insufficient for suppressing the formation of diglycolic acid monomer units in the glycolic acid copolymer during the subsequent polycondensation reaction performed at high temperatures. When the weight average molecular weight of the glycolic acid copolymer prepolymer obtained in step (A) is more than 5,000, depending on the composition of the glycolic acid copolymer prepolymer and the types and molecular weights of the comonomers, the glycolic acid copolymer prepolymer is likely to deposit, rendering difficult the continuation of the polycondensation reaction in a molten state.

In step (A), it is not necessary that the reaction be performed at a constant temperature, as long as the reaction temperature is maintained in the range of from 20 to 160° C. That is, the reaction may be performed while gradually elevating or lowering the reaction temperature, or while performing such temperature manipulations in combination. In the subsequent step (B), the temperature of the reaction mixture is elevated to 190° C. within a period of 100 minutes as measured from the start of the temperature elevation in step (B). The starting point of the temperature elevation in step (B) (i.e., the end point of step (A)) is defined as the point in time at which the temperature elevation is started while the weight average molecular weight of the glycolic acid copolymer prepolymer is still in the range of from 700 to 5,000. However, in the case where the temperature elevation is repeated several times or an operation comprising elevation and lowering of the temperature is performed at least one time after the weight average molecular weight of the glycolic acid copolymer prepolymer reached 700, the starting point of the temperature elevation in step (B) (i.e., the end point of step (A)) is defined as the starting point of the last temperature elevation.

The reaction in step (A) is preferably performed in an atmosphere of at least one inert gas selected from the group consisting of nitrogen gas, helium gas, neon gas, argon gas, krypton gas, xenon gas, carbon dioxide gas and a gaseous saturated $C_1$–$C_4$ lower hydrocarbon, and/or under reduced pressure. When the reaction in step (A) is performed under reduced pressure, the pressure is generally in the range of from 1.3 Pa to $1.014 \times 10^5$ Pa, depending on the composition of the glycolic acid copolymer prepolymer, the types of comonomers and the reaction temperature. When performing the reaction in step (A), it is preferred to employ a method in which the reaction is performed under atmospheric pressure and optionally under a stream of an inert gas, or a method in which the reaction is performed under reduced pressure and optionally under a stream of an inert gas, or a combination of these methods. It is also preferred to employ a method in which the polycondensation reaction is performed while changing stepwise the reaction temperature and/or the pressure. The reaction can be performed using a single reactor or a combination of a plurality of reactors.

<Step (B)>

In step (B), the temperature of the reaction mixture obtained in step (A) containing a glycolic acid copolymer prepolymer having a weight average molecular weight of 700 to 5,000 is elevated from the reaction temperature employed in step (A) to 190° C. within a period of 100 minutes, preferably within a period of 80 minutes, more preferably within a period of 60 minutes, as measured from the start of the temperature elevation in step (B). There is no particular limitation with respect to the lower limit of the time for the temperature elevation. However, the lower limit of the time for the temperature elevation is preferably 0.1 second, more preferably 1 minute.

When the reaction temperature after performing the temperature elevation is less than 190° C., or when the temperature elevation time to reach 190° C. is more than 100 minutes, the reaction rate of the formation of diglycolic acid monomer units is not satisfactorily low, as compared to the polycondensation reaction rate and, hence, a problem arises in that a high molecular weight glycolic acid copolymer exhibiting excellent melt heat stability cannot be obtained by the polycondensation reaction in the subsequent step (C).

In step (B), the reaction temperature is elevated from that employed in step (A) to 190° C. within a period of 100 minutes. It is not necessary that the temperature elevation rate be constant. That is, the reaction temperature may be elevated gradually or, alternatively, there may be employed temperature elevation conditions wherein the temperature elevation is temporarily stopped to temporarily maintain a constant temperature, followed by resuming the temperature elevation, to thereby elevate the temperature to 190° C.

Further, in step (B), it is preferred that the temperature elevation is performed under conditions wherein the average increasing rate of weight average molecular weight of the glycolic acid copolymer prepolymer is 300 per hour or more as measured from the end point of step (A) (i.e., the starting point of step (B)) to the point in time at which the reaction temperature reaches 190° C. It is preferred that the increasing rate of weight average molecular weight is as high as possible, from the viewpoint of suppressing the formation of diglycolic acid monomer units in the glycolic acid copolymer being produced.

There is no particular limitation with respect to the method of the temperature elevation in step (B). For example, when at least a portion of the reaction in step (A) and the reaction in step (C) subsequent to step (B) are performed using the same reactor, the temperature elevation in step (B) can be conducted in the reactor while continuing the polycondensation reaction under reduced pressure using the reactor or, alternatively, the temperature elevation in step (B) can be conducted by a method in which a reactor having a heat exchanger connected thereto is used, and the reaction mixture is withdrawn from the reactor and circulated through the heat exchanger to elevate the temperature of the reaction mixture, whereupon the temperature-elevated reaction mixture is recycled to the reactor, optionally followed by further temperature elevation in the reactor (that is, the temperature of the reaction mixture is elevated by the reactor and/or the heat exchanger). When the reaction in step (A) and the reaction in step (C) are performed using different reactors, the temperature elevation of step (B) can be performed while transferring the reaction mixture from the reactor used in step (A) to the reactor used in step (C) through a pipeline. These methods may be used in combination.

<Step (C)>

In step (C), a heat treatment of the reaction mixture is performed at a temperature in the range of from 190 to 300° C. to effect a final polycondensation reaction, wherein the final polycondensation reaction is performed so as to obtain a glycolic acid copolymer having a weight average molecular weight of 10,000 or more, wherein the final polycondensation reaction is performed under conditions wherein the increasing rate of weight average molecular weight of the glycolic acid copolymer being produced is maintained at 1,000 per hour or more, preferably 2,000 per hour or more, more preferably 3,000 per hour or more, until the weight average molecular weight reaches at least 10,000.

The reaction temperature is preferably in the range of from 190 to 250° C., more preferably from 190 to 230° C.

The increasing rate (hereinafter, frequently abbreviated as "M") of weight average molecular weight per hour in step (C) which is performed after the reaction temperature reaches 190° C. until the weight average molecular weight of the glycolic acid copolymer being produced reaches at least 10,000, means a value represented by the following formula:

$$M=(10{,}000-Mw1)/T1$$

wherein:
Mw1 represents the weight average molecular weight at the point in time at which the reaction temperature reaches 190° C., and T1 represents the time (hour) which is taken by the weight average molecular weight to reach 10,000 after the reaction temperature reaches 190° C.

When the reaction temperature for producing the glycolic acid copolymer having a weight average molecular weight of 10,000 or more is less than 190° C., or when the increasing rate of weight average molecular weight is maintained at less than 1,000 per hour until the weight average molecular weight reaches at least 10,000 after the reaction temperature reaches 190° C. or more, the reaction rate of the formation of diglycolic acid monomer units is not satisfactorily low, as compared to the polycondensation reaction rate and, hence, a problem arises in that a high molecular weight glycolic acid copolymer exhibiting excellent melt heat stability can not be obtained. On the other hand, when the polycondensation reaction is performed at a temperature of more than 300° C., the occurrence of discoloration of the glycolic acid copolymer, due to the heat decomposition, becomes marked.

In step (C), the increasing rate of weight average molecular weight is maintained at 1,000 per hour or more until the weight average molecular weight reaches at least 10,000. It is not necessary that the reaction temperature be constant in the range of from 190 to 300° C. That is, the reaction temperature may be gradually elevated or lowered, or such temperature manipulations may be performed in combination.

There is no particular limitation with respect to the method for adjusting the polycondensation reaction rate to fall within the range required in the method of the present invention. For example, the polycondensation reaction rate required in the method of the present invention can be attained by controlling the reaction conditions, such as the reaction temperature, the reaction pressure, the interfacial area between the glycolic acid copolymer in a molten state and the gaseous phase during the reaction (i.e., molten polymer/gaseous phase interfacial area), and the degree of agitation of the glycolic acid copolymer in a molten state during the reaction.

The reaction can be performed under a stream of at least one inert gas selected from the group consisting of nitrogen gas, helium gas, neon gas, argon gas, krypton gas, xenon gas, carbon dioxide gas and a gaseous saturated $C_1$–$C_4$ lower hydrocarbon, and/or under reduced pressure. For increasing the polycondensation reaction rate, the reaction is preferably performed under reduced pressure. When the reaction is performed under reduced pressure, the pressure is varied depending on the composition of the glycolic acid copolymer, the types of comonomers, the reaction temperature and the type and amount of a catalyst; however, the pressure is generally in the range of from 1.3 Pa to $1.3 \times 10^3$ Pa, preferably from $1.3 \times 10$ Pa to $9.3 \times 10^2$ Pa, more preferably from $6.5 \times 10$ Pa to $6.7 \times 10^2$ Pa. When the pressure is within the above-mentioned pressure range, the reaction may be performed under a stream of an inert gas. Further, the operating conditions in this step, such as the reaction temperature and reaction pressure, may be varied within appropriate ranges as long as the requirements (concerning the temperature and the increasing rate of weight average molecular weight) in the method of the present invention are satisfied.

With respect to the interfacial area between the glycolic acid copolymer in a molten state and the gaseous phase during the reaction (i.e., molten polymer/gaseous phase interfacial area), there is no particular limitation. The larger this interfacial area, the easier the distillation off of condensation water from the reaction system, thus facilitating the polycondensation reaction. Therefore, it is preferred that the interfacial area between the glycolic acid copolymer in a molten state and the gaseous phase during the reaction, is as large as possible.

On the other hand, with respect to the degree of agitation of the glycolic acid copolymer in a molten state during the reaction, the higher the degree of agitation, the easier the distillation off of condensation water from the reaction system, thus facilitating the polycondensation reaction. Therefore, it is preferred that the degree of agitation of the glycolic acid copolymer in a molten state during the reaction is as high as possible.

In step (C), with respect to the time for the polycondensation reaction, there is no particular limitation, as long as a glycolic acid copolymer having a weight average molecular weight of 10,000 or more can be produced under conditions wherein the increasing rate of weight average molecular weight of the glycolic acid copolymer is maintained at 1,000 per hour or more until the weight average molecular weight of the glycolic acid copolymer reaches at least 10,000. For example, the reaction time is preferably in the range of from 10 minutes to 9 hours, more preferably from 30 minutes to 4.5 hours, still more preferably from 45 minutes to 3.5 hours.

In step (C), the glycolic acid copolymer of the present invention having a weight average molecular weight of 50,000 or more can be obtained by appropriately selecting the reaction temperature, the reaction time, the reaction apparatus and the like. Alternatively, the glycolic acid copolymer of the present invention having a weight average molecular weight of 50,000 or more can be obtained by a method in which, after obtaining a glycolic acid copolymer having a weight average molecular weight of less than 50,000 in step (C), the polycondensation reaction is continued under conditions which do not satisfy the requirements of step (C), for example, at a temperature lower than the temperature range required in step (C). Needless to say, the glycolic acid copolymer of the present invention having a weight average molecular weight of 50,000 or more can also be obtained by a method in which, after obtaining a glycolic acid copolymer having a weight average molecular weight of 50,000 or more in step (C), the polycondensation reaction is continued under conditions which do not satisfy the requirements of step (C), for example, at a temperature lower than the temperature range required in step (C), thereby further increasing the weight average molecular weight of the glycolic acid copolymer being produced.

Hereinbelow, an explanation is made with respect to an additional polycondensation reaction performed after step (C).

After completion of step (C), with respect to the glycolic acid copolymer obtained in step (C), the polycondensation reaction may be continued at a temperature in the range of from 190 to 300° C.

When the polycondensation reaction is continued, the reaction time can be arbitrarily chosen, depending on the composition of the desired glycolic acid copolymer, the types of comonomers, the molecular weight of the desired glycolic acid copolymer, the type of the polycondensation reactor used and the reaction conditions. The reaction time is preferably in the range of from 1 minute to 200 hours, more preferably from 10 minutes to 150 hours, still more preferably from 1 to 120 hours, most preferably from 1.5 to 100 hours.

In the additional polycondensation reaction performed after step (C), a high molecular weight glycolic acid copolymer having a weight average molecular weight of from more than 10,000 to 1,000,000 can be obtained by appropriately selecting the type and amount of a catalyst, the reactor and the reaction conditions.

Further, in the present invention, after completion of step (C), a conventional bi or more-functional compound having at least one member selected from the group consisting of an isocyanate group and an epoxy group may be added to the glycolic acid copolymer in a molten state, wherein the amount of the compound is chosen so as not to adversely affect the effects of the present invention. The amount of the compound is in the range of from 0.05 to 5 parts by weight, relative to 100 parts by weight of the glycolic acid copolymer.

The reactions in steps (A), (B) and (C), and the additional polycondensation reaction performed after step (C) may be performed using the same reactor or different reactors. Further, each of these reactions can be performed in batchwise manner or in continuous manner.

With respect to any of the polycondensation reaction performed in the method of the present invention and the additional polycondensation reaction performed after step (C) of the method of the present invention, the reactor used is not particularly limited. For example, the following reactors can be used: an agitation type reactor vessel optionally provided with a baffle plate; a surface-renewal agitation type reactor vessel; a wiped film type reactor; a centrifugal wiped film evaporation type reactor; a surface-renewal type twin-screw kneading reactor; a wall-wetting fall rector; a free-fall polymerizer having a perforated plate; a guide-wetting fall polymerizer having a perforated plate and at least one guide (e.g., a wire) provided in association with the perforated plate (e.g., a wire-wetting fall reactor having a perforated plate) These reactors can be used individually or in combination. Further, these reactors can be used in combination with a conventional heat exchanger as a means for achieving the temperature elevation rate required in the method of the present invention.

When an agitation type reactor vessel is used as a reactor, if desired, the agitation type reactor vessel may be provided with a baffle plate and a conventional impeller.

There is no particular limitation with respect to the shape and installation method of a baffle plate. For reference information of examples of the shapes and installation methods of baffle plates, reference can be made, for example, to "Kagaku Sochi (Chemical Equipment)", September edition, p. 13 (published by Kogyo Chosakai Publishing Inc., Japan, 1981).

Specific examples of impellers include a propeller, an angled blade paddle, a plane blade paddle, a pitched blade paddle, a disc turbine blade paddle, a curved blade paddle, a Pfaudler type impeller, a Bulmarzin type impeller, a max blend impeller, a helical screw impeller, a helical ribbon impeller, an anchor impeller, a screw anchor impeller, a paddle impeller, a helical impeller and the like described in "Kagaku Kougaku Benran (Chemical Engineering Handbook)" 5th edition, 5th print, p. 887–919 (published by MARUZEN CO., LTD., Japan, 1995); a double ribbon impeller described in "Kagaku Sochi (Chemical Equipment)" September edition, p. 11–17 (published by Kogyo Chosakai Publishing Inc., 1981) and "LOGBORN" (tradename) manufactured and sold by Shinko Pantec Co., Ltd., Japan.

Specific examples of surface-renewal agitation type reactor vessels include "Advance Ribbon Reactor" (AR) (tradename) and "Vertical Cone Reactor" (VCR) (tradename), both manufactured and sold by Mitsubishi Heavy Industries, Ltd., Japan; "LOGBORN" (tradename) manufactured and sold by Shinko Pantec Co., Ltd., Japan; "Lattice-Type Twisting Blade Polymerizer" (tradename) manufactured and sold by Hitachi, Ltd., Japan; "Super Blend" (tradename) (a concentric biaxial mixing vessel) manufactured and sold by Sumitomo Heavy Industries, Ltd., Japan; and "Vistar" (tradename) (an agitator for high-viscosity liquids) manufactured and sold by Nissen Co., Ltd., Japan.

Specific examples of surface-renewal type twin-screw kneading reactors include "Horizontal Biaxial Reactor for High-Viscosity Liquids" (HVR) (tradename), "Self-Cleaning Type Reactor" (SCR) (tradename) and "New Self-Cleaning Type Reactor" (N-SCR) (tradename), each manufactured and sold by Mitsubishi Heavy Industries, Ltd., Japan; "Hitachi Spectacle-Shaped Blade Processor for High-Viscosity Liquids" (tradename) and "Lattice Blade Type Polymerizer" (tradename), both manufactured and sold by Hitachi, Ltd., Japan; "BIVOLAK" (tradename), manufactured and sold by Sumitomo Heavy Industries, Ltd., Japan; and "KRC Kneader" (tradename) manufactured and sold by Kurimoto Ltd., Japan.

With respect to a free-fall polymerizer having a perforated plate, reference can be made to, for example, U.S. Pat. No. 5,596,067.

With respect to a guide-wetting fall polymerizer, reference can be made to, for example, U.S. Pat. Nos. 5,589,564, 5,840,826, 6,265,526 and 6,320,015.

In the method of the present invention, it is preferred that the polycondensation reaction is performed using at least one reactor selected from the group consisting of a vertical agitation type reactor vessel and a surface-renewal agitation type reactor vessel. When an additional polycondensation is performed after step (C) of the method of the present invention, it is preferred that the additional polycondensation is performed using at least one reactor selected from the group consisting of a vertical agitation type reactor vessel, a surface-renewal agitation type reactor vessel, a surface-renewal type twin-screw kneading reactor, a wall-wetting fall reactor, a free-fall polymerizer having a perforated plate, and a guide-wetting fall polymerizer having a perforated plate and at least one guide provided in association with the perforated plate.

When an additional melt polycondensation is performed after step (C) of the method of the present invention, it is more preferred that the molten glycolic acid copolymer is treated with an inert gas to thereby cause the molten glycolic acid copolymer to absorb the inert gas, and the resultant molten glycolic acid copolymer is subjected to further polycondensation reaction under reduced pressure. Differing from the case of a molten glycolic acid copolymer not having an inert gas absorbed therein, when a molten glycolic acid copolymer having an inert gas absorbed therein is subjected to polycondensation, vigorous foaming of the molten glycolic acid copolymer occurs, thereby improving the degree of agitation at the surface and inner portions of the molten glycolic acid copolymer. Accordingly, the polycondensation rate of the glycolic acid copolymer becomes increased.

Specific examples of inert gases absorbed into the molten glycolic acid copolymer include nitrogen gas, helium gas, neon gas, argon gas, krypton gas, xenon gas, carbon dioxide gas and a gaseous saturated $C_1$–$C_4$ lower hydrocarbon. Nitrogen gas is preferred. These gases can be used individually or in combination.

The glycolic acid copolymer obtained after steps (A) to (C) of the method of the present invention or after an additional polycondensation performed subsequent to step (C) may be granulated.

There is no particular limitation with respect to the method for granulating the glycolic acid copolymer. For example, there can be mentioned a method in which a molten glycolic acid copolymer is solidified under an atmosphere of at least one gas selected from the group consisting of air and inert gases, such as nitrogen gas, helium gas, neon gas, argon gas, krypton gas, xenon gas, carbon dioxide gas and a gaseous saturated $C_1$–$C_4$ lower hydrocarbon, to thereby obtain a bulk or strand of the glycolic acid copolymer, and the obtained bulk or strand of the glycolic acid copolymer is pulverized or cut into pieces to obtain a granulated or pelletized glycolic acid copolymer; a method in which a molten glycolic acid copolymer is contacted with a liquid (such as water) to granulate or pelletize the glycolic acid copolymer; a method in which a molten glycolic acid copolymer is contacted with a liquid (such as water) to thereby obtain a bulk of the glycolic acid copolymer, and the obtained bulk of the glycolic acid copolymer is pulverized to obtain a granulated glycolic acid copolymer; and a method in which a molten glycolic acid copolymer is transferred into an extruder, followed by extrusion and pelletization of the glycolic acid copolymer. There is no particular limitation with respect to the method for contacting a molten glycolic acid copolymer with a liquid (such as water) and, for example, spherical pellets can be obtained by dropwise adding a molten glycolic acid copolymer to water, thereby solidifying the glycolic acid copolymer.

There is no particular limitation with respect to the shape of the granulated or pelletized glycolic acid copolymer and, in general, the glycolic acid copolymer may be in the form of a powder, a granule, a chip, a sphere, a cylinder, a tablet or a marble. There is no particular limitation with respect to the particle diameter of the glycolic acid copolymer. In general, the smaller the particle diameter of a solid polymer, the larger the surface area of the solid polymer, and thus, a smaller particle diameter is advantageous from the viewpoint of facilitating the polymerization reaction. However, the handling properties of the particulate glycolic acid copolymer decrease with the decrease in the particle diameter thereof. Therefore, the particle diameter of the particulate glycolic acid copolymer is generally in the range of from 10 μm to 20 mm, preferably from 0.1 mm to 10 mm.

When the glycolic acid copolymer is granulated by contacting a molten glycolic acid copolymer with a liquid (such as water), the granulated glycolic acid copolymer may be dried by a conventional method after granulation.

When the glycolic acid copolymer obtained by the method of the present invention is a crystallizable polymer, it is preferred that the glycolic acid copolymer is subjected to a crystallization treatment and, then, a solid phase polymerization, wherein the crystallization treatment is one member selected from the group consisting of the following cases (i), (ii) and (iii): (i) a crystallization treatment which is performed after the granulation of the glycolic acid copolymer, (ii) a crystallization treatment which is performed before the granulation of the glycolic acid copolymer, and (iii) a crystallization treatment which is performed simultaneously with the granulation of the glycolic acid copolymer.

For imparting excellent crystallizability to the glycolic acid copolymer, it is preferred that the glycolic acid copolymer which is subjected to the solid phase polymerization contains at least 82% by mole, more advantageously at least 83% by mole, most advantageously at least 85% by mole of the glycolic acid monomer units (a), based on the total molar amount of the above-mentioned monomer units (a), (b) and (c).

There is no particular limitation with respect to the method for subjecting a granulated glycolic acid copolymer to a crystallization treatment, and the crystallization treatment may be performed by a conventional method. For example, there can be mentioned a method in which the glycolic acid copolymer is crystallized by heating while mechanically stirring and/or flowing the glycolic acid copolymer; and a method in which the glycolic acid copolymer is crystallized by heating while stirring and/or flowing the glycolic acid copolymer using the force of a gas flow. In the above-mentioned methods, the heating of the glycolic acid copolymer is performed under an atmosphere of or under a flow of at least one gas selected from the group consisting of air and inert gases (such as nitrogen gas, helium gas, neon gas, argon gas, krypton gas, xenon gas, carbon dioxide gas and a gaseous saturated $C_1$–$C_4$ lower hydrocarbon), or under reduced or superatmospheric pressure, and the atmospheric conditions may be used in combination or varied during the crystallization treatment. Alternatively, the crystallization treatment may be performed by contacting, under heating, a solid glycolic acid copolymer with a liquid (such as water, an alcohol, an aliphatic hydrocarbon, an aromatic hydrocarbon, a ketone, an ether or an ester) which is incapable of dissolving the glycolic acid copolymer at the temperature employed for the crystallization treatment.

Further, examples of modes of the crystallization treatment include a mode in which the crystallization treatment is performed while allowing the glycolic acid copolymer to stand still; a mode in which the crystallization treatment is performed while mechanically agitating the glycolic acid copolymer (e.g., by using an impeller); a mode in which the crystallization treatment is performed in a vertical, horizontal or slanted vessel or a crystallization tower while rotating or vibrating the vessel or tower to thereby agitate the glycolic acid copolymer; a mode in which the crystallization treatment is performed while transferring the glycolic acid copolymer from an upper to a lower position of or from a lower to an upper position of the inside of a vertical, horizontal or slanted vessel or a crystallization tower; and a mode in which the glycolic acid copolymer is flowed by the force of a gas flow.

The temperature of the crystallization treatment depends on the types of the comonomers and the composition of the glycolic acid copolymer, but the temperature is in the range of from the glass transition temperature of the glycolic acid copolymer to 220° C. The length of the time of the crystallization treatment may be chosen arbitrarily, but it is generally 0.5 minute to 10 hours, preferably 1 minute to 8 hours, more preferably 5 minutes to 6 hours. The crystallization treatment may be performed in a batchwise manner and/or a continuous manner. Alternatively, the crystallization treatment may be performed in several stages.

Hereinafter, in the present specification, a glycolic acid copolymer obtained after the crystallization treatment is referred to as a "crystallized glycolic acid copolymer".

From the viewpoint of obtaining a glycolic acid copolymer having the excellent properties of the present invention, the weight average molecular weight of the crystallized glycolic acid copolymer before the solid phase polymerization is in the range of from 10,000 to 500,000. For stably producing a high molecular weight glycolic acid copolymer having satisfactory mechanical strength at a high polymerization rate, it is preferred that the weight average molecular weight of the crystallized glycolic acid copolymer before the solid phase polymerization is in the range of from 25,000 to 300,000, more advantageously from 30,000 to 200,000, most advantageously from 40,000 to 150,000. When the weight average molecular weight exceeds 500,000, the production of such glycolic acid copolymer by the melt polycondensation takes a long time and the discoloration of the glycolic acid copolymer is likely to occur.

The solid phase polymerization may be performed under a flow of an inert gas, or under reduced pressure or superatmospheric pressure. Alternatively, these conditions may be used in combination. Since it is necessary to remove water by-produced during the polymerization reaction, the solid phase polymerization is preferably performed under a flow of an inert gas and/or under reduced pressure. When the solid phase polymerization is performed under a flow of an inert gas, there can be used at least one inert gas selected from the group consisting of nitrogen gas, helium gas, neon gas, argon gas, krypton gas, xenon gas, carbon dioxide gas and a gaseous saturated $C_1$–$C_4$ lower hydrocarbon. It is preferred that the gas flowed through the reaction system is a gas having a water content as low as possible, namely a substantially anhydrous, dried gas. Such a dried gas can be obtained by, for example, a method in which a gas is passed through a packed bed comprised of a molecular sieve or an ion exchange resin, or a method in which a gas is dehydrated by cooling it to a low temperature. It is preferred that the water content of the flowed gas, which is expressed in terms of a dew point, is −10° C. or less, more advantageously −40° C. or less.

The amount of the gas flowed through the reaction system may be selected by taking into consideration the form, particle diameter and crystallinity of the crystallized glycolic acid copolymer, the reaction temperature and the vacuum level of the polymerization reaction system, and the gas is flowed through the reaction system in an amount which is capable of removing the by-produced water to an extent which is sufficient for producing a glycolic acid copolymer having satisfactorily high weight average molecular weight. In general, the efficiency of water removal increases with the increase in the amount of gas flowed through the reaction system and, generally, the amount of gas used per g of a crystallized prepolymer (glycolic acid copolymer) is 0.0005 ml/min to 3,000 ml/min, preferably 0.001 ml/min to 2,500 ml/min, more preferably 0.0015 ml/min to 2,000 ml/min, most preferably 0.002 ml/min to 500 ml/min, in terms of the volume of the gas measured under atmospheric pressure.

When the solid phase polymerization is performed under reduced pressure, there is no particular limitation with respect to the vacuum level of the reaction system as long as the progress of the solid phase polymerization is maintained and a glycolic acid copolymer having satisfactorily high weight average molecular weight is obtained. From the viewpoint of obtaining the desired levels of the polymerization rate and the weight average molecular weight of the final glycolic acid copolymer, it is preferred that the pressure of the reaction system is in the range of from 13.3 Pa to $1.33 \times 10^3$ Pa. When the solid phase polymerization is performed under superatmospheric pressure, there is no particular limitation with respect to the pressure of the reaction system as long as the progress of the solid phase polymerization is maintained and a glycolic acid copolymer having satisfactorily high weight average molecular weight is obtained. For example, it is preferred that the reaction is performed under a pressure in the range of from above atmospheric pressure to 1 MPa, more advantageously from above atmospheric pressure to 0.5 MPa.

There is no particular limitation with respect to the reaction temperature for the solid phase polymerization as long as the crystallized glycolic acid copolymer maintains a substantially solid state in the reaction system. From the viewpoint of obtaining the desired level of the polymerization rate, the reaction temperature is preferably in the range of from 100° C. to the melting temperature of the crystallized glycolic acid copolymer, more preferably from 120° C. to 5° C. below the melting temperature of the crystallized glycolic acid copolymer, most preferably from 140° C. to 10° C. below the melting temperature of the crystallized glycolic acid copolymer. The reaction temperature may vary during the solid phase polymerization as long as the temperature falls within the above mentioned range.

During the solid phase polymerization, the melting temperature of the crystallized glycolic acid copolymer may become increased by the increase in the molecular weight of the glycolic acid copolymer or by the effect of annealing. In such case, the reaction temperature may be increased in accordance with the increase in the melting temperature of the crystallized glycolic acid copolymer.

The solid phase polymerization may be performed using at least one reactor selected from the group consisting of a batch reactor and a continuous reactor.

There is no particular limitation with respect to the reactor used for the solid phase polymerization and there can be used a conventional drying apparatus, for example, a co-flow band dryer, a tunnel dryer, an aerated band dryer, a forced air dryer, an aerated vertical (movable phase) dryer, a cylindrical and hollow wedge-shaped agitating dryer, a mixing dryer, a disc dryer, a rotary dryer, an aerated rotary dryer, a fluidized bed dryer, a cone rotary dryer, a spray dryer, an air dryer, a multi-cylindrical dryer, a Hopper type dryer and the like described in "Kagaku Kougaku Benran (Chemical Engineering Handbook)" 5th edition, 5th print, p. 673–691 (published by MARUZEN CO., LTD., Japan, 1995).

The weight average molecular weight of the glycolic acid copolymer after the solid phase polymerization is generally 1,000,000 or less.

The polycondensation process comprising the steps (A), (B) and (C) of the method of the present invention, as well as the additional melt polycondensation and the solid phase polymerization which are performed after the polycondensation process, may be performed either in a continuous manner or an intermittent manner.

If desired, after the polycondensation reaction, the glycolic acid copolymer obtained by the method of the present invention may be reacted with an acid anhydride (such as acetic anhydride), an epoxy compound and the like to thereby modify the polymer terminals.

There is no particular limitation with respect to the material used for producing the polycondensation reactor used in the present invention. In general, by taking the corrosion resistance and the like into consideration, the material used for producing the polycondensation reactor is selected from glass, stainless steel, carbon steel, nickel, Hastelloy, titanium, chromium, zirconium, other alloys and polymer materials having high heat resistance. If desired, the surface of the polycondensation rector may be subjected to a surface treatment, such as plating, lining, passivation, washing with an acid or washing with an alkali.

In addition, depending on the use and desired properties of the glycolic acid copolymer, additives, such as a phenol type antioxidant, a thioether type antioxidant, a UV inhibitor, a hindered amine type light stabilizer, an aliphatic metal salt (such as calcium stearate), a nucleating agent and a plasticizer, may be added to the glycolic acid copolymer. The amount of the additive used is generally 0.0005 to 40% by weight, preferably 0.001 to 30% by weight, based on the weight of the glycolic acid copolymer.

The glycolic acid copolymer obtained by the method of the present invention may be melted and shaped into articles (such as various containers), a stretched or non-stretched film or sheet, a foamed article, a fiber and the like. If desired, the glycolic acid copolymer may be subjected to heat treatment after shaping.

Specific examples of shaped articles include bottles for drinks, cosmetics or detergents; disposable containers, such as cups and trays; casings for heat insulating boxes and various cartridges; plant pots and seedbeds for agricultural applications; construction and civil engineering materials, such as buried pipes free from the need of recovery, a temporary tacking material and a block; stationeries, such as a ball point pen, a mechanical pencil and a pencil; and equipments, such as a golf tee. Specific examples of films and sheets include a film for agricultural uses, a shopping bag, a packaging film, a wrapping film, various tapes, and a bag for storing a fertilizer. Specific examples of foamed articles include a tray for foods, a cushioning material and a heat insulating material. Specific examples of fibers include a fishing line, a fishing net, a non-woven fabric and a suture. As special applications of the glycolic acid copolymer, there can be mentioned various compositions, such as a slow-acting fertilizer composition obtained by blending the glycolic acid copolymer into a fertilizer, and various capsules for agrichemicals and fertilizers.

If desired, the obtained shaped articles may be subjected to various surface treatments, such as a coating treatment and a corona discharge treatment, for improving the antistatic properties or fogging resistance. Further, various laminations, other coating treatments, aluminum deposition in vacuo and the like may be performed to improve, e.g., the sealing properties, moisture barrier properties, gas barrier properties and printing properties of the shaped articles.

BEST MODE FOR CARRYING OUT THE INVENTION

Hereinbelow, the present invention will be described in more detail with reference to the following Examples, Comparative Examples and Reference Examples, which should not be construed as limiting the scope of the present invention.

In the following Examples, Comparative Examples and Reference Examples, various measurements were performed by the following methods.

(1) Amounts of Monomer Units Constituting a Glycolic Acid Copolymer (1-1) Amount of Diglycolic Acid Monomer Units is Measured by a High Performance Liquid Chromatography (HPLC) apparatus under the following conditions.

A mass of a glycolic acid copolymer is pulverized, followed by drying at 80° C. under a pressure of $1 \times 10^2$ Pa for 6 hours, thereby obtaining a dried resin. 5 g of the obtained dried resin is weighed and, then, hydrolyzed in 20 ml of an 8 N aqueous NaOH solution at room temperature for 48 hours. To the resultant hydrolysis product is added 12.5 ml of a concentrated hydrochloric acid to thereby obtain an acidified aqueous solution. The obtained acidified aqueous solution is used as a sample solution.

With respect to the sample solution, HPLC is performed using a 0.75% by weight aqueous phosphoric acid solution as an eluent under conditions wherein the column temperature is 40° C. and the flow rate of the eluent is 1 ml/minute. In the HPLC, the sample solution is flowed through 2 columns (RSpak (tradename) KC-811, manufactured and sold by Showa Denko K.K., Japan) which are connected in series, and the absorbance of a peak ascribed to diglycolic acid, which is detected by a UV detector (wavelength: 210 nm), is measured.

The amount of diglycolic acid monomer units present in a glycolic acid copolymer is expressed in terms of the molar amount of diglycolic acid monomer units contained in 1 g of the dried resin, wherein the molar amount is calculated from the amount of diglycolic acid monomer units present in the weighed dried resin (5 g), using a calibration curve of diglycolic acid which has been separately prepared.

(1-2) Amount of Monomer Units other than Diglycolic Acid Monomer Units, which are Present in a Glycolic Acid Copolymer Deuterated hexafluoroisopropanol as a solvent is added to a glycolic acid copolymer which has been dried at 80° C. under a pressure of $1 \times 10^2$ Pa for 6 hours (deuterated hexafluoroisopropanol:glycolic acid copolymer ratio=1 (ml): 30 (mg)), thereby obtaining a solution of a glycolic acid copolymer in deuterated hexafluoroisopropanol. To the obtained solution is added tetramethylsilane as a standard substance in a very small amount, thereby obtaining a test sample. With respect to the obtained test sample, 1H-NMR (400 MHz) is performed by α-400 (manufactured and sold by JASCO Corporation, Japan) wherein the number of integration is 500 times. From the results of the $^1$H-NMR, the amount of monomer units other than diglycolic acid monomer units is calculated in terms of a molar ratio thereof to the total of monomer units constituting the glycolic acid copolymer.

Subsequently, from the molar amount of diglycolic acid monomer units contained in 1 g of a glycolic acid copolymer which is calculated in item (1-1) above and the molar ratio of monomer units other than diglycolic acid monomer units which is calculated in item (1-2) above, the respective contents (mol %) of the monomer units constituting 1 g of the dried resin are calculated using the formula weights of the monomers. In the calculation, the terminal structures of the copolymer are ignored since the molecular weight of the copolymer of the present invention is satisfactorily high. That is, the calculation is carried out on the assumption that the glycolic acid copolymer is comprised only of monomer units corresponding to the raw material compounds.

The above-mentioned calculation method is generally employed in the art. A specific example of the calculation method is mentioned below.

The calculation of the amounts of the monomer units constituting a glycolic acid copolymer is carried out on the assumption that a glycolic acid copolymer (Y) is comprised only of glycolic acid monomer units; monomer units derived from a single type of non-glycolic, hydroxycarboxylic acid; diglycolic acid monomer units; and monomer units derived from a single type of polyol, wherein the formula weights of the glycolic acid monomer units, the non-glycolic, hydroxycarboxylic acid monomer units, the diglycolic acid monomer units and the polyol monomer units are designated as α1, β1, γ1 and δ1, respectively.

Further, the content (mole) of the diglycolic acid monomer units which is calculated in item (1-1) above is designated as M01, and the molar ratio of the glycolic acid monomer units, the molar ratio of the non-glycolic, hydroxycarboxylic acid monomer units and the molar ratio of the polyol monomer units are designated as M1, M2 and M3, respectively.

The weight (Z) (g) of monomer units other than diglycolic acid monomer units, which are contained in 1 g of glycolic acid copolymer (Y), is represented by the following formula:

$$Z = 1 - \gamma 1 \times M01.$$

The average formula weight (MA) of the monomer units other than diglycolic acid monomer units is represented by the following formula:

$$MA = (\alpha 1 \times M1 + \beta 1 \times M2 + \delta 1 \times M3)/(M1 + M2 + M3).$$

Accordingly, with respect to the molar amounts of monomer units other than diglycolic acid monomer units, the molar amount (M11) of the glycolic acid monomer units, the molar amount (M21) of the non-glycolic, hydroxycarboxylic acid monomer units and the molar amount (M31) of the polyol monomer units are respectively represented by the following formulae:

$$M11 = (Z/MA) \times M1/(M1 + M2 + M3),$$

$$M21 = (Z/MA) \times M2/(M1 + M2 + M3) \text{ and}$$

$$M31 = (Z/MA) \times M3/(M1 + M2 + M3).$$

The thus calculated M11, M21, M01 and M31 are, respectively, the molar amount of the glycolic acid monomer units, the molar amount of the non-glycolic, hydroxycarboxylic acid monomer units, the molar amount of the diglycolic acid monomer units and the molar amount of the polyol monomer units, which are contained in 1 g of a glycolic acid copolymer. These values are used in the calculation of the contents of the monomer units constituting the glycolic acid copolymer.

(2) Average Chain Length of a Plurality of Segments, each Constituted By Non-Glycolic, Hydroxycarboxylic Acid Monomer Unit(s)

1 ml of deuterated hexafluoroisopropanol as a solvent is added to 30 mg of a glycolic acid copolymer which has been dried at 80° C. under a pressure of $1 \times 10^2$ Pa for 6 hours, thereby obtaining a glycolic acid copolymer solution in deuterated hexafluoroisopropanol. To the obtained solution is added tetramethylsilane as a standard substance in a very small amount, thereby obtaining a test sample. With respect to the obtained test sample, $^{13}$C-NMR is performed by α-400 (manufactured and sold by JASCO Corporation, Japan) wherein protons are completely decoupled and the number of integration is 10,000 times.

The average chain length (γ) of a plurality of segments, each constituted of the non-glycolic, hydroxycarboxylic acid monomer unit(s), is calculated using the following values: an integrated intensity (α) of a peak ascribed to a carbonyl group formed between two adjacent non-glycolic, hydroxycarboxylic acid monomer units; and sum (β) of an integrated intensity of a peak ascribed to a carbonyl group formed between a non-glycolic, hydroxycarboxylic acid monomer unit and a glycolic acid monomer unit which are adjacent to each other and an integrated intensity of a peak ascribed to a carbonyl group formed between a non-glycolic, hydroxycarboxylic acid monomer unit and a monomer unit other than a non-glycolic, hydroxycarboxylic acid monomer unit which are adjacent to each other. Specifically, the average chain length (γ) is calculated by the following formula (9):

$$\gamma = \alpha/\beta + 1 \quad (9).$$

(3) Weight Average Molecular Weight of a Glycolic Acid Copolymer

The weight average molecular weight of a glycolic acid copolymer is measured by a gel permeation chromatography (GPC) apparatus (8020GPC system, manufactured and sold by TOSOH Corporation, Japan) under the following conditions.

As a solvent for the GPC, an 80 mM sodium trifluoroacetate (reagent, manufactured and sold by Wako Pure Chemical Industries, Ltd., Japan) in hexafluoroisopropanol is prepared. Specifically, 6.48 g of sodium trifluoroacetate is dissolved in 1,000 g of hexafluoroisopropanol to prepare a solution (hereinafter referred to simply as "eluent").

20 mg of a glycolic acid copolymer which has been dried at 80° C. under a pressure of $1\times10^2$ Pa for 6 hours is weighed and, then, dissolved in 3 g of the above-mentioned eluent, followed by filtration using a filter having a mesh size of 2 µm, thereby obtaining a sample solution.

With respect to the sample solution, GPC is performed under conditions wherein the column temperature is 40° C. and the flow rate of the eluent is 1 ml/minute. In the GPC, the sample solution is flowed through three different columns (TskguardcolumnHHR-H (tradename) as a guard column; and Tskgel (tradename) G5000HHR and Tskgel (tradename) G3000HHR, each of which is manufactured and sold by TOSOH Corporation, Japan) which are connected in series. A calibration curve is obtained in advance from the elution times of standard monodisperse polymethyl methacrylate samples (which, respectively, have known weight average molecular weights of 1,577,000, 685,000, 333,000, 100,250, 62,600, 24,300, 12,700, 4,700, 1,680 and 1,140) (manufactured and sold by Polymer Laboratories Ltd, U.K.) and a methyl methacrylate monomer (molecular weight: 100), which elution times are determined by an RI detector. The molecular weight of a glycolic acid copolymer is calculated using the calibration curve and the elution time of the sample solution.

(4) Melting Temperature of a Glycolic Acid Copolymer

The melting temperature of a glycolic acid copolymer is determined in accordance with JIS K7121.

Specifically, the melting temperature of a glycolic acid copolymer is determined from a DSC curve obtained using DSC-7 (manufactured and sold by Perkin Elmer, Inc., U.S.A.). The DSC curve is obtained by elevating the temperature of the glycolic acid copolymer, which has been dried at 80° C. under a pressure of $1\times10^2$ Pa for 6 hours, from –20° C. to 250° C. at a rate of 10° C./minute. When multiple peaks are observed in the obtained DSC curve, the highest of the temperatures at which peaks are observed is defined as the melting temperature.

(5) Melt Heat Stability of a Glycolic Acid Copolymer 7.5 g of a glycolic acid copolymer is introduced into a flask having an impeller. Then, the inside of the flask is purged with dry nitrogen at room temperature, followed by drying in vacuo ($1\times10^2$ Pa) at 80° C. for 6 hours while gently stirring. After completion of drying, the pressure in the flask is adjusted with dry nitrogen to atmospheric pressure. Then, the temperature of the glycolic acid copolymer is elevated to 240° C. while stirring, to thereby melt the glycolic acid copolymer. 5 Minutes after the time at which the temperature of the copolymer reaches 235° C., a sample of the copolymer is taken from the flask. The degree of discoloration of the sampled glycolic acid copolymer is evaluated as follows. The color tone is used as a yardstick for the melt heat stability of the glycolic acid copolymer.

(Evaluation of the Degree of Discoloration of the Glycolic Acid Copolymer)

Gel permeation chromatography (GPC) is performed in substantially the same manner as in item (3) above (measurement of the weight average molecular weight of the glycolic acid copolymer) except that a UV detector (UV8020, manufactured and sold by TOSOH Corporation, Japan) is used as a detector, wherein the wavelength is set at 350 nm. The count obtained by the UV detector is defined as a degree of discoloration.

The smaller the count (degree of discoloration), the better the color tone of the glycolic acid copolymer, that is, the higher the melt heat stability of the glycolic acid copolymer. The count numbers obtained by the UV detector correspond to the visually observed color tones of the copolymer as follows.

When the count (degree of discoloration) is less than 50, the glycolic acid copolymer is white or pale yellow. When the count is 50 to 100, the glycolic acid copolymer is yellow. When the count is more than 100, the glycolic acid copolymer is brown or dark brown.

(6) Evaluation of the Gas Barrier Property of a Melt-Shaped Sheet of the Glycolic Acid Copolymer (Production of a Melt-Shaped Sheet of the Glycolic Acid Copolymer)

The glycolic acid copolymer is dried in a nitrogen-circulating thermostat dryer having a temperature of 130° C. until the water content of the copolymer becomes 200 ppm or less, namely, for about 2 hours. Then, the resultant dried glycolic acid copolymer is heated and pressed by a heat presser having a temperature of 240° C. for 5 minutes, followed by cooling by a cold presser having a temperature of 25° C., thereby obtaining a melt-shaped sheet having a thickness of 200 µm.

(Evaluation of the Gas Barrier Property)

The gas barrier property of the glycolic acid copolymer is evaluated by measuring the oxygen gas permeability of the melt-shaped sheet as a test sample.

The measurement of the oxygen gas permeability of the glycolic acid copolymer is performed using an oxygen permeability measuring apparatus (OX-TRAN200H; manufactured and sold by MOCON, INC., U.S.A.) in accordance with JIS K7126B. Specifically, the measurement is performed as follows. From the above-obtained melt-shaped sheet having a thickness of 200 µm is cut out a square sample having a size of 120 mm×120 mm. The measurement is performed under conditions wherein the temperature is 23° C. and the relative humidity is 65%. From the oxygen gas permeability value at the time when the oxygen gas permeability of the sample reaches equilibrium, the oxygen gas permeability of a sheet having a thickness of 10 µm is calculated and the obtained value ($cc/m^2 \cdot day \cdot atm$) is defined as the oxygen gas permeability of the glycolic acid copolymer.

The smaller the value of the oxygen gas permeability, the higher the gas barrier property.

When the gas permeability is 10 or less, the gas barrier property is excellent. When the gas permeability is more than 10, but not more than 20, the gas barrier property is good. When the gas permeability is more than 20, the gas barrier property is poor.

(7) Evaluation of Mechanical Properties of a Melt-Shaped Sheet of the Glycolic Acid Copolymer (Production of a Melt-Shaped Sheet)

The glycolic acid copolymer is dried in a nitrogen-circulating thermostat dryer having a temperature of 130° C. until the water content of the copolymer becomes 200 ppm or less, namely, for about 2 hours. Then, the resultant dried glycolic acid copolymer is heated and pressed by a heat presser having a temperature of 240° C. for 5 minutes, followed by cooling by a cold presser having a temperature of 25° C., thereby obtaining a melt-shaped sheet having a thickness of 200 µm.

(Evaluation of the Strength of the Melt-Shaped Sheet)

From the melt-shaped sheet (having a thickness of 200 µm) obtained above is cut out a square sample having a size of 100 mm×100 mm. The strength of the square sample is evaluated under conditions wherein the temperature is 23°

C. and the relative humidity is 65%. Specifically, the evaluation is carried out as follows.

Two opposite side portions (each having a length of 100 mm and a width of 10 mm) of the 100 mm×100 mm square sample are respectively held by metal jigs. The square sample is then bent at an angle of 90° about a centerline extending between the middle points of the other two opposite sides of the square sample which are not held by the jigs. This bending operation is repeated up to 5 times, and the frequency of the bending operation carried out until the sample is broken is defined as the strength of the melt-shaped sheet. In each of the case where the sample is broken in the 5th bending operation and the case where the sample is not broken even in the 5th operation, the strength of the sample is evaluated as "5 or more".

When the strength of the melt-shaped sheet is "3" or less, it means that the sheet does not have the strength required of shaped articles, such as a container, a film and the like. On the other hand, when the strength is "4" or more, it means that the sheet has the strength required of shaped articles, such as a container, a film and the like.

(8) Evaluation of the Biodegradability of the Melt-Shaped Sheet in Soil

The biodegradability can be determined by an evaluation in soil. The evaluation of biodegradability in soil is carried out as follows.

A strip specimen having a size of 30 mm×100 mm is cut out from the melt-shaped sheet produced in item (7) "(Production of a melt-shaped sheet)" above. The strip specimen is then buried in the soil of a farmland at a depth of about 10 cm. The strip specimen is dug out every three months to observe the shape of the specimen until the deformation of the strip specimen is observed. When the deformation of the strip specimen starts within 12 months from the start of the test, the strip specimen is evaluated as biodegradable in soil.

EXAMPLE 1

(a) Production of a Low Molecular Weight Glycolic Acid Copolymer 332 g of a 70% by weight aqueous glycolic acid solution (having a diglycolic acid content of 0.005% by mole or less, based on the molar amount of glycolic acid), 58 g of a 90% by weight aqueous L-lactic acid solution and tetraisopropoxy germanium in an amount of 0.05% by weight, based on the total weight of the above-mentioned aqueous solutions (the amount of germanium atom was $2.2 \times 10^{-6}$ mole per g of the monomers), were introduced into a 350 ml pyrex glass separable flask having a distillation tube, a plane blade paddle and a baffle plate, to obtain a raw material mixture. The separable flask was then purged with nitrogen.

The molar ratio of diglycolic acid in the obtained raw material mixture was less than 0.00005, so that the calculated molar ratio of diglycolic acid was 0. Therefore, the calculated molar ratios of glycolic acid and lactic acid were 0.84 and 0.16, respectively.

Subsequently, the separable flask was immersed in an oil bath preheated to 150° C. and, then, stirring of the raw material mixture was performed at a revolution rate of 200 rpm for 1.5 hours under a stream of nitrogen, thereby effecting a dehydration. Then, a polycondensation reaction was performed under conditions wherein the oil bath temperature was maintained at 150° C., and the pressure/time conditions were sequentially changed as follows: $5.0 \times 10^4$ Pa for 1 hour, $2.5 \times 10^4$ Pa for 0.5 hour, $1.0 \times 10^4$ Pa for 50 minutes, $5.0 \times 10^3$ Pa for 50 minutes and $2.0 \times 10^3$ Pa for 50 minutes, to thereby obtain a glycolic acid copolymer. During the reaction, the temperature of the reaction mixture gradually elevated; however, the temperature of the reaction mixture became almost constant at 146° C. after the reaction pressure was changed to $1.0 \times 10^4$ Pa. Thus, step (A) was completed. A small portion of the glycolic acid copolymer obtained in step (A) above was sampled and subjected to measurement of the molecular weight. It was found that the weight average molecular weight of the glycolic acid copolymer was 1,900.

The reaction temperature was gradually elevated to 190° C. over 25 minutes while maintaining the revolution rate and the reduced pressure (step (B)). A small portion of the glycolic acid copolymer at the point in time at which the reaction temperature reached 190° C. was sampled and subjected to measurement of the molecular weight. It was found that the weight average molecular weight of the glycolic acid copolymer was 2,100.

Subsequently, the reaction temperature was elevated to 200° C. over 10 minutes, whereupon the revolution rate was changed to 600 rpm and the reduced pressure was changed to $4.0 \times 10^2$ Pa, followed by performing a reaction. The reaction was continued until the total reaction time after the reaction temperature exceeded 190° C. became 2.5 hours, thereby obtaining a glycolic acid copolymer having a weight average molecular weight of 13,800 (step (C)). From the point in time at which the reaction temperature exceeded 190° C., it took 100 minutes for the weight average molecular weight of the glycolic acid copolymer to reach 10,000. The increasing rate of the weight average molecular weight within this period of 100 minutes was 4,740/hour.

The glycolic acid copolymer obtained above in the molten state was cooled to obtain a solidified glycolic acid copolymer having a low molecular weight. Then, the obtained low molecular weight glycolic acid copolymer was taken out of the separable flask and further polymerized by the operations explained below.

(b) Melt Polycondensation of a Low Molecular Weight Glycolic Acid Copolymer 25 g of the low molecular weight glycolic acid copolymer obtained above was introduced into a cylindrical pyrex glass tube having an inner diameter of 70 mm and an effective length of 250 mm. The cylindrical tube containing the low molecular weight glycolic acid copolymer was placed in a glass tube oven (GTO-350RG, manufactured and sold by SIBATA SCIENTIFIC TECHNOLOGY LTD., Japan) equipped with a planar heater. After the inside of the glass tube oven was purged with nitrogen at room temperature, rotation of the cylindrical tube was started and the reaction temperature was elevated to 200° C. Melt polycondensation was then performed under a pressure of $2.6 \times 10$ Pa for 12 hours. After the melt polycondensation, the pressure in the cylindrical tube was adjusted with dry nitrogen to atmospheric pressure, followed by cooling and solidification of the contents (i.e., the resultant glycolic acid copolymer) of the cylindrical tube. The obtained glycolic acid copolymer was taken out of the cylindrical tube.

(c) The Results of the Analysis of the Glycolic Acid Copolymer

The weight average molecular weight of the glycolic acid copolymer obtained in item (b) above was 123,000. The glycolic acid copolymer was comprised of 83.97% by mole of glycolic acid monomer units, 0.03% by mole of diglycolic acid monomer units and 16.00% by mole of lactic acid monomer units as non-glycolic, hydroxycarboxylic acid monomer units, wherein the lactic acid monomer units constituted a plurality of segments having an average chain length of 1.08 in terms of the average number of lactic acid monomer units. The degree of discoloration was 28.

(d) Evaluation of the Glycolic Acid Copolymer and a Melt-Shaped Sheet of the Glycolic Acid Copolymer The melt heat stability of the glycolic acid copolymer obtained in item (b) above and the properties of a melt-shaped sheet of the glycolic acid copolymer were evaluated. It was found that the degree of discoloration of the glycolic acid copolymer after the melt heat stability test was 36, which means that the melt heat stability resistance was fairly good. The oxygen gas permeability of the melt-shaped sheet of the glycolic acid copolymer was 9.1 (cc/m$^2$·day·atm), which means that the melt-shaped sheet had extremely excellent gas barrier property. Further, the strength of the melt-shaped sheet was 4, which means that the melt-shaped sheet had the high mechanical strength required of shaped articles such as a container, a film and the like. The melt-shaped sheet also had the biodegradability in soil.

The results of the analysis and the results of the evaluation are shown in Table 1.

EXAMPLE 2

(a) Production of a Low Molecular Weight Glycolic Acid Copolymer

Into substantially the same reaction apparatus (separable flask) as in Example 1 were introduced 360 g of a 70% by weight aqueous glycolic acid solution (having a diglycolic acid content of 0.005% by mole or less, based on the molar amount of glycolic acid), 40.83 g of a 90% by weight aqueous L-lactic acid solution, and tetraisopropoxy germanium in an amount of 0.05% by weight, based on the total weight of the above-mentioned aqueous solutions (the amount of germanium atom was $2.2\times10^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid and lactic acid were 0.89 and 0.11, respectively. Except for the use of these operation conditions, a polycondensation reaction operation (comprised of the steps (A), (B) and (C)) was performed in substantially the same manner as in item (a) of Example 1, to thereby obtain a glycolic acid copolymer having a weight average molecular weight of 13,800. During the reaction in step (A), the temperature of the reaction mixture gradually elevated; however, the temperature of the reaction mixture became almost constant at 146° C. after the reaction pressure was changed to $1.0\times10^4$ Pa. It was found that the weight average molecular weight of the glycolic acid copolymer just after completion of step (A) was 1,900, and that the weight average molecular weight of the glycolic acid copolymer at the point in time at which the reaction temperature reached 190° C. was 2,100. It was also found that, from the point in time at which the reaction temperature exceeded 190° C., it took 100 minutes for the weight average molecular weight of the glycolic acid copolymer to reach 10,000. The increasing rate of the weight average molecular weight within this period of 100 minutes was 4,740/hour.

The glycolic acid copolymer obtained above in the molten state was cooled to obtain a solidified glycolic acid copolymer having a low molecular weight. Then, the obtained low molecular weight glycolic acid copolymer was taken out of the separable flask and further polymerized by the operations explained below.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization 35 g of the low molecular weight glycolic acid copolymer obtained above was introduced into a cylindrical pyrex glass tube having an inner diameter of 70 mm and an effective length of 250 mm. The cylindrical tube containing the low molecular weight glycolic acid copolymer was placed in a glass tube oven (GTO-350RG, manufactured and sold by SIBATA SCIENTIFIC TECHNOLOGY LTD., Japan) equipped with a planar heater. After the inside of the glass tube oven was purged with nitrogen at room temperature, rotation of the cylindrical tube was started and the reaction temperature was elevated to 200° C. Melt polycondensation was then performed under a pressure of $2.6\times10$ Pa for 3.5 hours. After the melt polycondensation, the pressure in the cylindrical tube was adjusted with dry nitrogen to atmospheric pressure, followed by cooling of the contents (i.e., the resultant glycolic acid copolymer) of the cylindrical tube to room temperature.

Subsequently, the rotation of the cylindrical tube was continued for five hours while heating at 130° C. under dry nitrogen, thereby crystallizing the contents of the cylindrical tube, followed by cooling and solidification. The resultant crystallized glycolic acid copolymer was taken out of the cylindrical tube. It was found that the thus obtained crystallized glycolic acid copolymer had a weight average molecular weight of 43,200.

The above-obtained crystallized glycolic acid copolymer was subjected to pulverization, followed by sieving of the resultant, to thereby obtain a pulverized, crystallized glycolic acid copolymer having a particle diameter of from 100 to 300 μm (hereinafter referred to as "crystallized glycolic acid copolymer P-1"). It was found that the thus obtained crystallized glycolic acid copolymer P-1 had a melting temperature of 185° C.

The crystallized glycolic acid copolymer P-1 was then subjected to solid phase polymerization as follows.

(b-2) Solid Phase Polymerization of the Pulverized, Crystallized Glycolic Acid Copolymer Obtained in Item (b-1)

25 g of the pulverized, crystallized glycolic acid copolymer P-1 obtained above was introduced into a cylindrical SUS 316 vertical reactor having an inner diameter of 40 mm and an effective length of 50 mm. A solid phase polymerization reaction was then performed for 30 hours under a pressure of $1.013\times10^5$ Pa (i.e., atmospheric pressure) and under a stream of nitrogen gas (having a dew-point temperature of −95° C. and preheated at 170° C.) at a flow rate of 30 NL/min (as measured at 25° C. under atmospheric pressure).

(C) the Results of the Analysis of the Glycolic Acid Copolymer

The weight average molecular weight of the glycolic acid copolymer obtained in item (b-2) above was 186,000. The glycolic acid copolymer was comprised of 88.97% by mole of glycolic acid monomer units, 0.03% by mole of diglycolic acid monomer units and 11.00% by mole of lactic acid monomer units as non-glycolic, hydroxycarboxylic acid monomer units, wherein the lactic acid monomer units constituted a plurality of segments having an average chain length of 1.02 in terms of the average number of lactic acid monomer units. The degree of discoloration was 29.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 38, which means that the melt heat stability was fairly good. The oxygen gas permeability of the melt-shaped sheet of the glycolic acid copolymer was 8.0 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 1.

EXAMPLE 3

(a) Production of a Low Molecular Weight Glycolic Acid Copolymer

Into substantially the same reaction apparatus (separable flask) as in Example 1 were introduced 360 g of a 70% by weight aqueous glycolic acid solution (having a diglycolic acid content of 0.005% by mole or less, based on the molar amount of glycolic acid), 21 g of a 90% by weight aqueous L-lactic acid solution, and tetraisopropoxy germanium in an amount of 0.05% by weight, based on the total weight of the above-mentioned aqueous solutions (the amount of germanium atom was $2.3 \times 10^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid and lactic acid were 0.94 and 0.06, respectively. Except for the use of these operation conditions, a polycondensation reaction operation was performed in substantially the same manner as in step (A) of Example 1, to thereby obtain a glycolic acid copolymer. During the reaction in step (A), the temperature of the reaction mixture gradually elevated; however, the temperature of the reaction mixture became almost constant at 146° C. after the reaction pressure was changed to $1.0 \times 10^4$ Pa. A small portion of the glycolic acid copolymer obtained in step (A) above was sampled and subjected to measurement of the molecular weight. It was found that the weight average molecular weight of the glycolic acid copolymer was 1,900.

The reaction temperature was gradually elevated to 190° C. over 25 minutes while maintaining the revolution rate and the reduced pressure (step (B)). A small portion of the glycolic acid copolymer at the point in time at which the reaction temperature reached 190° C. was sampled and subjected to measurement of the molecular weight. It was found that the weight average molecular weight of the glycolic acid copolymer was 2,100.

Subsequently, the reaction temperature was elevated to 225° C. over 20 minutes, whereupon the revolution rate was changed to 600 rpm and the reduced pressure was changed to $4.0 \times 10^2$ Pa, followed by performing a reaction. The reaction was continued until the total reaction time after the reaction temperature exceeded 190° C. became 2.5 hours, thereby obtaining a glycolic acid copolymer having a weight average molecular weight of 16,300 (step (C)). From the point in time at which the reaction temperature exceeded 190° C., it took 80 minutes for the weight average molecular weight of the glycolic acid copolymer to reach 10,000. The increasing rate of the weight average molecular weight within this period of 80 minutes was 5,925/hour.

The glycolic acid copolymer obtained above in the molten state was cooled to obtain a solidified glycolic acid copolymer having a low molecular weight. Then, the obtained low molecular weight glycolic acid copolymer was taken out of the separable flask and further polymerized by the operations explained below.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, except that the reaction temperature was changed to 225° C., to thereby obtain a pulverized, crystallized glycolic acid copolymer having a weight average molecular weight of 46,300 and a melting temperature of 209° C. (hereinafter referred to as "crystallized glycolic acid copolymer P-2").

The crystallized glycolic acid copolymer P-2 was then subjected to solid phase polymerization as follows.

(B-2) Solid Phase Polymerization of the Pulverized, Crystallized Glycolic Acid Copolymer Obtained in Item (b-1)

The above-obtained crystallized glycolic acid copolymer P-2 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 182,000. The glycolic acid copolymer was comprised of 93.97% by mole of glycolic acid monomer units, 0.03% by mole of diglycolic acid monomer units and 6.00% by mole of lactic acid monomer units as non-glycolic, hydroxycarboxylic acid monomer units, wherein the lactic acid monomer units constituted a plurality of segments having an average chain length of 1.02 in terms of the average number of lactic acid monomer units. The degree of discoloration was 29.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 43, which means that the melt heat stability was fairly good. The oxygen gas permeability of the melt-shaped sheet of the glycolic acid copolymer was 7.2 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 1.

EXAMPLE 4

(a) Production of a Low Molecular Weight Glycolic Acid Copolymer

Into substantially the same reaction apparatus (separable flask) as in Example 1 were introduced 338 g of a 70% by weight aqueous glycolic acid solution (having a diglycolic acid content of 0.005% by mole or less, based on the molar amount of glycolic acid), 51 g of 6-hydroxyhexanoic acid, and stannous chloride in an amount of 0.03% by weight, based on the total weight of the above-mentioned raw materials (the amount of tin atom was $2.1 \times 10^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid and 6-hydroxyhexanoic acid were 0.89 and 0.11, respectively. Except for the use of these operation conditions, a polycondensation reaction operation (comprised of the steps (A), (B) and (C)) was performed in substantially the same manner as in item (a) of Example 2, to thereby obtain a glycolic acid copolymer having a weight average molecular weight of 13,000.

During the reaction in step (A), the temperature of the reaction mixture gradually elevated; however, the temperature of the reaction mixture became almost constant at 146° C. after the reaction pressure was changed to $1.0 \times 10^4$ Pa. It was found that the weight average molecular weight of the glycolic acid copolymer just after completion of step (A) was 1,900, and that the weight average molecular weight of the glycolic acid copolymer at the point in time at which the reaction temperature reached 190° C. was 2,100. It was also found that, from the point in time at which the reaction temperature exceeded 190° C., it took 105 minutes for the weight average molecular weight of the glycolic acid copolymer to reach 10,000. The increasing rate of the weight average molecular weight within this period of 105 minutes was 4,514/hour.

The glycolic acid copolymer obtained above in the molten state was cooled to obtain a solidified glycolic acid copolymer having a low molecular weight. Then, the obtained low molecular weight glycolic acid copolymer was taken out of the separable flask and further polymerized by the operations explained below.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 42,900 and a melting temperature of 183° C. (hereinafter referred to as "crystallized glycolic acid copolymer P-3").

The crystallized glycolic acid copolymer P-3 was then subjected to solid phase polymerization as follows.

(b-2) Solid Phase Polymerization of the Pulverized, Crystallized Glycolic Acid Copolymer Obtained in Item (b-1)

The above-obtained crystallized glycolic acid copolymer P-3 was subjected to solid phase polymerization reaction in substantially the same manner as in item (b-2) of Example 2.

(c) The results of the analysis of the glycolic acid copolymer

The weight average molecular weight of the glycolic acid copolymer obtained in item (b-2) above was 167,000. The glycolic acid copolymer was comprised of 88.97% by mole of glycolic acid monomer units, 0.03% by mole of diglycolic acid monomer units and 11.00% by mole of 6-hydroxyhexanoic acid monomer units as non-glycolic, hydroxycarboxylic acid monomer units, wherein the 6-hydroxyhexanoic acid monomer units constituted a plurality of segments having an average chain length of 1.03 in terms of the average number of 6-hydroxyhexanoic acid monomer units. The degree of discoloration was 29.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 38, which means that the melt heat stability was fairly good. The oxygen gas permeability of the melt-shaped sheet of the glycolic acid copolymer was 8.1 (cc/m²·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 1.

EXAMPLE 5

(a) Production of a Low Molecular Weight Glycolic Acid Copolymer

Into substantially the same reaction apparatus (separable flask) as in Example 1 were introduced 338 g of a 70% by weight aqueous glycolic acid solution (having a diglycolic acid content of 0.005% by mole or less, based on the molar amount of glycolic acid), 30 g of 3-hydroxybutylic acid, and tetraisopropoxy germanium in an amount of 0.05% by weight, based on the total weight of the above-mentioned raw materials (the amount of germanium atom was $2.2 \times 10^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid and 3-hydroxybutylic acid were 0.89 and 0.11, respectively. Except for the use of these operation conditions, a polycondensation reaction operation (comprised of the steps (A), (B) and (C)) was performed in substantially the same manner as in item (a) of Example 2, to thereby obtain a glycolic acid copolymer having a weight average molecular weight of 13,700.

During the reaction in step (A), the temperature of the reaction mixture gradually elevated; however, the temperature of the reaction mixture became almost constant at 146° C. after the reaction pressure was changed to $1.0 \times 10^4$ Pa. It was found that the weight average molecular weight of the glycolic acid copolymer just after completion of step (A) was 1,900, and that the weight average molecular weight of the glycolic acid copolymer at the point in time at which the reaction temperature reached 190° C. was 2,100. It was also found that, from the point in time at which the reaction temperature exceeded 190° C., it took 100 minutes for the weight average molecular weight of the glycolic acid copolymer to reach 10,000. The increasing rate of the weight average molecular weight within this period of 100 minutes was 4,740/hour.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 43,000 and a melting temperature of 184° C. (hereinafter referred to as "crystallized glycolic acid copolymer P-4").

(b-2) Solid Phase Polymerization of the Pulverized, Crystallized Glycolic Acid Copolymer Obtained in Item (b-1)

Subsequently, the above-obtained crystallized glycolic acid copolymer P-4 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 179,000. The glycolic acid copolymer was comprised of 88.97% by mole of glycolic acid monomer units, 0.03% by mole of diglycolic acid monomer units and 11.00% by mole of 3-hydroxybutylic acid monomer units as non-glycolic, hydroxycarboxylic acid monomer units, wherein the 3-hydroxybutylic acid monomer units constituted a plurality of segments having an average chain length of 1.02 in terms of the average number of 3-hydroxybutylic acid monomer units. The degree of discoloration was 28.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 39, which means that the melt heat stability was fairly good. The oxygen gas permeability of the melt-shaped sheet of the glycolic acid copolymer was 8.0 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 1.

COMPARATIVE EXAMPLE 1

(a) Production of a Low Molecular Weight Glycolic Acid Copolymer

Into substantially the same reaction apparatus (separable flask) as in Example 1 were introduced 360 g of a 70% by weight aqueous glycolic acid solution (having a diglycolic acid content of 0.005% by mole or less, based on the molar amount of glycolic acid), 40.83 g of a 90% by weight aqueous L-lactic acid solution and tetraisopropoxy germanium in an amount of 0.05% by weight, based on the total weight of the above-mentioned aqueous solutions (the amount of germanium atom was 2.2×10$^{-6}$ mole per g of the monomers), to obtain a raw material mixture. The separable flask was then purged with nitrogen.

The molar ratio of diglycolic acid in the obtained raw material mixture was less than 0.00005, so that the calculated molar ratio of diglycolic acid was 0. Therefore, the calculated molar ratios of glycolic acid and lactic acid were 0.89 and 0.11, respectively.

Subsequently, the separable flask was immersed in an oil bath preheated to 150° C. and, then, stirring of the raw material mixture was performed at a revolution rate of 200 rpm for 1.5 hours under a stream of nitrogen, thereby effecting a dehydration. Then, a polycondensation reaction was performed under conditions wherein the oil bath temperature was maintained at 150° C., and the pressure/time conditions were sequentially changed as follows: 5.0×10$^4$ Pa for 1 hour, 2.5×10$^4$ Pa for 0.5 hour and 1.0×10$^4$ Pa for 20 minutes, to thereby obtain a glycolic acid copolymer. During the reaction, the temperature of the reaction mixture gradually elevated; however, the temperature of the reaction mixture became almost constant at 146° C. after the reaction pressure was changed to 1.0×10$^4$ Pa.

A small portion of the glycolic acid copolymer obtained in the above step was sampled and subjected to measurement of the molecular weight. It was found that the weight average molecular weight of the glycolic acid copolymer was 400.

The reaction temperature was gradually elevated to 190° C. over 25 minutes while maintaining the revolution rate and the reduced pressure. A small portion of the glycolic acid copolymer at the point in time at which the reaction temperature reached 190° C. was sampled and subjected to measurement of the molecular weight. It was found that the weight average molecular weight of the glycolic acid copolymer was 600.

Subsequently, the reaction temperature was elevated to 200° C. over 10 minutes, whereupon the revolution rate was changed to 600 rpm and the reduced pressure was changed to 4.0×10$^2$ Pa, followed by performing a reaction. The reaction was continued until the total reaction time after the reaction temperature exceeded 190° C. became 2.5 hours, thereby obtaining a glycolic acid copolymer having a weight average molecular weight of 12,200.

From the point at which the reaction temperature exceeded −190° C., it took 120 minutes for the weight average molecular weight of the glycolic acid copolymer to reach 10,000. The increasing rate of the weight average molecular weight within this period of 120 minutes was 4,700/hour.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 43,800 and a melting temperature of 183° C. (hereinafter referred to as "crystallized glycolic acid copolymer P-5")

(b-2) Solid Phase Polymerization of the Pulverized, Crystallized Glycolic Acid Copolymer Obtained in Item (b-1)

The above-obtained crystallized glycolic acid copolymer P-5 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 109,000. The glycolic acid copolymer was comprised of 88.86% by mole of glycolic acid monomer units, 0.13% by mole of diglycolic acid monomer units and 11.01% by mole of lactic acid monomer units as non-glycolic, hydroxycarboxylic acid monomer units, wherein the lactic acid monomer units constituted a plurality of segments having an average chain length of 1.02 in terms of the average number of lactic acid monomer units. The degree of discoloration was 34.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the oxygen gas permeability of the melt-shaped sheet of the glycolic acid copolymer was 8.2 (cc/m$^2$·day·atm), which means that the melt-shaped sheet had satisfactory gas barrier property. Further, the strength of the melt-shaped sheet was 4, which means that the melt-shaped sheet had the high mechanical strength required of shaped articles such as a container, a film and the like. The melt-shaped sheet also had the biodegradability in soil. However, with respect to the melt heat stability, it was found that the degree of discoloration of the glycolic acid copolymer after the melt heat stability test was 175, and that the glycolic acid copolymer was discolored to assume a brown color.

The results of the analysis and the results of the evaluation are shown in Table 2.

COMPARATIVE EXAMPLE 2

(a) Production of a Low Molecular Weight Glycolic Acid Copolymer

Into substantially the same reaction apparatus (separable flask) as in Example 1 were introduced 360 g of a 70% by weight aqueous glycolic acid solution (having a diglycolic acid content of 0.005% by mole or less, based on the molar amount of glycolic acid), 10.2 g of a 90% by weight aqueous L-lactic acid solution and tetraisopropoxy germanium in an amount of 0.05% by weight, based on the total weight of the above-mentioned aqueous solutions (the amount of germanium atom was $2.3 \times 10^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid and lactic acid were 0.97 and 0.03, respectively. Except for the use of these operation conditions, a polycondensation reaction operation (comprised of the steps (A), (B) and (C)) was performed in substantially the same manner as in item (a) of Example 3, to thereby obtain a glycolic acid copolymer having a weight average molecular weight of 16,300.

During the reaction in step (A), the temperature of the reaction mixture gradually elevated; however, the temperature of the reaction mixture became almost constant at 146° C. after the reaction pressure was changed to $1.0 \times 10^4$ Pa. It was found that the weight average molecular weight of the glycolic acid copolymer just after completion of step (A) was 1,900, and that the weight average molecular weight of the glycolic acid copolymer at the point in time at which the reaction temperature reached 190° C. was 2,100. It was also found that, from the point in time at which the reaction temperature exceeded 190° C., it took 80 minutes for the weight average molecular weight of the glycolic acid copolymer to reach 10,000. The increasing rate of the weight average molecular weight within this period of 80 minutes was 5,925/hour.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, except that the reaction temperature was changed to 230° C., to thereby obtain a pulverized, crystallized glycolic acid copolymer having a weight average molecular weight of 46,300 and a melting temperature of 225° C. (hereinafter referred to as "crystallized glycolic acid copolymer P-6").

The crystallized glycolic acid copolymer P-6 was then subjected to solid phase polymerization as follows.

(b-2) Solid Phase Polymerization of the Pulverized, Crystallized Glycolic Acid Copolymer Obtained in Item (b-1)

The above-obtained crystallized glycolic acid copolymer P-6 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 164,000. The glycolic acid copolymer was comprised of 96.97% by mole of glycolic acid monomer units, 0.03% by mole of diglycolic acid monomer units and 3.00% by mole of lactic acid monomer units as non-glycolic, hydroxycarboxylic acid monomer units, wherein the lactic acid monomer units constituted a plurality of segments having an average chain length of 1.01 in terms of the average number of lactic acid monomer units. The degree of discoloration was 33.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the oxygen gas permeability of the melt-shaped sheet of the glycolic acid copolymer was 7.0 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil. However, with respect to the melt heat stability, it was found that the degree of discoloration of the glycolic acid copolymer after the melt heat stability test was 115, and that the glycolic acid copolymer was discolored to assume a brown color.

The results of the analysis and the results of the evaluation are shown in Table 2.

COMPARATIVE EXAMPLE 3

(a) Production of a Low Molecular Weight Glycolic Acid Copolymer

Into substantially the same reaction apparatus (separable flask) as in Example 1 were introduced 290 g of a 70% by weight aqueous glycolic acid solution (having a diglycolic acid content of 0.005% by mole or less, based on the molar amount of glycolic acid), 98.5 g of a 90% by weight aqueous L-lactic acid solution and tetraisopropoxy germanium in an amount of 0.05% by weight, based on the total weight of the above-mentioned aqueous solutions (the amount of germanium atom was $2.2 \times 10^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid and lactic acid were 0.73 and 0.27, respectively. Except for the use of these operation conditions, a polycondensation reaction operation (comprised of the steps (A), (B) and (C)) was performed in substantially the same manner as in item (a) of Example 1, to thereby obtain a glycolic acid copolymer having a weight average molecular weight of 13,800.

During the reaction in step (A), the temperature of the reaction mixture gradually elevated; however, the temperature of the reaction mixture became almost constant at 146° C. after the reaction pressure was changed to $1.0 \times 10^4$ Pa. It was found that the weight average molecular weight of the glycolic acid copolymer just after completion of step (A) was 1,900, and that the weight average molecular weight of the glycolic acid copolymer at the point in time at which the reaction temperature reached 190° C. was 2,100. It was also found that, from the point in time at which the reaction temperature exceeded 190° C., it took 100 minutes for the weight average molecular weight of the glycolic acid copolymer to reach 10,000. The increasing rate of the weight average molecular weight within this period of 100 minutes was 4,740/hour.

(b) Melt Polycondensation of a Low Molecular Weight Glycolic Acid Copolymer

The low molecular weight glycolic acid copolymer obtained above was subjected to melt polycondensation in substantially the same manner as in item (b) of Example 1.

(c) The Results of the Analysis of the Glycolic Acid Copolymer

The weight average molecular weight of the glycolic acid copolymer obtained in item (b) above was 122,000. The glycolic acid copolymer was comprised of 72.96% by mole of glycolic acid monomer units, 0.03% by mole of diglycolic acid monomer units and 27.01% by mole of lactic acid monomer units as non-glycolic, hydroxycarboxylic acid monomer units, wherein the lactic acid monomer units constituted a plurality of segments having an average chain length of 1.14 in terms of the average number of lactic acid monomer units. The degree of discoloration was 33.

(d) Evaluation of the Glycolic Acid Copolymer and a Melt-Shaped Sheet of the Glycolic Acid Copolymer The melt heat stability of the glycolic acid copolymer obtained in item (b) above and the properties of a melt-shaped sheet of the glycolic acid copolymer were evaluated. It was found that the degree of discoloration of the glycolic acid copolymer after the melt heat stability test was 39, and the strength of the melt-shaped sheet was 4, which means that the melt-shaped sheet had the high mechanical strength required of shaped articles such as a container, a film and the like. Further, the melt-shaped sheet also had the biodegradability in soil. However, with respect to gas barrier property, it was found that the oxygen gas permeability of the melt-shaped sheet of the glycolic acid copolymer was 35 (cc/m²·day·atm), which means that the gas barrier property of the melt-shaped sheet was poor.

The results of the analysis and the results of the evaluation are shown in Table 2.

COMPARATIVE EXAMPLE 4

(a) Production of a Low Molecular Weight Glycolic Acid Copolymer

Glycolic acid and lactic acid were separately subjected to a polycondensation reaction in separate reaction apparatuses, thereby obtaining two different low molecular weight polymers. The obtained two low molecular weight polymers were mixed together, and the resultant mixture was subjected to a reaction. Specifically, the operations were performed as follows.

(a-1) 60 g of a 90% by weight aqueous L-lactic acid solution was introduced into a 100 ml pyrex glass separable flask having a distillation tube and an anchor impeller. The separable flask was then purged with nitrogen. Subsequently, the separable flask was immersed in an oil bath preheated to 130° C. and, then, stirring of the contents of the separable flask was performed at a revolution rate of 200 rpm for 1.5 hours under a stream of nitrogen, thereby effecting a dehydration. Then, a polycondensation reaction was performed under conditions wherein the oil bath temperature was maintained at 130° C., and the pressure/time conditions were sequentially changed as follows: $5.0 \times 10^4$ Pa for 1 hour, $2.5 \times 10^4$ Pa for 1 hour, $1.0 \times 10^4$ Pa for 1 hour, $5.0 \times 10^3$ Pa for 1 hour and $2.0 \times 10^3$ Pa for 1 hour, to thereby obtain a poly L-lactic acid. The poly L-lactic acid obtained above was cooled to solidify the poly L-lactic acid. The resultant solidified, amorphous poly L-lactic acid was then taken out of the separable flask. The weight average molecular weight of the obtained amorphous poly L-lactic acid was 1,000.

(a-2) Production of a Low Molecular Weight Glycolic Acid Copolymer

Into substantially the same reaction apparatus (separable flask) as in item (a) of Example 1 were introduced 360 g of a 70% by weight aqueous glycolic acid solution (having a diglycolic acid content of 0.005% by mole or less, based on the molar amount of glycolic acid) and tetraisopropoxy germanium in an amount of 0.05% by weight, based on the weight of the above-mentioned aqueous solution (the amount of germanium atom was $2.3 \times 10^{-6}$ mole per g of the monomer), to obtain a raw material mixture. The separable flask was then purged with nitrogen. Subsequently, the separable flask was immersed in an oil bath preheated to 150° C. and, then, stirring of the raw material mixture was performed at a revolution rate of 200 rpm for 1.5 hours under a stream of nitrogen, thereby effecting a dehydration.

Then, a polycondensation reaction was performed under conditions wherein the oil bath temperature was maintained at 150° C., and the pressure/time conditions were sequentially changed as follows: $5.0 \times 10^4$ Pa for 1 hour, $2.5 \times 10^4$ Pa for 0.5 hour, $1.0 \times 10^4$ Pa for 50 minutes, $5.0 \times 10^3$ Pa for 50 minutes and $2.0 \times 10^3$ Pa for 50 minutes, to thereby obtain a polyglycolic acid. During the reaction, the temperature of the reaction mixture gradually elevated; however, the temperature of the reaction mixture became almost constant at 146° C. after the reaction pressure was changed to $1.0 \times 10^4$ Pa. A small portion of the polyglycolic acid obtained by the above reaction was sampled and subjected to measurement of the molecular weight. It was found that the weight average molecular weight of the polyglycolic acid was 1,900.

The reaction temperature was gradually elevated to 190° C. over 20 minutes while maintaining the revolution rate and the reduced pressure. A small portion of the glycolic acid polymer at the point in time at which the reaction temperature reached 190° C. was sampled and subjected to measurement of the molecular weight. It was found that the weight average molecular weight of the polyglycolic acid was 2,100.

Subsequently, the reaction temperature was elevated to 200° C. over 10 minutes, whereupon the revolution rate was changed to 450 rpm and the reduced pressure was released by nitrogen. Then, 29.4 g of poly L-lactic acid obtained in item (a-1) above was added to the separable flask under nitrogen. The pressure was then reduced again to $4.0 \times 10^2$ Pa, followed by performing a reaction. The reaction was continued until the total reaction time after the reaction temperature exceeded 190° C. became 3 hours, thereby obtaining a glycolic acid copolymer having a weight average molecular weight of 11,000. The glycolic acid copolymer obtained above in the molten state was cooled to solidify the glycolic acid copolymer. The resultant solidified glycolic acid copolymer was taken out of the separable flask and then subjected to further polymerization by the operations explained below.

(b) Melt Polycondensation of a Low Molecular Weight Glycolic Acid Copolymer, Followed by crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 42,600 and a melting temperature of 189° C. (hereinafter referred to as "crystallized glycolic acid copolymer P-7").

(b-2) Solid Phase Polymerization of the Pulverized, Crystallized Glycolic Acid Copolymer Obtained in Item (b-1)

The above-obtained crystallized glycolic acid copolymer P-7 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 187,000. The glycolic acid copolymer was comprised of 88.97% by mole of glycolic acid monomer units, 0.03% by mole of diglycolic acid monomer units and 11.00% by mole of lactic acid monomer units as non-glycolic, hydroxycarboxylic acid monomer units, wherein the lactic acid monomer units constituted a plurality of segments having an average chain length of 1.62 in terms of the average number of lactic acid monomer units. The degree of discoloration was 29.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the oxygen gas permeability of the melt-shaped sheet of the glycolic acid copolymer was 8.4 (cc/m²·day·atm), which means that the melt-shaped sheet had satisfactory gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil. However, with respect to the melt heat stability, it was found that the degree of discoloration of the glycolic acid copolymer after the melt heat stability test was 105, and that the glycolic acid copolymer was discolored to assume a brown color.

The results of the analysis and the results of the evaluation are shown in Table 2.

EXAMPLE 6

(a) Production of a Low Molecular Weight Glycolic Acid Copolymer

A polycondensation reaction operation (comprised of the steps (A), (B) and (C)) was performed in substantially the same manner as in Example 1, except for the use of the following operation conditions (I) and (II).

(I) Into substantially the same reaction apparatus (separable flask) as in Example 1 were introduced 360 g of a 70% by weight aqueous glycolic acid solution (having a diglycolic acid content of 0.005% by mole or less, based on the molar amount of glycolic acid), 40.83 g of a 90% by weight aqueous L-lactic acid solution, 0.12 g of neopentylglycol and tetraisopropoxy germanium in an amount of 0.05% by weight, based on the total weight of the above-mentioned raw materials (the amount of germanium atom was $2.2 \times 10^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid, lactic acid and neopentylglycol were 0.89, 0.1097 and 0.0003, respectively.

(II) In step (A), after the dehydration was performed for 1.5 hours under a stream of nitrogen, a polycondensation reaction was performed under conditions wherein the oil bath temperature was maintained at 150° C., and the pressure/time conditions were sequentially changed as follows: $5.0 \times 10^4$ Pa for 1 hour, $2.5 \times 10^4$ Pa for 0.5 hour, $1.0 \times 10^4$ Pa for 50 minutes, $5.0 \times 10^3$ Pa for 50 minutes and $2.0 \times 10^3$ Pa for 90 minutes.

Except for the use of these operation conditions (I) and (II), a polycondensation reaction operation (comprised of the steps (A), (B) and (C)) was performed in substantially the same manner as in item (a) of Example 1, to thereby obtain a glycolic acid copolymer having a weight average molecular weight of 14,400.

During the reaction in step (A), the temperature of the reaction mixture gradually elevated; however, the temperature of the reaction mixture became almost constant at 146° C. after the reaction pressure was changed to $1.0 \times 10^4$ Pa. It was found that the weight average molecular weight of the glycolic acid copolymer just after completion of step (A) was 2,500, and that the weight average molecular weight of the glycolic acid copolymer at the point in time at which the reaction temperature reached 190° C. was 2,700. It was also found that, from the point in time at which the reaction temperature exceeded 190° C., it took 90 minutes for the weight average molecular weight of the glycolic acid copolymer to reach 10,000. The increasing rate of the weight average molecular weight within this period of 90 minutes was 4,867/hour.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 44,200 and a melting temperature of 183° C. (hereinafter referred to as "crystallized glycolic acid copolymer P-8").

The crystallized glycolic acid copolymer P-8 was then subjected to solid phase polymerization as follows.

(b-2) Solid Phase Polymerization of the Pulverized, Crystallized Glycolic Acid Copolymer Obtained in Item (b-1)

The above-obtained crystallized glycolic acid copolymer P-8 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 187,000. The glycolic acid copolymer was comprised of 88.94% by mole of glycolic acid monomer units, 0.03% by mole of diglycolic acid monomer units, 10.99% by mole of lactic acid monomer units as non-glycolic, hydroxycarboxylic acid monomer units and 0.04% by mole of neopentylglycol monomer units, wherein the lactic acid monomer units constituted a plurality of segments having an average chain length of 1.01 in terms of the average number of lactic acid monomer units. The degree of discoloration was 29.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 39, which means that the melt heat stability was fairly good. The oxygen gas permeability of the melt-shaped sheet of the glycolic acid copolymer was 8.3 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 3.

EXAMPLE 7

(a) Production of a Low Molecular Weight Glycolic Acid Copolymer

Into substantially the same reaction apparatus (separable flask) as in Example 1 were introduced 360 g of a 70% by weight aqueous glycolic acid solution (having a diglycolic acid content of 0.005% by mole or less, based on the molar amount of glycolic acid), 40.83 g of a 90% by weight aqueous L-lactic acid solution, 0.136 g of 1,6-hexanediol and tetraisopropoxy germanium in an amount of 0.05% by weight, based on the total weight of the above-mentioned raw materials (the amount of germanium atom was 2.2×10$^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid, lactic acid and 1,6-hexanediol were 0.89, 0.1097 and 0.0003, respectively. Except for the use of these operation conditions, a polycondensation reaction operation (comprised of the steps (A), (B) and (C)) was performed in substantially the same manner as in item (a) of Example 6, to thereby obtain a glycolic acid copolymer having a weight average molecular weight of 14,400.

During the reaction in step (A), the temperature of the reaction mixture gradually elevated; however, the temperature of the reaction mixture became almost constant at 146° C. after the reaction pressure was changed to 1.0×10$^4$ Pa. It was found that the weight average molecular weight of the glycolic acid copolymer just after completion of step (A) was 2,500, and that the weight average molecular weight of the glycolic acid copolymer at the point in time at which the reaction temperature reached 190° C. was 2,700. It was also found that, from the point in time at which the reaction temperature exceeded 190° C., it took 90 minutes for the weight average molecular weight of the glycolic acid copolymer to reach 10,000. The increasing rate of the weight average molecular weight within this period of 90 minutes was 4,867/hour.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 43,800 and a melting temperature of 183° C. (hereinafter referred to as "crystallized glycolic acid copolymer P-9")

(b-2) Solid Phase Polymerization of the Pulverized, Crystallized Glycolic Acid Copolymer Obtained in Item (b-1)

Subsequently, the above-obtained crystallized glycolic acid copolymer P-9 was subjected to a solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 187,000. The glycolic acid copolymer was comprised of 88.94% by mole of glycolic acid monomer units; 0.03% by mole of diglycolic acid monomer units; 10.99% by mole of lactic acid monomer units as non-glycolic, hydroxycarboxylic acid monomer units; and 0.04% by mole of 1,6-hexanediol monomer units, wherein the lactic acid monomer units constituted a plurality of segments having an average chain length of 1.01 in terms of the average number of lactic acid monomer units. The degree of discoloration was 33.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 43, which means that the melt heat stability was fairly good. The oxygen gas permeability of the melt-shaped sheet of the glycolic acid copolymer was 8.2 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 3.

EXAMPLE 8

(a) Production of a Low Molecular Weight Glycolic Acid Copolymer

Into substantially the same reaction apparatus (separable flask) as in Example 1 were introduced 360 g of a 70% by weight aqueous glycolic acid solution (having a diglycolic acid content of 0.005% by mole or less, based on the molar amount of glycolic acid), 40.83 g of a 90% by weight aqueous L-lactic acid solution, 0.04 g of trimethylol propane and tetraisopropoxy germanium in an amount of 0.05% by weight, based on the total weight of the above-mentioned raw materials (the amount of germanium atom was $2.2 \times 10^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid, lactic acid and trymethylol propane were 0.8903, 0.10962 and 0.00008, respectively. Except for the use of these operation conditions, a polycondensation reaction operation (comprised of the steps (A), (B) and (C)) was performed in substantially the same manner as in item (a) of Example 6, to thereby obtain a glycolic acid copolymer having a weight average molecular weight of 15,600.

During the reaction in step (A), the temperature of the reaction mixture gradually elevated; however, the temperature of the reaction mixture became almost constant at 146° C. after the reaction pressure was changed to $1.0 \times 10^4$ Pa. It was found that the weight average molecular weight of the glycolic acid copolymer just after completion of step (A) was 2,700, and that the weight average molecular weight of the glycolic acid copolymer at the point in time at which the reaction temperature reached 190° C. was 2,900. It was also found that, from the point in time at which the reaction temperature exceeded 190° C., it took 85 minutes for the weight average molecular weight of the glycolic acid copolymer to reach 10,000. The increasing rate of the weight average molecular weight within this period of 85 minutes was 5,012/hour.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 46,500 and a melting temperature of 184° C. (hereinafter referred to as "crystallized glycolic acid copolymer P-10").

(b-2) Solid Phase Polymerization of the Pulverized, Crystallized Glycolic Acid Copolymer Obtained in Item (b-1)

Subsequently, the above-obtained crystallized glycolic acid copolymer P-10 was subjected to a solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 325,000. The glycolic acid copolymer was comprised of 88.98% by mole of glycolic acid monomer units; 0.03% by mole of diglycolic acid monomer units; 10.98% by mole of lactic acid monomer units as non-glycolic, hydroxycarboxylic acid monomer units; and 0.01% by mole of trimethylol propane monomer units, wherein the lactic acid monomer units constituted a plurality of segments having an average chain length of 1.01 in terms of the average number of lactic acid monomer units. The degree of discoloration was 34.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 44, which means that the melt heat stability was fairly good. The oxygen gas permeability of the melt-shaped sheet of the glycolic acid copolymer was 8.3 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 3.

EXAMPLE 9

(a) Production of a Low Molecular Weight Glycolic Acid Copolymer

Into substantially the same reaction apparatus (separable flask) as in Example 1 were introduced 360 g of a 70% by weight aqueous glycolic acid solution (having a diglycolic acid content of 0.005% by mole or less, based on the molar amount of glycolic acid), 40.83 g of a 90% by weight aqueous L-lactic acid solution, 0.12 g of neopentyl glycol, 0.04 g of trimethylol propane and tetraisopropoxy germanium in an amount of 0.05% by weight, based on the total weight of the above-mentioned raw materials (the amount of germanium atom was $2.2 \times 10^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid, lactic acid, neopentyl glycol and trimethylol propane were 0.89, 0.1096, 0.00032 and 0.00008, respectively. Except for the use of these operation conditions, a polycondensation reaction operation (comprised of the steps (A), (B) and (C)) was performed in substantially the same manner as in item (a) of Example 6, to thereby obtain a glycolic acid copolymer having a weight average molecular weight of 16,000.

During the reaction in step (A), the temperature of the reaction mixture gradually elevated; however, the temperature of the reaction mixture became almost constant at 146° C. after the reaction pressure was changed to $1.0 \times 10^4$ Pa. It was found that the weight average molecular weight of the glycolic acid copolymer just after completion of step (A) was 2,900, and that the weight average molecular weight of the glycolic acid copolymer at the point in time at which the reaction temperature reached 190° C. was 3,100. It was also found that, from the point in time at which the reaction temperature exceeded 190° C., it took 80 minutes for the weight average molecular weight of the glycolic acid copolymer to reach 10,000. The increasing rate of the weight average molecular weight within this period of 80 minutes was 5,175/hour.

(b) Melt Polycondensation of a Low Molecular Weight Glycolic Acid Copolymer, Followed by crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 47,300 and a melting temperature of 184° C. (hereinafter referred to as "crystallized glycolic acid copolymer P-11").

(b-2) Solid Phase Polymerization of the Pulverized, Crystallized Glycolic Acid Copolymer Obtained in Item (b-1)

Subsequently, the above-obtained crystallized glycolic acid copolymer P-11 was subjected to a solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 330,000. The glycolic acid copolymer was comprised of 88.94% by mole of glycolic acid monomer units; 0.03% by mole of diglycolic acid monomer units; 10.98% by mole of lactic acid monomer units as non-glycolic, hydroxycarboxylic acid monomer units; 0.04% by mole of neopentyl glycol monomer units; and 0.01% by mole of trimethylol propane monomer units, wherein the lactic acid monomer units constituted a plurality of segments having an average chain length of 1.01 in terms of the average number of lactic acid monomer units. The degree of discoloration was 33.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 44, which means that the melt heat stability was fairly good. The oxygen gas permeability of the melt-shaped sheet of the glycolic acid copolymer was 8.6 ($cc/m^2 \cdot day \cdot atm$), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 3.

EXAMPLE 10

(a) Production of a Glycolic Acid Copolymer

The glycolic acid copolymer having a weight average molecular weight of 16,000 (i.e., low molecular weight glycolic acid copolymer) obtained in item (a) of Example 9 was subjected to melt polycondensation reaction in substantially the same manner as in item (b) of Example 1, to thereby obtain a glycolic acid copolymer.

(c) The Results of the Analysis of the Glycolic Acid Copolymer

The weight average molecular weight of the glycolic acid copolymer obtained in item (a) above was 163,000. The glycolic acid copolymer was comprised of 88.97% by mole of glycolic acid monomer units; 0.04% by mole of diglycolic acid monomer units; 10.94% by mole of lactic acid monomer units as non-glycolic, hydroxycarboxylic acid monomer units; 0.04% by mole of neopentyl glycol monomer units; and 0.01% by mole of trimethylol propane monomer units, wherein the lactic acid monomer units constituted a plurality of segments having an average chain length of 1.01 in terms of the average number of lactic acid monomer units. The degree of discoloration was 39.

(d) Evaluation of the Glycolic Acid Copolymer and a Melt-Shaped Sheet of the Glycolic Acid Copolymer The melt heat stability of the glycolic acid copolymer obtained in item (a) above and the properties of a melt-shaped sheet of the glycolic acid copolymer were evaluated. It was found that the degree of discoloration of the glycolic acid copolymer after the melt heat stability test was 48, which means that the melt heat stability was fairly good. The oxygen gas permeability of the melt-shaped sheet of the glycolic acid copolymer was 8.7 ($cc/m^2 \cdot day \cdot atm$), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 3.

EXAMPLE 11

(a) Production of a Low Molecular Weight Glycolic Acid Copolymer

Into substantially the same reaction apparatus (separable flask) as in Example 1 were introduced 360 g of a 70% by weight aqueous glycolic acid solution (having a diglycolic acid content of 0.01% by mole, based on the molar amount of glycolic acid), 40.83 g of a 90% by weight aqueous L-lactic acid solution, 0.12 g of neopentyl glycol and tetraisopropoxy germanium in an amount of 0.05% by weight, based on the total weight of the above-mentioned raw materials (the amount of germanium atom was $2.2 \times 10^{-6}$ mole per g of the monomers), to obtain a raw material mixture. The calculated molar ratios of glycolic acid, lactic acid, neopentyl glycol and diglycolic acid were 0.89, 0.10957, 0.00034 and 0.00009, respectively. Except for the use of these operation conditions, a polycondensation reaction operation (comprised of the steps (A), (B) and (C)) was performed in substantially the same manner as in item (a) of Example 6, to thereby obtain a glycolic acid copolymer having a weight average molecular weight of 14,300.

During the reaction in step (A), the temperature of the reaction mixture gradually elevated; however, the temperature of the reaction mixture became almost constant at 146° C. after the reaction pressure was changed to $1.0 \times 10^4$ Pa. It was found that the weight average molecular weight of the glycolic acid copolymer just after completion of step (A) was 2,500, and that the weight average molecular weight of the glycolic acid copolymer at the point in time at which the reaction temperature reached 190° C. was 2,700. It was also found that, from the point in time at which the reaction temperature exceeded 190° C., it took 90 minutes for the weight average molecular weight of the glycolic acid copolymer to reach 10,000. The increasing rate of the weight average molecular weight within this period of 90 minutes was 4,867/hour.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 44,100 and a melting temperature of 184° C. (hereinafter referred to as "crystallized glycolic acid copolymer P-12").

(b-2) Solid Phase Polymerization of the Pulverized, Crystallized Glycolic Acid Copolymer Obtained in Item (b-1)

Subsequently, the above-obtained crystallized glycolic acid copolymer P-12 was subjected to a solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 186,000. The glycolic acid copolymer was comprised of 88.96% by mole of glycolic acid monomer units; 0.04% by mole of diglycolic acid monomer units; 10.96% by mole of lactic acid monomer units as non-glycolic, hydroxycarboxylic acid monomer units; and 0.04% by mole of neopentyl glycol monomer units, wherein the lactic acid monomer units constituted a plurality of segments having an average chain length of 1.01 in terms of the average number of lactic acid monomer units. The degree of discoloration was 29.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 40, which means that the melt heat stability was fairly good. The oxygen gas permeability of the melt-shaped sheet of the glycolic acid copolymer was 8.5 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 4.

EXAMPLE 12

(a) Production of a Low Molecular Weight Glycolic Acid Copolymer

Into substantially the same reaction apparatus (separable flask) as in Example 1 were introduced 360 g of a 70% by weight aqueous glycolic acid solution (having a diglycolic acid content of 0.005% by mole or less, based on the molar amount of glycolic acid), 40.83 g of a 90% by weight aqueous L-lactic acid solution, 0.12 g of neopentyl glycol, 0.02 g of oxalic acid and tetraisopropoxy germanium in an amount of 0.05% by weight, based on the total weight of the above-mentioned raw materials (the amount of germanium atom was 2.2×10$^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid, lactic acid, neopentyl glycol and oxalic acid were 0.89, 0.1096, 0.00034 and 0.00006, respectively. Except for the use of these operation conditions, a polycondensation reaction operation (comprised of the steps (A), (B) and (C)) was performed in substantially the same manner as in item (a) of Example 6, to thereby obtain a glycolic acid copolymer having a weight average molecular weight of 14,300.

During the reaction in step (A), the temperature of the reaction mixture gradually elevated; however, the temperature of the reaction mixture became almost constant at 146° C. after the reaction pressure was changed to 1.0×10$^4$ Pa. It was found that the weight average molecular weight of the glycolic acid copolymer just after completion of step (A) was 2,500, and that the weight average molecular weight of the glycolic acid copolymer at the point in time at which the reaction temperature reached 190° C. was 2,700. It was also found that, from the point in time at which the reaction temperature exceeded 190° C., it took 90 minutes for the weight average molecular weight of the glycolic acid copolymer to reach 10,000. The increasing rate of the weight average molecular weight within this period of 90 minutes was 4,867/hour.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 44,200 and a melting temperature of 184° C. (hereinafter referred to as "crystallized glycolic acid copolymer P-13").

(b-2) Solid Phase Polymerization of the Pulverized, Crystallized Glycolic Acid Copolymer Obtained in Item (b-1)

Subsequently, the above-obtained crystallized glycolic acid copolymer P-13 was subjected to a solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 185,000. The glycolic acid copolymer was comprised of 88.96% by mole of glycolic acid monomer units; 0.03% by mole of diglycolic acid monomer units; 10.96% by mole of lactic acid monomer units as non-glycolic, hydroxycarboxylic acid monomer units; 0.04% by mole of neopentyl glycol monomer units; and 0.01% by mole of oxalic acid monomer units wherein the lactic acid monomer units constituted a plurality of segments having an average chain length of 1.01 in terms of the average number of lactic acid monomer units The degree of discoloration was 28.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 39, which means that the melt heat stability was fairly good. The oxygen gas permeability of the melt-shaped sheet of the glycolic acid copolymer was 8.5 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 4.

EXAMPLE 13

(a) Production of a Low Molecular Weight Glycolic Acid Copolymer

Into substantially the same reaction apparatus (separable flask) as in Example 1 were introduced 365 g of a 70% by weight aqueous glycolic acid solution (having a diglycolic acid content of 0.005% by mole or less, based on the molar amount of glycolic acid), 36 g of a 90% by weight aqueous L-lactic acid solution, 2.90 g of neopentyl glycol, 3.85 g of adipic acid and tetraisopropoxy germanium in an amount of 0.05% by weight, based on the total weight of the above-mentioned raw materials (the amount of germanium atom was 2.2×10$^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid, lactic acid, neopetyl glycol and adipic acid were 0.89, 0.0957, 0.0073 and 0.007, respectively. Except for the use of these operation conditions, a polycondensation reaction operation (comprised of the steps (A), (B) and (C)) was performed in substantially the same manner as in item (a) of Example 6, to thereby obtain a glycolic acid copolymer having a weight average molecular weight of 14,400.

During the reaction in step (A), the temperature of the reaction mixture gradually elevated; however, the temperature of the reaction mixture became almost constant at 146° C. after the reaction pressure was changed to 1.0×10$^4$ Pa. It was found that the weight average molecular weight of the glycolic acid copolymer just after completion of step (A) was 2,500, and that the weight average molecular weight of the glycolic acid copolymer at the point in time at which the reaction temperature reached 190° C. was 2,700. It was also found that, from the point in time at which the reaction temperature exceeded 190° C., it took 90 minutes for the weight average molecular weight of the glycolic acid copolymer to reach 10,000. The increasing rate of the weight average molecular weight within this period of 90 minutes was 4,867/hour.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 44,500 and a melting temperature of 183° C. (hereinafter referred to as "crystallized glycolic acid copolymer P-14").

(b-2) Solid Phase Polymerization of the Pulverized, Crystallized Glycolic Acid Copolymer Obtained in Item (b-1)

Subsequently, the above-obtained crystallized glycolic acid copolymer P-14 was subjected to a solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 189,000. The glycolic acid copolymer was comprised of 88.63% by mole of glycolic acid monomer units; 0.03% by mole of diglycolic acid monomer units; 9.57% by mole of lactic acid monomer units as non-glycolic, hydroxycarboxylic acid monomer units; 0.90% by mole of neopentyl glycol monomer units; and 0.87% by mole of adipic acid monomer units, wherein the lactic acid monomer units constituted a plurality of segments having an average chain length of 1.05 in terms of the average number of lactic acid monomer units. The degree of discoloration was 30.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 39, which means that the melt heat stability was fairly good. The oxygen gas permeability of the melt-shaped sheet of the glycolic acid copolymer was 8.8 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 4.

EXAMPLE 14

(a) Production of a Low Molecular Weight Glycolic Acid Copolymer

Into substantially the same reaction apparatus (separable flask) as in Example 1 were introduced 365 g of a 70% by weight aqueous glycolic acid solution (having a diglycolic acid content of 0.005% by mole or less, based on the molar amount of glycolic acid), 36 g of a 90% by weight aqueous L-lactic acid solution, 2.80 g of neopentyl glycol, 0.03 g of trimethylol propane, 3.85 g of adipic acid and tetraisopropoxy germanium in an amount of 0.05% by weight, based on the total weight of the above-mentioned raw materials (the amount of germanium atom was 2.2×10$^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid, lactic acid, neopentyl glycol, trimethylol propane and adipic acid were 0.8905, 0.09535, 0.00711, 0.00006 and 0.00698, respectively. Except for the use of these operation conditions, a polycondensation reaction operation (comprised of the steps (A), (B) and (C)) was performed in substantially the same manner as in item (a) of Example 6, to thereby obtain a glycolic acid copolymer having a weight average molecular weight of 15,900.

During the reaction in step (A), the temperature of the reaction mixture gradually elevated; however, the temperature of the reaction mixture became almost constant at 146° C. after the reaction pressure was changed to 1.0×10$^4$ Pa. It was found that the weight average molecular weight of the glycolic acid copolymer just after completion of step (A) was 2,800, and that the weight average molecular weight of the glycolic acid copolymer at the point in time at which the reaction temperature reached 190° C. was 3,000. It was also found that, from the point in time at which the reaction temperature exceeded 190° C., it took 85 minutes for the weight average molecular weight of the glycolic acid copolymer to reach 10,000. The increasing rate of the weight average molecular weight within this period of 85 minutes was 4,941/hour.

(b) Melt Polycondensation of a Low Molecular Weight Glycolic Acid Copolymer, Followed by crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 46,800 and a melting temperature of 180° C. (hereinafter referred to as "crystallized glycolic acid copolymer P-15").

(b-2) Solid Phase Polymerization of the Pulverized, Crystallized Glycolic Acid Copolymer Obtained in Item (b-1)

Subsequently, the above-obtained crystallized glycolic acid copolymer P-15 was subjected to a solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 280,000. The glycolic acid copolymer was comprised of 88.62% by mole of glycolic acid monomer units; 0.03% by mole of diglycolic acid monomer units; 9.56% by mole of lactic acid monomer units as non-glycolic, hydroxycarboxylic acid monomer units; 0.90% by mole of neopentyl glycol monomer units; 0.01% by mole of trimethylol propane monomer units; and 0.88% by mole of adipic acid monomer units, wherein the lactic acid monomer units constituted a plurality of segments having an average chain length of 1.01 in terms of the average number of lactic acid monomer units. The degree of discoloration was 33.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 42, which means that the melt heat stability was fairly good. The oxygen gas permeability of the melt-shaped sheet of the glycolic acid copolymer was 9.2 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 4.

EXAMPLE 15

(a) Production of a Low Molecular Weight Glycolic Acid Copolymer

Into substantially the same reaction apparatus (separable flask) as in Example 1 were introduced 365 g of a 70% by weight aqueous glycolic acid solution (having a diglycolic acid content of 0.005% by mole or less, based on the molar amount of glycolic acid), 30 g of a 90% by weight aqueous L-lactic acid solution, 6.02 g of neopentyl glycol, 8.30 g of adipic acid and tetraisopropoxy germanium in an amount of 0.05% by weight, based on the total weight of the above-mentioned raw materials (the amount of germanium atom was $2.2 \times 10^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid, lactic acid, neopentyl glycol and adipic acid were 0.89, 0.0797, 0.0153 and 0.015, respectively. Except for the use of these operation conditions, a polycondensation reaction operation (comprised of the steps (A), (B) and (C)) was performed in substantially the same manner as in item (a) of Example 6, to thereby obtain a glycolic acid copolymer having a weight average molecular weight of 14,400.

During the reaction in step (A), the temperature of the reaction mixture gradually elevated; however, the temperature of the reaction mixture became almost constant at 146° C. after the reaction pressure was changed to $1.0 \times 10^4$ Pa. It was found that the weight average molecular weight of the glycolic acid copolymer just after completion of step (A) was 2,500, and that the weight average molecular weight of the glycolic acid copolymer at the point in time at which the reaction temperature reached 190° C. was 2,700. It was also found that, from the point in time at which the reaction temperature exceeded 190° C., it took 90 minutes for the weight average molecular weight of the glycolic acid copolymer to reach 10,000. The increasing rate of the weight average molecular weight within this period of 90 minutes was 4,867/hour.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 44,700 and a melting temperature of 182° C. (hereinafter referred to as "crystallized glycolic acid copolymer P-16").

(b-2) Solid Phase Polymerization of the Pulverized, Crystallized Glycolic Acid Copolymer Obtained in Item (b-1)

Subsequently, the above-obtained crystallized glycolic acid copolymer P-16 was subjected to a solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 189,000. The glycolic acid copolymer was comprised of 88.25% by mole of glycolic acid monomer units; 0.03% by mole of diglycolic acid monomer units; 7.93% by mole of lactic acid monomer units as non-glycolic, hydroxycarboxylic acid monomer units; 1.91% by mole of neopentyl glycol monomer units; and 1.88% by mole of adipic acid monomer units, wherein the lactic acid monomer units constituted a plurality of segments having an average chain length of 1.05 in terms of the average number of lactic acid monomer units. The degree of discoloration was 30.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 38, which means that the melt heat stability was fairly good. The oxygen gas permeability of the melt-shaped sheet of the glycolic acid copolymer was 12.0 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 4.

COMPARATIVE EXAMPLE 5

(a) Production of a Low Molecular Weight Glycolic Acid Copolymer

Into substantially the same reaction apparatus (separable flask) as in Example 1 were introduced 360 g of a 70% by weight aqueous glycolic acid solution (having a diglycolic acid content of 0.005% by mole or less, based on the molar amount of glycolic acid), 15 g of a 90% by weight aqueous L-lactic acid solution, 2.7 g of neopentyl glycol, 3.64 g of adipic acid and tetraisopropoxy germanium in an amount of 0.05% by weight, based on the total weight of the above-mentioned raw materials (the amount of germanium atom was 2.2×10$^{-6}$ mole per g of the monomers), to obtain a raw material mixture. The molar ratio of diglycolic acid in the obtained raw material mixture was less than 0.00005, so that the calculated molar ratio of diglycolic acid was 0. Therefore, the calculated molar ratios of glycolic acid, lactic acid, neopentyl glycol and adipic acid were 0.9428, 0.0427, 0.0074 and 0.0071, respectively. Except for the use of these operation conditions, a polycondensation reaction operation (comprised of the steps (A), (B) and (C)) was performed in substantially the same manner as in item (a) of Example 3, to thereby obtain a glycolic acid copolymer having a weight average molecular weight of 16,200.

During the reaction in step (A), the temperature of the reaction mixture gradually elevated; however, the temperature of the reaction mixture became almost constant at 146° C. after the reaction pressure was changed to 1.0×10$^4$ Pa. It was found that the weight average molecular weight of the glycolic acid copolymer just after completion of step (A) was 1,900, and that the weight average molecular weight of the glycolic acid copolymer at the point in time at which the reaction temperature reached 190° C. was 2,100. It was also found that, from the point in time at which the reaction temperature exceeded 190° C., it took 80 minutes for the weight average molecular weight of the glycolic acid copolymer to reach 10,000. The increasing rate of the weight average molecular weight within this period of 80 minutes was 5,925/hour.

(b) Melt Polycondensation of a Low Molecular Weight Glycolic Acid Copolymer, Followed by crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 3, to thereby obtain a pulverized, crystallized glycolic acid copolymer having a weight average molecular weight of 44,500 and a melting temperature of 208° C. (hereinafter referred to as "crystallized glycolic acid copolymer P-17").

(B-2) Solid Phase Polymerization of the Pulverized, Crystallized Glycolic Acid Copolymer Obtained in Item (b-1)

Subsequently, the above-obtained crystallized glycolic acid copolymer P-17 was subjected to a solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 165,000. The glycolic acid copolymer was comprised of 93.95% by mole of glycolic acid monomer units; 0.03% by mole of diglycolic acid monomer units; 4.21% by mole of lactic acid monomer units as non-glycolic, hydroxycarboxylic acid monomer units; 0.92% by mole of neopentyl glycol monomer units; and 0.89% by mole of adipic acid monomer units, wherein the lactic acid monomer units constituted a plurality of segments having an average chain length of 1.02 in terms of the average number of lactic acid monomer units. The degree of discoloration was 34.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the oxygen gas permeability of the melt-shaped sheet of the glycolic acid copolymer was 8.3 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil. However, with respect to the melt heat stability, it was found that the degree of discoloration of the glycolic acid copolymer after the melt heat stability test was 110, and that the glycolic acid copolymer was discolored to assume a brown color.

The results of the analysis and the results of the evaluation are shown in Table 4.

EXAMPLE 16

(a) Production of a Low Molecular Weight Glycolic Acid Copolymer

Into substantially the same reaction apparatus (separable flask) as in Example 1 were introduced 360 g of a 70% by weight aqueous glycolic acid solution (having a diglycolic acid content of 0.005% by mole or less, based on the molar amount of glycolic acid), 40.83 g of a 90% by weight aqueous L-lactic acid solution and tetraisopropoxy germanium in an amount of 0.05% by weight, based on the total weight of the above-mentioned aqueous solutions (the amount of germanium atom was 2.2×10$^{-6}$ mole per g of the monomers), to obtain a raw material mixture. The separable flask was then purged with nitrogen. The molar ratio of diglycolic acid in the obtained raw material mixture was less than 0.00005, so that the calculated molar ratio of diglycolic acid was 0. Therefore, the calculated molar ratios of glycolic acid and lactic acid were 0.89 and 0.11, respectively.

Subsequently, the separable flask was immersed in an oil bath preheated to 120° C. and, then, stirring of the raw material mixture was performed at a revolution rate of 200 rpm for 1 hour under a stream of nitrogen, thereby effecting a dehydration. Then, a polycondensation reaction was performed under conditions wherein the oil bath temperature was maintained at 120° C., and the pressure/time conditions were sequentially changed as follows: $8.0 \times 10^4$ Pa for 1 hour, $6.0 \times 10^4$ Pa for 1 hour, $5.0 \times 10^4$ Pa for 1 hour, $4.0 \times 10^4$ Pa for 1 hour, $2.5 \times 10^4$ Pa for 1 hour, $1.0 \times 10^4$ Pa for 1 hour, $5.0 \times 10^3$ Pa for 1 hour, and $2.0 \times 10^3$ Pa for 3 hours, to thereby obtain a glycolic acid copolymer. During the reaction, the temperature of the reaction mixture gradually elevated; however, the temperature of the reaction mixture became almost constant at 116° C. after the reaction pressure was changed to $5.0 \times 10^3$ Pa. Thus, step (A) was completed. A small portion of the glycolic acid copolymer obtained in step (A) above was sampled and subjected to measurement of the molecular weight. It was found that the weight average molecular weight of the glycolic acid copolymer was 1,500.

The reaction temperature was gradually elevated to 190° C. over 40 minutes while maintaining the revolution rate and the reduced pressure (step (B)). A small portion of the glycolic acid copolymer at the point in time at which the reaction temperature reached 190° C. was sampled and subjected to measurement of the molecular weight. It was found that the weight average molecular weight of the glycolic acid copolymer was 1,700.

Subsequently, the reaction temperature was elevated to 200° C. over 10 minutes, whereupon the revolution rate was changed to 600 rpm and the reduced pressure was changed to $4.0 \times 10^2$ Pa, followed by performing a reaction. The reaction was continued until the total reaction time after the reaction temperature exceeded 190° C. became 2.5 hours, thereby obtaining a glycolic acid copolymer having a weight average molecular weight of 13,000 (step (C)). From the point in time at which the reaction temperature exceeded 190° C., it took 110 minutes for the weight average molecular weight of the glycolic acid copolymer to reach 10,000. The increasing rate of the weight average molecular weight within this period of 110 minutes was 4,527/hour.

The glycolic acid copolymer obtained above in the molten state was cooled to obtain a solidified glycolic acid copolymer having a low molecular weight. Then, the obtained low molecular weight glycolic acid copolymer was taken out of the separable flask and further polymerized by the operations explained below.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 42,500 and a melting temperature of 184° C. (hereinafter referred to as "crystallized glycolic acid copolymer P-18").

(b-2) Solid Phase Polymerization of the Pulverized, Crystallized Glycolic Acid Copolymer Obtained in Item (b-1)

The above-obtained crystallized glycolic acid copolymer P-18 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 178,000. The glycolic acid copolymer was comprised of 88.98% by mole of glycolic acid monomer units, 0.02% by mole of diglycolic acid monomer units and 11.00% by mole of lactic acid monomer units as non-glycolic, hydroxycarboxylic acid monomer units, wherein the lactic acid monomer units constituted a plurality of segments having an average chain length of 1.02 in terms of the average number of lactic acid monomer units. The degree of discoloration was 28.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 39, which means that the melt heat stability was fairly good. The oxygen gas permeability of the melt-shaped sheet of the glycolic acid copolymer was 8.1 ($cc/m^2 \cdot day \cdot atm$), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 5.

EXAMPLE 17

(a) Production of a Low Molecular Weight Glycolic Acid Copolymer

A polycondensation reaction operation (comprised of the steps (A), (B) and (C)) was performed in substantially the same manner as in item (a) of Example 2, except that, in step (A), after the dehydration was performed for 1.5 hours under a stream of nitrogen, a polycondensation reaction was performed under conditions wherein the oil bath temperature was maintained at 150° C., and the pressure/time conditions were sequentially changed as follows: $5.0 \times 10^4$ Pa for 1 hour, $2.5 \times 10^4$ Pa for 0.5 hour, $1.0 \times 10^4$ Pa for 50 minutes and $5.0 \times 10^3$ Pa for 25 minutes, to thereby obtain a glycolic acid copolymer having a weight average molecular weight of 12,800.

During the reaction in step (A), the temperature of the reaction mixture gradually elevated; however, the temperature of the reaction mixture became almost constant at 146° C. after the reaction pressure was changed to $1.0 \times 10^4$ Pa. It was found that the weight average molecular weight of the glycolic acid copolymer just after completion of step (A) was 900, and that the weight average molecular weight of the glycolic acid copolymer at the point in time at which the reaction temperature reached 190° C. was 1,100. It was also found that, from the point in time at which the reaction temperature exceeded 190° C., it took 110 minutes for the weight average molecular weight of the glycolic acid copolymer to reach 10,000. The increasing rate of the weight average molecular weight within this period of 110 minutes was 4,855/hour.

(b) Melt Polycondensation of a Low Molecular Weight Glycolic Acid Copolymer, Followed by crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 42,800 and a melting temperature of 184° C. (hereinafter referred to as "crystallized glycolic acid copolymer P-1-9").

(b-2) Solid Phase Polymerization of the Pulverized, Crystallized Glycolic Acid Copolymer Obtained in Item (b-1)

The above-obtained crystallized glycolic acid copolymer P-19 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 148,000. The glycolic acid copolymer was comprised of 88.93% by mole of glycolic acid monomer units, 0.06% by mole of diglycolic acid monomer units and 11.01% by mole of lactic acid monomer units as non-glycolic, hydroxycarboxylic acid monomer units, wherein the lactic acid monomer units constituted a plurality of segments having an average chain length of 1.05 in terms of the average number of lactic acid monomer units. The degree of discoloration was 28.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 44, which means that the melt heat stability was fairly good. The oxygen gas permeability of the melt-shaped sheet of the glycolic acid copolymer was 8.1 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 5.

EXAMPLE 18

(a) Production of a Low Molecular Weight Glycolic Acid Copolymer

A polycondensation reaction operation (comprised of the steps (A), (B) and (C)) was performed in substantially the same manner as in Example 17, except that, in step (B), the reaction temperature was gradually elevated to 190° C. over 80 minutes while maintaining the revolution rate and the reduced pressure, to thereby obtain a glycolic acid copolymer having a weight average molecular weight of 13,800.

During the reaction in step (A), the temperature of the reaction mixture gradually elevated; however, the temperature of the reaction mixture became almost constant at 146° C. after the reaction pressure was changed to 1.0×10$^4$ Pa. It was found that the weight average molecular weight of the glycolic acid copolymer just after completion of step (A) was 900, and that the weight average molecular weight of the glycolic acid copolymer at the point in time at which the reaction temperature reached 190° C. was 2,100. It was also found that, from the point in time at which the reaction temperature exceeded 190° C., it took 100 minutes for the weight average molecular weight of the glycolic acid copolymer to reach 10,000. The increasing rate of the weight average molecular weight within this period of 100 minutes was 4,740/hour.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 43,500 and a melting temperature of 185° C. (hereinafter referred to as "crystallized glycolic acid copolymer P-20").

(b-2) Solid Phase Polymerization of the Pulverized, Crystallized Glycolic Acid Copolymer Obtained in Item (b-1)

The above-obtained crystallized glycolic acid copolymer P-20 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 132,000. The glycolic acid copolymer was comprised of 88.91% by mole of glycolic acid monomer units, 0.08% by mole of diglycolic acid monomer units and 11.01% by mole of lactic acid monomer units as non-glycolic, hydroxycarboxylic acid monomer units, wherein the lactic acid monomer units constituted a plurality of segments having an average chain length of 1.02 in terms of the average number of lactic acid monomer units. The degree of discoloration was 28.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 48, which means that the melt heat stability was fairly good. The oxygen gas permeability of the melt-shaped sheet of the glycolic acid copolymer was 8.0 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 5.

EXAMPLE 19

(a) Production of a low molecular weight glycolic acid Copolymer

A polycondensation reaction operation (comprised of the steps (A), (B) and (C)) was performed in substantially the same manner as in item (a) of Example 2, except that, after completion of step (B), the reaction temperature was gradually elevated to 200° C. over 10 minutes while maintaining the revolution rate at 200 rpm, and that in step (C), the reaction was continued until the total reaction time after the reaction temperature exceeded 190° C. became 6 hours, to thereby obtain a glycolic acid copolymer having a weight average molecular weight of 12,000.

During the reaction in step (A), the temperature of the reaction mixture gradually elevated; however, the temperature of the reaction mixture became almost constant at 146° C. after the reaction pressure was changed to $1.0 \times 10^4$ Pa. It was found that the weight average molecular weight of the glycolic acid copolymer just after completion of step (A) was 1,900, and that the weight average molecular weight of the glycolic acid copolymer at the point in time at which the reaction temperature reached 190° C. was 2,100. It was also found that, from the point in time at which the reaction temperature exceeded 190° C., it took 290 minutes for the weight average molecular weight of the glycolic acid copolymer to reach 10,000. The increasing rate of the weight average molecular weight within this period of 290 minutes was 1,634/hour.

(b) Melt Polycondensation of a Low Molecular Weight Glycolic Acid Copolymer, Followed by crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 42,800 and a melting temperature of 184° C. (hereinafter referred to as "crystallized glycolic acid copolymer P-21").

(b-2) Solid Phase Polymerization of the Pulverized, Crystallized Glycolic Acid Copolymer Obtained in Item (b-1)

The above-obtained crystallized glycolic acid copolymer P-21 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 152,000. The glycolic acid copolymer was comprised of 88.92% by mole of glycolic acid monomer units, 0.07% by mole of diglycolic acid monomer units and 11.01% by mole of lactic acid monomer units as non-glycolic, hydroxycarboxylic acid monomer units, wherein the lactic acid monomer units constituted a plurality of segments having an average chain length of 1.02 in terms of the average number of lactic acid monomer units. The degree of discoloration was 28.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 46, which means that the melt heat stability was fairly good. The oxygen gas permeability of the melt-shaped sheet of the glycolic acid copolymer was 8.0 ($cc/m^2 \cdot day \cdot atm$), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil.

The results of the analysis and the results of the evaluation are shown in Table 5.

EXAMPLE 20

The glycolic acid copolymer produced in item "(a) Production of a low molecular weight glycolic acid copolymer" of Example 16 was subjected to melt polycondensation, crystallization and pulverization in substantially the same manner as in item (b-1) of Example 2, except that the reaction time was changed to 1.5 hours, to thereby obtain a pulverized, crystallized glycolic acid copolymer having a weight average molecular weight of 20,000 and a melting temperature of 185° C. (hereinafter referred to as "crystallized glycolic acid copolymer P-22").

(b-2) Solid Phase Polymerization of the Pulverized, Crystallized Glycolic Acid Copolymer Obtained Above The above-obtained crystallized glycolic acid copolymer P-22 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 93,000. The glycolic acid copolymer was comprised of 88.98% by mole of glycolic acid monomer units, 0.02% by mole of diglycolic acid monomer units and 11.00% by mole of lactic acid monomer units as non-glycolic, hydroxycarboxylic acid monomer units, wherein the lactic acid monomer units constituted a plurality of segments having an average chain length of 1.02 in terms of the average number of lactic acid monomer units. The degree of discoloration was 27.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the degree of discoloration of the glycolic acid copolymer after the melt heat stability test was 38, which means that the melt heat stability was fairly good. The oxygen gas permeability of the melt-shaped sheet of the glycolic acid copolymer was 8.1 ($cc/m^2 \cdot day \cdot atm$), which means that the melt-shaped sheet had extremely excellent gas barrier property. Further, the strength of the melt-shaped sheet was 4, which means that the melt-shaped sheet had the high mechanical strength required of shaped articles such as a container, a film and the like. The melt-shaped sheet also had the biodegradability in soil.

The results of the analysis and the results of the evaluation are shown in Table 5.

COMPARATIVE EXAMPLE 6

(a) Production of a Low Molecular Weight Glycolic Acid Copolymer

Into substantially the same reaction apparatus (separable flask) as in Example 1 were introduced 349 g of a 70% by weight aqueous glycolic acid solution (having a diglycolic acid content of 0.005% by mole or less, based on the molar amount of glycolic acid), 39.3 g of a 90% by weight aqueous L-lactic acid solution, 0.60 g of neopentyl glycol and tetraisopropoxy germanium in an amount of 0.05% by weight, based on the total weight of the above-mentioned raw materials (the amount of germanium atom was $2.2 \times 10^{-6}$ mole per g of the monomers), to obtain a raw material mixture. The separable flask was then purged with nitrogen.

The molar ratio of diglycolic acid in the obtained raw material mixture was less than 0.00005, so that the calculated molar ratio of diglycolic acid was 0. Therefore, the calculated molar ratios of glycolic acid, lactic acid and neopentyl glycol were 0.8896, 0.1088 and 0.0016, respectively.

Subsequently, the separable flask was immersed in an oil bath preheated to 150° C. and, then, stirring of the raw material mixture was performed at a revolution rate of 100 rpm for 1.5 hours under a stream of nitrogen, thereby effecting a dehydration. Then, a polycondensation reaction was performed under conditions wherein the oil bath temperature was maintained at 150° C., and the pressure/time conditions were sequentially changed as follows: $5.0 \times 10^4$ Pa for 1 hour, $2.5 \times 10^4$ Pa for 0.5 hour and $1.0 \times 10^4$ Pa for 20 minutes, to thereby obtain a glycolic acid copolymer. During the reaction, the temperature of the reaction mixture gradually elevated; however, the temperature of the reaction mixture became almost constant at 146° C. after the reaction pressure was changed to $1.0 \times 10^4$ Pa. A small portion of the glycolic acid copolymer just after the above reaction was sampled and subjected to measurement of the molecular weight. It was found that the weight average molecular weight of the glycolic acid copolymer was 400.

The reaction temperature was gradually elevated to 190° C. over 120 minutes while maintaining the revolution rate and the reduced pressure. A small portion of the glycolic acid copolymer at the point in time at which the reaction temperature reached 190° C. was sampled and subjected to measurement of the molecular weight. It was found that the weight average molecular weight of the glycolic acid copolymer was 700. Subsequently, the reaction temperature was elevated to 200° C. over 10 minutes, whereupon the revolution rate was changed to 600 rpm and the reduced pressure was changed to $4.0 \times 10^2$ Pa, followed by performing a reaction. The reaction was continued until the total reaction time after the reaction temperature exceeded 190° C. became 3 hours, thereby obtaining a glycolic acid copolymer having a weight average molecular weight of 14,600. From the point in time at which the reaction temperature exceeded 190° C., it took 120 minutes for the weight average molecular weight of the glycolic acid copolymer to reach 10,000. The increasing rate of the weight average molecular weight within this period of 120 minutes was 4,650/hour.

The glycolic acid copolymer obtained above in the molten state was cooled to obtain a solidified glycolic acid copolymer having a low molecular weight. Then, the obtained low molecular weight glycolic acid copolymer was taken out of the separable flask and further polymerized by the operations explained below.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 42,000 and a melting temperature of 183° C. (hereinafter referred to as "crystallized glycolic acid copolymer P-23").

(b-2) Solid Phase Polymerization of the Pulverized, Crystallized Glycolic Acid Copolymer Obtained in Item (b-1)

The above-obtained crystallized glycolic acid copolymer P-23 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 186,000. The glycolic acid copolymer was comprised of 88.59% by mole of glycolic acid monomer units, 0.20% by mole of diglycolic acid monomer units and 11.00% by mole of lactic acid monomer units as non-glycolic, hydroxycarboxylic acid monomer units and 0.21% by mole of neopentyl glycol monomer units, wherein the lactic acid monomer units constituted a plurality of segments having an average chain length of 1.02 in terms of the average number of lactic acid monomer units. The degree of discoloration was 40.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the oxygen gas permeability of the melt-shaped sheet of the glycolic acid copolymer was 8.7 (cc/$m^2 \cdot day \cdot atm$), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil. However, with respect to the melt heat stability, it was found that the degree of discoloration of the glycolic acid copolymer after the melt heat stability test was 224, and that the glycolic acid copolymer was discolored to assume a brown color.

The results of the analysis and the results of the evaluation are shown in Table 6.

COMPARATIVE EXAMPLE 7

(a) Production of a Low Molecular Weight Glycolic Acid Copolymer

Into substantially the same reaction apparatus (separable flask) as in Example 1 were introduced 349 g of a 70% by weight aqueous glycolic acid solution (having a diglycolic acid content of 0.005% by mole or less, based on the molar amount of glycolic acid), 39.3 g of a 90% by weight aqueous L-lactic acid solution, 0.60 g of neopentyl glycol and tetraisopropoxy germanium in an amount of 0.05% by weight, based on the total weight of the above-mentioned aqueous solutions (the amount of germanium atom was $2.2 \times 10^{-6}$ mole per g of the monomers), to obtain a raw material mixture. The separable flask was then purged with nitrogen.

The molar ratio of diglycolic acid in the obtained raw material mixture was less than 0.00005, so that the calculated molar ratio of diglycolic acid was 0. Therefore, the calculated molar ratios of glycolic acid, lactic acid and neopentyl glycol were 0.8896, 0.1088 and 0.0016, respectively.

Subsequently, the separable flask was immersed in an oil bath preheated to 150° C. and, then, stirring of the raw material mixture was performed at a revolution rate of 100 rpm for 1.5 hours under a stream of nitrogen, thereby effecting a dehydration. Then, a polycondensation reaction was performed under conditions wherein the oil bath temperature was maintained at 150° C., and the pressure/time conditions were sequentially changed as follows: $5.0 \times 10^4$ Pa for 1 hour, $2.5 \times 10^4$ Pa for 0.5 hour and $1.0 \times 10^4$ Pa for 20 minutes, to thereby obtain a glycolic acid copolymer.

During the reaction, the temperature of the reaction mixture gradually elevated; however, the temperature of the reaction mixture became almost constant at 146° C. after the reaction pressure was changed to $1.0 \times 10^4$ Pa. A small portion of the glycolic acid copolymer obtained in the above reaction was sampled and subjected to measurement of the molecular weight. It was found that the weight average molecular weight of the glycolic acid copolymer was 400.

The reaction temperature was gradually elevated to 190° C. over 25 minutes while maintaining the revolution rate and the reduced pressure. A small portion of the glycolic acid copolymer at the point in time at which the reaction temperature reached 190° C. was sampled and subjected to measurement of the molecular weight. It was found that the weight average molecular weight of the glycolic acid copolymer was 500. Subsequently, the reaction temperature was elevated to 200° C. over 10 minutes, whereupon the reduced pressure was changed to $6.0 \times 10^2$ Pa, followed by performing a reaction while maintaining the revolution rate at 100 rpm. The reaction was continued until the total reaction time after the reaction temperature exceeded 190° C. became 20 hours, thereby obtaining a glycolic acid copolymer having a weight average molecular weight of 14,500. From the point in time at which the reaction temperature exceeded 190° C., it took 810 minutes for the weight average molecular weight of the glycolic acid copolymer to reach 10,000. The increasing rate of the weight average molecular weight within this period of 810 minutes was 704/hour.

The glycolic acid copolymer obtained above in the molten state was cooled to obtain a solidified glycolic acid copolymer having a low molecular weight. Then, the obtained low molecular weight glycolic acid copolymer was taken out of the separable flask and further polymerized by the operations explained below.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 44,000 and a melting temperature of 182° C. (hereinafter referred to as "crystallized glycolic acid copolymer P-24").

(b-2) Solid Phase Polymerization of the Pulverized, Crystallized Glycolic Acid Copolymer Obtained in Item (b-1)

The above-obtained crystallized glycolic acid copolymer P-24 was subjected to solid phase polymerization reaction in substantially the same manner as in item (b-2) of Example 2.

(c) The results of the analysis of the glycolic acid copolymer

The weight average molecular weight of the glycolic acid copolymer obtained in item (b-2) above was 179,000. The glycolic acid copolymer was comprised of 88.58% by mole of glycolic acid monomer units, 0.21% by mole of diglycolic acid monomer units, 11.00% by mole of lactic acid monomer units as non-glycolic, hydroxycarboxylic acid monomer units and 0.21% by mole of neopentyl glycol monomer units, wherein the lactic acid monomer units constituted a plurality of segments having an average chain length of 1.02 in terms of the average number of lactic acid monomer units. The degree of discoloration was 39.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the oxygen gas permeability of the melt-shaped sheet of the glycolic acid copolymer was 8.8 (cc/m²·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil. However, with respect to the melt heat stability, it was found that the degree of discoloration of the glycolic acid copolymer after the melt heat stability test was 242, and that the glycolic acid copolymer was discolored to assume a brown color.

The results of the analysis and the results of the evaluation are shown in Table 6.

COMPARATIVE EXAMPLE 8

(a) Production of a Low Molecular Weight Glycolic Acid Copolymer

Into substantially the same reaction apparatus (separable flask) as in Example 1 were introduced 349 g of a 70% by weight aqueous glycolic acid solution (having a diglycolic acid content of 0.005% by mole or less, based on the molar amount of glycolic acid), 39.3 g of a 90% by weight aqueous L-lactic acid solution, 0.60 g of neopentyl glycol and tetraisopropoxy germanium in an amount of 0.05% by weight, based on the total weight of the above-mentioned raw materials (the amount of germanium atom was $2.2 \times 10^{-6}$ mole per g of the monomers), to obtain a raw material mixture. The separable flask was then purged with nitrogen.

The molar ratio of diglycolic acid in the obtained raw material mixture was less than 0.00005, so that the calculated molar ratio of diglycolic acid was 0. Therefore, the calculated molar ratios of glycolic acid, lactic acid and neopentyl glycol were 0.8896, 0.1088 and 0.0016, respectively.

Subsequently, the separable flask was immersed in an oil bath preheated to 150° C. and, then, stirring of the raw material mixture was performed at a revolution rate of 100 rpm for 1.5 hours under a stream of nitrogen, thereby effecting a dehydration. Then, a polycondensation reaction was performed under conditions wherein the oil bath temperature was maintained at 150° C., and the pressure/time conditions were sequentially changed as follows: $5.0 \times 10^4$ Pa for 1 hour, $2.5 \times 10^4$ Pa for 0.5 hour, $1.0 \times 10^4$ Pa for 50 minutes and $5.0 \times 10^3$ Pa for 20 minutes, to thereby obtain a glycolic acid copolymer.

During the reaction, the temperature of the reaction mixture gradually elevated; however, the temperature of the reaction mixture became almost constant at 146° C. after the reaction pressure was changed to $1.0 \times 10^4$ Pa.

A small portion of the glycolic acid copolymer obtained in the above reaction was sampled and subjected to measurement of the molecular weight. It was found that the weight average molecular weight of the glycolic acid copolymer was 900.

The reaction temperature was gradually elevated to 190° C. over 120 minutes while maintaining the revolution rate and the reduced pressure. A small portion of the glycolic acid copolymer at the point in time at which the reaction temperature reached 190° C. was sampled and subjected to measurement of the molecular weight. It was found that the weight average molecular weight of the glycolic acid copolymer was 1,500. Subsequently, the reaction temperature was elevated to 200° C. over 10 minutes, whereupon the reduced pressure was changed to $6.0 \times 10^2$ Pa, followed by performing a reaction while maintaining the revolution rate at 100 rpm. The reaction was continued until the total reaction time after the reaction temperature exceeded 190° C. became 20 hours, thereby obtaining a glycolic acid copolymer having a weight average molecular weight of 15,600. From the point in time at which the reaction temperature exceeded 190° C., it took 720 minutes for the weight average molecular weight of the glycolic acid copolymer to reach 10,000. The increasing rate of the weight average molecular weight within this period of 720 minutes was 708/hour.

The glycolic acid copolymer obtained above in the molten state was cooled to obtain a solidified glycolic acid copolymer having a low molecular weight. Then, the obtained low molecular weight glycolic acid copolymer was taken out of the separable flask and further polymerized by the operations explained below.

(b) Melt Polycondensation of a Low Molecular Weight Glycolic Acid Copolymer, Followed by crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 44,800 and a melting temperature of 182° C. (hereinafter referred to as "crystallized glycolic acid copolymer P-25").

(b-2) Solid Phase Polymerization of the Pulverized, Crystallized Glycolic Acid Copolymer Obtained in Item (b-1)

The above-obtained crystallized glycolic acid copolymer P-25 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 184,000. The glycolic acid copolymer was comprised of 88.62% by mole of glycolic acid monomer units, 0.18% by mole of diglycolic acid monomer units, 11.00% by mole of lactic acid monomer units as non-glycolic, hydroxycarboxylic acid monomer units and 0.20% by mole of neopentyl glycol monomer units, wherein the lactic acid monomer units constituted a plurality of segments having an average chain length of 1.02 in terms of the average number of lactic acid monomer units. The degree of discoloration was 37.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the oxygen gas permeability of the melt-shaped sheet of the glycolic acid copolymer was 8.8 (cc/$m^2 \cdot day \cdot atm$), which means that the melt-shaped sheet had extremely excellent gas barrier property. Further, the strength of the melt-shaped sheet was 5 or more, which means that the melt-shaped, sheet had the high mechanical strength required of shaped articles such as a container, a film and the like. The melt-shaped sheet also had the biodegradability in soil. However, with respect to the melt heat stability, it was found that the degree of discoloration of the glycolic acid copolymer after the melt heat stability test was 196, and that the glycolic acid copolymer was discolored to assume a brown color.

The results of the analysis and the results of the evaluation are shown in Table 6.

COMPARATIVE EXAMPLE 9

(a) Production of a Low Molecular Weight Glycolic Acid Copolymer

Into substantially the same reaction apparatus (separable flask) as in Example 1 were introduced 360 g of a 70% by weight aqueous glycolic acid solution (having a diglycolic acid content of 0.005% by mole or less, based on the molar amount of glycolic acid), 40.83 g of a 90% by weight aqueous L-lactic acid solution and tetraisopropoxy germanium in an amount of 0.05% by weight, based on the total weight of the above-mentioned aqueous solutions (the amount of germanium atom was $2.2 \times 10^{-6}$ mole per g of the monomers), to obtain a raw material mixture. The separable flask was then purged with nitrogen.

The molar ratio of diglycolic acid in the obtained raw material mixture was less than 0.00005, so that the calculated molar ratio of diglycolic acid was 0. Therefore, the calculated molar ratios of glycolic acid and lactic acid were 0.89 and 0.11, respectively.

Subsequently, the separable flask was immersed in an oil bath preheated to 180° C. and, then, stirring of the raw material mixture was performed at a revolution rate of 200 rpm for 3 hours under a stream of nitrogen, thereby effecting a dehydration. Then, a polycondensation reaction was performed under conditions wherein the oil bath temperature was maintained at 180° C., and the pressure/time conditions were sequentially changed as follows: $5.0 \times 10^4$ Pa for 1 hour, $2.5 \times 10^4$ Pa for 0.5 hour, $1.0 \times 10^4$ Pa for 30 minutes, $5.0 \times 10^3$ Pa for 30 minutes and $2.0 \times 10^3$ Pa for 20 minutes, to thereby obtain a glycolic acid copolymer.

In the above reaction (which was performed in the separable flask immersed in the oil bath preheated to 180° C.), it was found that the weight average molecular weight of the glycolic acid copolymer as measured at the point in time at which the reaction temperature exceeded 160° C. was 300. A small portion of the glycolic acid copolymer obtained after completion of the above reaction was sampled and subjected to measurement of the molecular weight. It was found that the weight average molecular weight of the glycolic acid copolymer was 2,200.

The reaction temperature was gradually elevated to 190° C. over 15 minutes while maintaining the revolution rate and the reduced pressure. A small portion of the glycolic acid copolymer at the point in time at which the reaction temperature reached 190° C. was sampled and subjected to measurement of the molecular weight. It was found that the weight average molecular weight of the glycolic acid copolymer was 2,300.

Subsequently, the reaction temperature was elevated to 200° C. over 10 minutes, whereupon the revolution rate was changed to 600 rpm and the reduced pressure was changed to $4.0 \times 10^2$ Pa, followed by performing a reaction. The reaction was continued until the total reaction time after the reaction temperature exceeded 190° C. became 2.5 hours, thereby obtaining a glycolic acid copolymer having a weight average molecular weight of 14,100.

The glycolic acid copolymer obtained above in the molten state was cooled to obtain a solidified glycolic acid copolymer having a low molecular weight. Then, the obtained low molecular weight glycolic acid copolymer was taken out of the separable flask and further polymerized by the operations explained below.

(b) Melt Polycondensation of a Low Molecular Weight Glycolic Acid Copolymer, Followed by Crystallization, Pulverization and Solid Phase Polymerization (b-1) Melt Polycondensation, Crystallization and Pulverization The low molecular weight glycolic acid copolymer obtained above was subjected to melt polycondensation, crystallization and pulverization in substantially the same manner as in item (b-1) of Example 2, to thereby obtain a pulverized, crystallized glycolic acid copolymer having a weight average molecular weight of 43,600 and a melting temperature of 183° C. (hereinafter referred to as "crystallized glycolic acid copolymer P-26").

(b-2) Solid Phase Polymerization of the Pulverized, Crystallized Glycolic Acid Copolymer Obtained in Item (b-1)

The above-obtained crystallized glycolic acid copolymer P-26 was subjected to solid phase polymerization reaction in substantially the same manner as in item (b-2) of Example 2.

(c) The Results of the Analysis of the Glycolic Acid Copolymer

The weight average molecular weight of the glycolic acid copolymer obtained in item (b-2) above was 109,000. The glycolic acid copolymer was comprised of 88.84% by mole of glycolic acid monomer units, 0.14% by mole of diglycolic acid monomer units and 11.02% by mole of lactic acid monomer units as non-glycolic, hydroxycarboxylic acid monomer units, wherein the lactic acid monomer units constituted a plurality of segments having an average chain length of 1.02 in terms of the average number of lactic acid monomer units. The degree of discoloration was 38.

(d) Evaluation of the Glycolic Acid Copolymer and a Melt-Shaped Sheet of the Glycolic Acid Copolymer The melt heat stability of the glycolic acid copolymer obtained in item (b-2) above and the properties of a melt-shaped sheet of the glycolic acid copolymer were evaluated. It was found that the oxygen gas permeability of the melt-shaped sheet of the glycolic acid copolymer was 8.3 (cc/m$^2$·day·atm), which means that the melt-shaped sheet had extremely excellent gas barrier property. Further, the strength of the melt-shaped sheet was 4, which means that the melt-shaped sheet had the high mechanical strength required of shaped articles such as a container, a film and the like. The melt-shaped sheet also had the biodegradability in soil. However, with respect to the melt heat stability, it was found that the degree of discoloration of the glycolic acid copolymer after the melt heat stability test was 158, and that the glycolic acid copolymer was discolored to assume a brown color.

The results of the analysis and the results of the evaluation are shown in Table 6.

REFERENCE EXAMPLE 1

A glycolic acid-lactic acid copolymer was produced by a ring-opening polymerization as follows.

(a) Preparation of the Raw Materials (Monomers)

(a-1) Preparation of a Purified Glycolide 250 g of glycolide was dissolved in 500 g of dehydrated ethyl acetate at 75° C. The resultant solution was allowed to stand still at room temperature for 10 hours, thereby precipitating the glycolide, followed by filtration, thereby recovering the resultant precipitate. The obtained precipitate was washed with about 500 g of dehydrated ethyl acetate at room temperature. The washing of the precipitate was then repeated once. The washed precipitate was placed in an eggplant shaped flask, and the flask was immersed in an oil bath preheated at 60° C., followed by vacuum drying for 24 hours, to thereby obtain a dried product. The obtained dried product was subjected to simple distillation, to thereby obtain 95 g of a purified glycolide (having a boiling point of from 133 to 134° C. under a reduced pressure of from $9 \times 10^2$ to $8 \times 10^2$ Pa). The obtained purified glycolide was preserved under dry nitrogen before subjected to the polymerization reaction described below.

(a-2) Preparation of a Purified Lactide 250 g of L-lactide was dissolved in 500 g of dehydrated toluene at 80° C. The resultant solution was allowed to stand still at room temperature for 10 hours, thereby precipitating the L-lactide, followed by filtration, thereby recovering the resultant precipitate. The obtained precipitate was washed with about 500 g of dehydrated toluene at room temperature. The washing of the precipitate was then repeated once. The washed precipitate was placed in an eggplant shaped flask, and the flask was immersed in an oil bath preheated at 60° C., followed by vacuum drying for 24 hours, to thereby obtain 120 g of a purified L-lactide. The obtained purified L-lactide was preserved under dry nitrogen before subjected to the following polymerization reaction.

(b-1) Production of Glycolic Acid Copolymer (i)

Into a well dried, pressure-resistant tube (having a Teflon-coated inside surface) under dry nitrogen were introduced 84 g of the purified glycolide obtained in item (a-1) above, 19 g of the purified lactide obtained in item (a-2) above, 0.03 g of stannous 2-ethyl-hexanoate as a catalyst and 0.01 g of dehydrated lauryl alcohol. The tube was capped and then immersed in a shaking oil bath preheated at 130° C., followed by shaking of the tube for 20 hours to thereby effect a polymerization reaction. After completion of the polymerization, the tube was cooled to room temperature, and the contents of the tube (i.e., a reaction product) were taken out. The obtained reaction product, which was a bulk polymer, was then subjected to pulverization to thereby obtain particles having a particle diameter of about 1 mm or less. The obtained particles were extracted with dehydrated ethyl acetate using a Soxhlet extractor for 10 hours. The resultant extract was then subjected to vacuum drying for 24 hours using a vacuum dryer, to thereby obtain 95 g of glycolic acid copolymer (i).

(b-2) Production of Glycolic Acid Copolymer (ii)

Into a well dried, pressure resistant tube (having a Teflon-coated inside surface) under dry nitrogen were introduced 84 g of the purified glycolide obtained in item (a-1) above, 39 g of the purified lactide obtained in item (a-2) above, 0.037 g of stannous 2-ethyl-hexanoate as a catalyst and 0.012 g of dehydrated lauryl alcohol. The tube was capped and then immersed in a shaking oil bath preheated at 130° C., followed by shaking of the tube for 20 hours to thereby effect a polymerization reaction. After completion of the polymerization, the tube was cooled to room temperature, and the contents of the tube (i.e., a reaction product) were taken out. The reaction product, which was a bulk polymer, was then subjected to pulverization to thereby obtain particles having a particle diameter of about 1 mm or less. The obtained particles were extracted with dehydrated ethyl acetate using a Soxhlet extractor for 10 hours. The resultant extract was then subjected to vacuum drying for 24 hours using a vacuum dryer, to thereby obtain 116 g of glycolic acid copolymer (ii).

COMPARATIVE EXAMPLE 10

(a) The Results of the Analysis of Glycolic Acid Copolymer (i) Produced by a Ring-Opening Polymerization The weight average molecular weight of glycolic acid copolymer (i) obtained by a ring-opening polymerization in item (b-1) in Reference Example 1 was 175,000. Glycolic acid copolymer (i) was comprised of 94.00% by mole of glycolic acid monomer units and 6.00% by mole of lactic acid monomer units as non-glycolic, hydroxycarboxylic acid monomer units, wherein the lactic acid monomer units constituted a plurality of segments having an average chain length of 2.08 in terms of the average number of lactic acid monomer units. Diglycolic acid monomer units were not observed. The degree of discoloration was 30.

(b) Evaluation of Glycolic Acid Copolymer (I) and a Melt-Shaped Sheet of Glycolic Acid Copolymer (i)

The melt heat stability of the glycolic acid copolymer (i) obtained in item (b-1) of Reference Example 1 and the properties of a melt-shaped sheet of glycolic acid copolymer (i) were evaluated. It was found that the oxygen gas permeability of the melt-shaped sheet of glycolic acid copolymer (i) was 8.8 (cc/m$^2$·day·atm), which means that the melt-shaped sheet had extremely excellent gas barrier property. Further, the strength of the melt-shaped sheet was 5 or more, which means that the melt-shaped sheet had the high mechanical strength required of shaped articles such as a container, a film and the like. The melt-shaped sheet also had the biodegradability in soil. However, with respect to the melt heat stability, it was found that the degree of discoloration of glycolic acid copolymer (i) after the melt heat stability test was 92, and that glycolic acid copolymer (i) was discolored to assume a yellow color.

The results of the analysis and the results of the evaluation are shown in Table 6.

COMPARATIVE EXAMPLE 11

(a) The Results of the Analysis of Glycolic Acid Copolymer (ii) Produced by a Ring-Opening Polymerization The weight average molecular weight of glycolic acid copolymer (ii) obtained by a ring-opening polymerization in item (b-2) in Reference Example 1 was 183,000. Glycolic acid copolymer (ii) was comprised of 83.00% by mole of glycolic acid monomer units and 17.00% by mole of lactic acid monomer units as non-glycolic, hydroxycarboxylic acid monomer units, wherein the lactic acid monomer units constituted a plurality of segments having an average chain length of 2.36 in terms of the average number of lactic acid monomer units. Diglycolic acid monomer units were not observed. The degree of discoloration was 29.

(b) Evaluation of Glycolic Acid Copolymer (Ii) and a Melt-Shaped Sheet of Glycolic Acid Copolymer (ii)

The melt heat stability of the glycolic acid copolymer (ii) obtained in item (b-2) of Reference Example 1 and the properties of a melt-shaped sheet of glycolic acid copolymer (ii) were evaluated. It was found that the strength of the melt-shaped sheet was 5 or more, which means that the melt-shaped sheet had the high mechanical strength required of shaped articles such as a container, a film and the like. The melt-shaped sheet also had the biodegradability in soil. However, the oxygen gas permeability of the melt-shaped sheet of the glycolic acid copolymer was 28 (cc/m$^2$·day·atm), which means that the gas barrier property of the melt-shaped sheet was poor. Further, with respect to the melt heat stability, it was found that the degree of discoloration of glycolic acid copolymer (ii) after the melt heat stability test was 58, and that glycolic acid copolymer (ii) was discolored to assume a yellow color.

The results of the analysis and the results of the evaluation are shown in Table 6.

REFERENCE EXAMPLE 2

The glycolic acid copolymer obtained in item (b-2) of Example 11 was subjected to measurement of the weight average molecular weight in substantially the same manner as in Example 11, except that hexafluoroisopropanol containing no sodium trifluoroacetate dissolved therein was used as an eluent. It was found that the glycolic acid copolymer had a weight average molecular weight of 583,000.

TABLE 1

|  | Example 1 | Example 2 | Example 3 | Example 4 | Example 5 |
|---|---|---|---|---|---|
| Results of the analysis of the obtained copolymer |  |  |  |  |  |
| Weight average molecular weight (Mw) | 123,000 | 186,000 | 182,000 | 167,000 | 179,000 |
| Content of glycolic acid monomer units (% by mole) | 83.97 | 88.97 | 93.97 | 88.97 | 88.97 |
| Non-glycolic, hydroxycarboxylic acid monomer units |  |  |  |  |  |
| Type | Lactic acid | Lactic acid | Lactic acid | 6-hydroxyhexanoic acid | 3-hydroxybutylic acid |
| Content (% by mole) | 16.00 | 11.00 | 6.00 | 11.00 | 11.00 |
| Average chain length | 1.08 | 1.02 | 1.02 | 1.03 | 1.02 |

TABLE 1-continued

|  | Example 1 | Example 2 | Example 3 | Example 4 | Example 5 |
|---|---|---|---|---|---|
| Content of diglycolic acid monomer units (% by weight) | 0.03 | 0.03 | 0.03 | 0.03 | 0.03 |
| Polyol monomer units |  |  |  |  |  |
| Type | — | — | — | — | — |
| Content (% by mole) | — | — | — | — | — |
| Polycarboxylic acid monomer units |  |  |  |  |  |
| Type | — | — | — | — | — |
| Content (% by mole) | — | — | — | — | — |
| Total content of polycarboxylic acid monomer units including polyol monomer units and diglycolic acid monomer units (% by mole) | 0.03 | 0.03 | 0.03 | 0.03 | 0.03 |
| Degree of discoloration of copolymer | 28 | 29 | 29 | 29 | 28 |
| Results of evaluation |  |  |  |  |  |
| Degree of discoloration after the melt heat stability test | 36 | 38 | 43 | 38 | 39 |
| Oxygen gas permeability of the melt-shaped sheet (cc/m$^2$ · day · atm) | 9.1 | 8.0 | 7.2 | 8.1 | 8.0 |
| Strength of the melt-shaped sheet | 4 | 5 or more | 5 or more | 5 or more | 5 or more |
| Biodegradability of the melt-shaped sheet in soil | Bio-degradable | Biodegradable | Biodegradable | Biodegradable | Biodegradable |

Note:
"—" means "not detected".

TABLE 2

|  | Comparative Example 1 | Comparative Example 2 | Comparative Example 3 | Comparative Example 4 |
|---|---|---|---|---|
| Results of the analysis of the obtained copolymer |  |  |  |  |
| Weight average molecular weight (Mw) | 109,000 | 164,000 | 122,000 | 187,000 |
| Content of glycolic acid monomer unit (% by weight) | 88.86 | 96.97 | 72.96 | 88.97 |
| Non-glycolic, hydroxycarboxylic acid monomer units |  |  |  |  |
| Type | Lactic acid | Lactic acid | Lactic acid | Lactic acid |
| Content (% by mole) | 11.01 | 3.00 | 27.01 | 11.00 |
| Average chain length | 1.02 | 1.01 | 1.14 | 1.62 |
| Content of diglycolic acid monomer unit (% by mole) | 0.13 | 0.03 | 0.03 | 0.03 |
| Polyol monomer units |  |  |  |  |
| Type | — | — | — | — |
| Content (% by mole) | — | — | — | — |
| Polycarboxylic acid monomer units |  |  |  |  |
| Type | — | — | — | — |
| Content (% by mole) | — | — | — | — |
| Total content of polycarboxylic acid monomer units including polyol monomer units and diglycolic acid monomer units (% by mole) | 0.13 | 0.03 | 0.03 | 0.03 |
| Degree of discoloration of copolymer | 34 | 33 | 33 | 29 |
| Results of evaluation |  |  |  |  |
| Degree of discoloration after the melt heat stability test | 175 | 115 | 39 | 105 |
| Oxygen gas permeability of a melt-shaped sheet (cc/m$^2$ · day · atm) | 8.2 | 7.0 | 35.0 | 8.4 |
| Strength of the melt-shaped sheet | 4 | 5 or more | 4 | 5 or more |
| Biodegradability of the melt-shaped sheet in soil | Biodegradable | Biodegradable | Biodegradable | Biodegradable |

Note:
"—" means "not detected".

TABLE 3

|  | Example 6 | Example 7 | Example 8 | Example 9 | Example 10 | |
|---|---|---|---|---|---|---|
| Results of the analysis of the obtained copolymer | | | | | | |
| Weight average molecular weight (Mw) | 187,000 | 187,000 | 325,000 | 330,000 | 163,000 | |
| Content of glycolic acid monomer units (% by mole) | 88.94 | 88.94 | 88.98 | 88.94 | 88.97 | |
| Non-glycolic, hydroxycarboxylic acid monomer units | | | | | | |
| Type | Lactic acid | Lactic acid | Lactic acid | Lactic acid | Lactic acid | |
| Content (% by mole) | 10.99 | 10.99 | 10.98 | 10.98 | 10.94 | |
| Average chain length | 1.01 | 1.01 | 1.01 | 1.01 | 1.01 | |
| Content of diglycolic acid monomer unit (% by mole) | 0.03 | 0.03 | 0.03 | 0.03 | 0.04 | |
| Polyol monomer units | | | | | | |
| Type | Neopentyl glycol | 1,6-hexanediol | Trimethylol-propane | Neopentyl glycol | Trimethylol-propane | Neopentyl glycol | Trimethylol-propane |
| Content (% by mole) | 0.04 | 0.04 | 0.01 | 0.04 | 0.01 | 0.04 | 0.01 |
| Polycarboxylic acid monomer units | | | | | | |
| Type | — | — | — | — | — | |
| Content (% by mole) | — | — | — | — | — | |
| Total content of polycarboxylic acid monomer units including polyol monomer units and diglycolic acid monomer units (% by mole) | 0.07 | 0.07 | 0.04 | 0.08 | 0.09 | |
| Degree of discoloration of copolymer | 29 | 33 | 34 | 33 | 39 | |
| Results of evaluation | | | | | | |
| Degree of discoloration after the meld heat stability test | 39 | 43 | 44 | 44 | 48 | |
| Oxygen gas permeability of a melt-shaped sheet (cc/m² · day · atm) | 8.3 | 8.2 | 8.3 | 8.6 | 8.7 | |
| Strength of the melt-shaped sheet | 5 or more | 5 or more | 5 or more | 5 or more | 5 or more | |
| Biodegradability of the melt-shaped sheet in soil | Bio-degradable | Bio-degradable | Bio-degradable | Biodegradable | Biodegradable | |

Note:
"—" means "not detected".

TABLE 4

|  | Example 11 | Example 12 | Example 13 | Example 14 | Example 15 | Comparative Example 5 |
|---|---|---|---|---|---|---|
| Results of the analysis of the obtained copolymer | | | | | | |
| Weight average molecular weight (Mw) | 186,000 | 185,000 | 189,000 | 280,000 | 189,000 | 165,000 |
| Content of glycolic acid monomer unit (% by mole) | 88.96 | 88.96 | 88.63 | 88.62 | 88.25 | 93.95 |
| Non-glycolic, hydroxycarboxylic acid monomer units | | | | | | |
| Type | Lactic acid | Lactic acid | Lactic acid | Lactic acid | Lactic acid | Lactic acid |
| Content (% by mole) | 10.96 | 10.96 | 9.57 | 9.56 | 7.93 | 4.21 |
| Average chain length | 1.01 | 1.01 | 1.05 | 1.01 | 1.05 | 1.02 |
| Content of diglycolic acid monomer unit (% by mole) | 0.04 | 0.03 | 0.03 | 0.03 | 0.03 | 0.03 |
| Polyol monomer units | | | | | | |
| Type | Neopentyl glycol | Neopentyl glycol | Neopentyl glycol | Neopentyl glycol | Trimethylol-propane | Neopentyl glycol | Neopentyl glycol |
| Content (% by mole) | 0.04 | 0.04 | 0.90 | 0.90 | 0.01 | 1.91 | 0.92 |
| Polycarboxylic acid monomer units | | | | | | |
| Type | — | Oxalic acid | Adipic acid | Adipic acid | Adipic acid | Adipic acid |
| Content (% by mole) | — | 0.01 | 0.87 | 0.88 | 1.88 | 0.89 |
| Total content of Polycarboxylic acid monomer units including, polyol monomer units and diglycolic acid monomer units (% by mole) | 0.08 | 0.08 | 1.80 | 1.82 | 3.82 | 1.84 |
| Degree of discoloration of copolymer | 29 | 28 | 30 | 33 | 30 | 34 |

TABLE 4-continued

|  | Example 11 | Example 12 | Example 13 | Example 14 | Example 15 | Comparative Example 5 |
|---|---|---|---|---|---|---|
| Results of evaluation |  |  |  |  |  |  |
| Degree of discoloration after the meld heat stability test | 40 | 39 | 39 | 42 | 38 | 110 |
| Oxygen gas permeability of a melt-shaped sheet (cc/m$^2$ · day · atm) | 8.5 | 8.5 | 8.8 | 9.2 | 12.0 | 8.3 |
| Strength of the melt-shaped sheet | 5 or more | 5 or more | 5 or more | 5 or more | 5 or more | 5 or more |
| Biodegradability of the melt-shaped sheet in soil | Bio-degradable | Bio-degradable | Bio-degradable | Biodegradable | Bio-degradable | Bio-degradable |

Note:
"—" means "not detected".

TABLE 5

|  | Example 16 | Example 17 | Example 18 | Example 19 | Example 20 |
|---|---|---|---|---|---|
| Results of the analysis of the obtained copolymer |  |  |  |  |  |
| Weight average molecular weight (Mw) | 178,000 | 148,000 | 132,000 | 152,000 | 93,000 |
| Content of glycolic acid monomer unit (% by mole) | 88.98 | 88.93 | 88.91 | 88.92 | 88.98 |
| Non-glycolic, hydroxycarboxylic acid monomer units |  |  |  |  |  |
| Type | Lactic acid | Lactic acid | Lactic acid | Lactic acid | Lactic acid |
| Content (% by mole) | 11.00 | 11.01 | 11.01 | 11.01 | 11.00 |
| Average chain length | 1.02 | 1.05 | 1.02 | 1.02 | 1.02 |
| Content of diglycolic acid monomer unit (% by mole) | 0.02 | 0.06 | 0.08 | 0.07 | 0.02 |
| Polyol monomer units |  |  |  |  |  |
| Type | — | — | — | — | — |
| Content (% by mole) | — | — | — | — | — |
| Polycarboxylic acid monomer units |  |  |  |  |  |
| Type | — | — | — | — | — |
| Content (% by mole) | — | — | — | — | — |
| Total content of polycarboxylic acid monomer units including polyol monomer units and diglycolic acid monomer units (% by mole) | 0.02 | 0.06 | 0.08 | 0.07 | 0.02 |
| Degree of discoloration of copolymer | 28 | 28 | 28 | 28 | 27 |
| Results of evaluation |  |  |  |  |  |
| Degree of discoloration after the meld heat stability test | 39 | 44 | 48 | 46 | 38 |
| Oxygen gas permeability of a melt-shaped sheet (cc/m$^2$ · day · atm) | 8.1 | 8.1 | 8.0 | 8.0 | 8.1 |
| Strength of the melt-shaped sheet | 5 or more | 5 or more | 5 or more | 5 or more | 4 |
| Biodegradability of the melt-shaped sheet in soil | Biodegradable | Biodegradable | Biodegradable | Biodegradable | Biodegradable |

Note:
"—" means "not detected".

TABLE 6

|  | Comparative Example 6 | Comparative Example 7 | Comparative Example 8 | Comparative Example 9 | Comparative Example 10 | Comparative Example 11 |
|---|---|---|---|---|---|---|
| Results of the analysis of the obtained copolymer |  |  |  |  |  |  |
| Weight average molecular weight (Mw) | 186,000 | 179,000 | 184,000 | 109,000 | 175,000 | 183,000 |
| Content of glycolic acid monomer unit (% by mole) | 88.59 | 88.58 | 88.62 | 88.84 | 94.00 | 83.00 |
| Non-glycolic, hydroxycarboxylic acid monomer units |  |  |  |  |  |  |
| Type | Lactic acid | Lactic acid | Lactic acid | Lactic acid | Lactic acid | Lactic acid |
| Content (% by mole) | 11.00 | 11.00 | 11.00 | 11.02 | 6.00 | 17.00 |
| Average chain length | 1.02 | 1.02 | 1.02 | 1.02 | 2.08 | 2.36 |
| Content of diglycolic acid monomer unit (% by mole) | 0.20 | 0.21 | 0.18 | 0.14 | — | — |

TABLE 6-continued

| | Comparative Example 6 | Comparative Example 7 | Comparative Example 8 | Comparative Example 9 | Comparative Example 10 | Comparative Example 11 |
|---|---|---|---|---|---|---|
| Polyol monomer units | | | | | | |
| Type | Neopentyl glycol | Neopentyl glycol | Neopentyl glycol | — | — | — |
| Content (% by mole) | 0.21 | 0.21 | 0.20 | — | — | — |
| Polycarboxylic acid monomer units | | | | | | |
| Type | — | — | — | — | — | — |
| Content (% by mole) | — | — | — | — | — | — |
| Total content of polycarboxylic acid monomer units including polyol monomer units and diglycolic acid monomer units (% by mole) | 0.41 | 0.42 | 0.38 | 0.14 | — | — |
| Degree of discoloration of copolymer | 40 | 39 | 37 | 38 | 30 | 29 |
| Results of evaluation | | | | | | |
| Degree of discoloration after the meld heat stability test | 224 | 242 | 196 | 158 | 92 | 58 |
| Oxygen gas permeability of a melt-shaped sheet (cc/m² · day · atm) | 8.7 | 8.8 | 8.8 | 8.3 | 8.8 | 28.0 |
| Strength of the melt-shaped sheet | 5 or more | 5 or more | 5 or more | 4 | 5 or more | 5 or more |
| Biodegradability of the melt-shaped sheet in soil | Biodegradable | Biodegradable | Biodegradable | Biodegradable | Biodegradable | Biodegradable |

Note:
"—" means "not detected".

INDUSTRIAL APPLICABILITY

The glycolic acid copolymer of the present invention is a high quality, high molecular weight product which is advantageous not only in that the copolymer enables production of a shaped article exhibiting excellent gas barrier property, satisfactory mechanical strength and satisfactory biodegradability, but also in that the copolymer exhibits high heat stability, thereby greatly suppressing the occurrence of discoloration even when melt-shaped at high temperatures. Further, by the method of the present invention, the above-mentioned glycolic acid copolymer can be produced efficiently and stably.

The invention claimed is:

1. A glycolic acid copolymer comprising:
   (a) 80 to less than 95% by mole of glycolic acid monomer units,
   (b) 5.0 to 20.0% by mole of non-glycolic, hydroxycarboxylic acid monomer units, and
   (c) 0 to 0.10% by mole of diglycolic acid monomer units, said non-glycolic, hydroxycarboxylic acid monomer units (b) constituting a plurality of segments each independently consisting of at least one non-glycolic, hydroxycarboxylic acid monomer unit (b), wherein said segments have an average chain length of from 1.00 to 1.50 in terms of the average number of non-glycolic, hydroxycarboxylic acid monomer unit or units (b),
   the total of said components (a), (b) and (c) being 100% by mole,
   said glycolic acid copolymer having a weight average molecular weight of 50,000 or more.

2. The glycolic acid copolymer according to claim 1, wherein the weight average molecular weight of said glycolic acid copolymer is 80,000 or more.

3. The glycolic acid copolymer according to claim 1 or 2, wherein the amount of diglycolic acid monomer units (c) is from more than 0 to 0.09% by mole, based on the total molar amount of components (a), (b) and (c).

4. The glycolic acid copolymer according to claim 1 or 2, wherein the weight average molecular weight of said glycolic acid copolymer is 100,000 or more.

5. The glycolic acid copolymer according to claim 1 or 2, wherein the average chain length of said segments each independently consisting of at least one non-glycolic, hydroxycarboxylic acid monomer unit (b) is from 1.00 to 1.20.

6. The glycolic acid copolymer according to claim 1 or 2, wherein said non-glycolic, hydroxycarboxylic acid monomer units (b) are non-glycolic, monohydroxymonocarboxylic acid monomer units.

7. The glycolic acid copolymer according to claim 1 or 2, which further comprises a polyol monomer unit (d).

8. The glycolic acid copolymer according to claim 7, wherein said polyol monomer unit (d) comprises at least one member selected from the group consisting of monomer units derived from a diol having 3 or more carbon atoms and monomer units derived from a compound having 4 or more carbon atoms and 3 or more hydroxyl groups in the molecule.

9. The glycolic acid copolymer according to claim 8, wherein said polyol monomer unit (d) comprises a monomer unit derived from a polyol having 5 or more carbon atoms and 2 or 3 hydroxyl groups in the molecule.

10. The glycolic acid copolymer according to claim 9, wherein said polyol monomer units (d) are neopentyl glycol monomer units.

11. The glycolic acid copolymer according to of claim 7, which further comprises a polycarboxylic acid monomer unit (e) other than diglycolic acid monomer units, wherein the total amount of the polyol monomer units (d), the polycarboxylic acid monomer units (e), and the diglycolic acid monomer units (c) is less than 2.0% by mole, based on the total molar amount of components (a), (b), (c), (d) and (e).

12. The glycolic acid copolymer according to claim 11, wherein the total amount of the polyol monomer units (d), the polycarboxylic acid monomer units (e), and the diglycolic acid monomer units (c) is from more than 0.02 to less than 2.0% by mole, based on the total molar amount of components (a), (b), (c), (d) and (e), and the amount of the polyol monomer units (d) is from 0.02 to less than 2.0% by mole, based on the total molar amount of components (a), (b), (c), (d) and (e).

13. The glycolic acid copolymer according to claim 1 or 2, wherein said non-glycolic, hydroxycarboxylic acid monomer units (b) comprise at least one member selected from the group consisting of lactic acid monomer units and 6-hydroxyhexanoic acid monomer units.

14. The glycolic acid copolymer according to claim 1 or 2, which is obtained by polycondensing at least one starting material selected from the group consisting of glycolic acid and a derivative thereof with a reactant copolymerizable with said at least one starting material, wherein said reactant comprises at least one member selected from the group consisting of a non-glycolic, hydroxycarboxylic acid and a derivative thereof.

15. A method for producing a glycolic acid copolymer, which comprises the steps of:
(A) providing a raw material mixture comprising at least one starting material selected from the group consisting of glycolic acid and a derivative thereof, and a reactant copolymerizable with said at least one starting material, wherein said reactant comprises at least one member selected from the group consisting of a non-glycolic, hydroxycarboxylic acid, a derivative thereof and optionally at least one compound selected from the group consisting of a polyol, a polycarboxylic acid and a derivative of the polycarboxylic acid, and subjecting said raw material mixture to a preliminary polycondensation reaction at a temperature in the range of from 20 to 160° C., thereby obtaining a reaction mixture containing a glycolic acid copolymer prepolymer having a weight average molecular weight of from 700 to 5,000,
(B) elevating the temperature of the reaction mixture to 190° C. within a period of 100 minutes as measured from the start of the temperature elevation in step (B), and
(C) performing a heat treatment of said reaction mixture at a temperature in the range of from 190 to 300° C. to effect a final polycondensation reaction, wherein said final polycondensation reaction is performed so as to obtain a glycolic acid copolymer having a weight average molecular weight of 10,000 or more, wherein said final polycondensation reaction is performed under conditions wherein the increasing rate of weight average molecular weight of the glycolic acid copolymer being produced is maintained at 1,000 per hour or more until the weight average molecular weight reaches at least 10,000.

16. The method according to claim 15, wherein said heat treatment for effecting the final polycondensation reaction is performed so as to obtain the glycolic acid copolymer of claim 1 or 2, which has a weight average molecular weight of 50,000 or more.

17. The method according to claim 15, wherein said raw material mixture satisfies the following formulae (1) to (3):

$$0.8 \leq X^1 \leq 0.95 \quad (1),$$

$$0.05 \leq X^2 \quad (2), \text{ and}$$

$$X^1+X^2+X^3+X^4=1 \quad (3)$$

wherein:
$X^1$ represents the calculated molar ratio of said at least one starting material selected from the group consisting of glycolic acid and a derivative thereof,
$X^2$ represents the calculated molar ratio of said at least one member selected from the group consisting of a non-glycolic, hydroxycarboxylic acid and a derivative thereof,
$X^3$ represents the calculated molar ratio of an optional polyol,
$X^4$ represents the calculated molar ratio of at least one optional raw material selected from the group consisting of a polycarboxylic acid and a derivative thereof, said calculated molar ratio of each raw material being defined as the ratio of the molar amount of the unit structure obtained by hydrolysis of each raw material to the total molar amount of the unit structures of all raw materials, and
each of $X^3$ and $X^4$ is independently 0 or more.

18. The method according to claim 17, wherein said raw material mixture satisfies the following formulae (4) and (5):

$$\frac{X^4}{X^1+X^2} \leq 0.001, \text{ and} \quad (4)$$

$$0 < \frac{X^3}{X^1+X^2} \leq 0.01, \quad (5)$$

wherein $X^1$ to $X^4$ are as defined for formulae (1) to (3) above, provided that $X^3$ is more than 0, and $X^4$ is 0 or more.

19. The method according to claim 17, wherein said raw material mixture satisfies the following formulae (6) and (7):

$$0.001 < \frac{X^4}{X^1+X^2} \leq 0.088, \text{ and} \quad (6)$$

$$1 \leq \frac{X^3}{X^4} \leq 2, \quad (7)$$

wherein $X^1$ to $X^4$ are as defined for formulae (1) to (3) above, provided that each of $X^3$ and $X^4$ is more than 0.

20. The method according to claim 17, wherein said raw material mixture satisfies the following formula (8):

$$0.0002 \leq \frac{X^3+X^4}{X^1+X^2+X^3+X^4} < 0.02, \quad (8)$$

wherein $X^1$ to $X^4$ are as defined for formulae (1) to (3) above, provided that $X^3$ is more than 0, and $X^4$ is 0 or more.

21. A method for producing a glycolic acid copolymer of claim 1 or 2, which comprises the steps of:
crystallizing the glycolic acid copolymer obtained by the method of claim 15, thereby obtaining a crystallized glycolic acid copolymer, and
subjecting the obtained crystallized glycolic acid copolymer to a solid phase polymerization, thereby increasing the degree of polymerization of the crystallized glycolic acid copolymer.

22. The method according to claim 21, wherein said crystallized glycolic acid copolymer before the solid phase polymerization has a weight average molecular weight of 25,000 or more, as measured by gel permeation chromatography using, as an eluent, an 80 mM sodium trifluoroacetate solution in hexafluoroisopropanol and using a calibration curve obtained with respect to standard monodisperse polymethyl methacrylate samples.

23. A shaped article obtained from the glycolic acid copolymer of claim 1 or 2.

* * * * *

UNITED STATES PATENT AND TRADEMARK OFFICE
CERTIFICATE OF CORRECTION

| | | |
|---|---|---|
| PATENT NO. | : 7,202,326 B2 | Page 1 of 1 |
| APPLICATION NO. | : 10/528984 | |
| DATED | : April 10, 2007 | |
| INVENTOR(S) | : Yoshito Kuroda et al. | |

It is certified that error appears in the above-identified patent and that said Letters Patent is hereby corrected as shown below:

Column 98, Line 56, change "of claim 7" to --claim 7--.

Signed and Sealed this

Third Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 7,202,326 B2
APPLICATION NO. : 10/528984
DATED : April 10, 2007
INVENTOR(S) : Yoshito Kuroda et al.

It is certified that error appears in the above-identified patent and that said Letters Patent is hereby corrected as shown below:

Column 23, Line 49, change "aminolactic" to --aminobutyric--.

Column 23, Lines 61-62, change "α-methyl-caprolactam" (Second Occurrence) to --β-methyl-caprolactam--.

Column 43, Line 7, change "2" to --0.2--.

Column 91, Line 2 (TABLE 1-continued), change "Content of diglycolic acid monomer units (% by weight)" to --Content of diglycolic acid monomer units (% by mole)--.

Column 91, Line 41 (TABLE 2), change "Content of glycolic acid monomer unit (% by weight)" to --Content of glycolic acid monomer unit (% by mole)--.

Column 93, Line 30 (TABLE 3), change "Degree of discoloration after the meld heat stability test" to --Degree of discoloration after the melt heat stability test--.

Column 95, Line 6 (TABLE 4-continued), change "Degree of discoloration after the meld heat stability test" to --Degree of discoloration after the melt heat stability test--.

Column 95, Line 46 (TABLE 5), change "Degree of discoloration after the meld heat stability test" to --Degree of discoloration after the melt heat stability test--.

Column 97, Line 19 (TABLE 6-continued), change "Degree of discoloration after the meld heat stability test" to --Degree of discoloration after the melt heat stability test--.

Signed and Sealed this

Twenty-seventh Day of October, 2009

David J. Kappos
*Director of the United States Patent and Trademark Office*